(12) United States Patent
Okada et al.

(10) Patent No.: US 10,361,434 B2
(45) Date of Patent: *Jul. 23, 2019

(54) BINDER RESIN FOR NONAQUEOUS SECONDARY BATTERY ELECTRODE, BINDER RESIN COMPOSITION FOR NONAQUEOUS SECONDARY BATTERY ELECTRODE SLURRY COMPOSITION FOR NONAQUEOUS SECONDARY BATTERY ELECTRODE, ELECTRODE FOR NONAQUEOUS SECONDARY BATTERY, AND NONAQUEOUS SECONDARY BATTERY

(71) Applicant: Mitsubishi Chemical Corporation, Tokyo (JP)

(72) Inventors: Haruki Okada, Otake (JP); Mitsufumi Nodono, Otake (JP); Hikaru Momose, Otake (JP); Fumino Momose, Otake (JP); Fumiko Fujie, Otake (JP); Akikazu Matsumoto, Otake (JP); Daisuke Fujikawa, Otake (JP); Ayako Shimonaka, Otake (JP); Akihiro Ishii, Yokohama (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/582,098

(22) Filed: Apr. 28, 2017

(65) Prior Publication Data

US 2017/0244105 A1 Aug. 24, 2017

Related U.S. Application Data

(63) Continuation of application No. 14/362,007, filed as application No. PCT/JP2012/081210 on Nov. 30, 2012, now Pat. No. 9,774,038.

(30) Foreign Application Priority Data

Dec. 2, 2011 (JP) ................................ 2011-265040
Feb. 27, 2012 (JP) ................................ 2012-039952
Apr. 13, 2012 (JP) ................................ 2012-092117

(51) Int. Cl.
*H01M 4/62* (2006.01)
*C08F 26/02* (2006.01)
(Continued)

(52) U.S. Cl.
CPC .............. *H01M 4/622* (2013.01); *C08F 26/02* (2013.01); *H01M 4/0404* (2013.01); *H01M 4/525* (2013.01); *H01M 4/587* (2013.01)

(58) Field of Classification Search
CPC .................... H01M 4/621; H01M 4/622
See application file for complete search history.

(56) References Cited

U.S. PATENT DOCUMENTS 4,772,359 A 9/1988 Linhart et al.
5,478,553 A * 12/1995 Chandran .............. A61K 8/046
424/70.16
(Continued)

FOREIGN PATENT DOCUMENTS

JP 2000-230101 A 8/2000
JP 2002-117860 A 4/2002
(Continued)

OTHER PUBLICATIONS

Machine translation of JP 2002-251999, published on Sep. 6, 2002.*
Polymer Properties Database, http://polymerdatabase.com, 2015 (Year: 2015).*
International Search Report issued in corresponding International Patent Application No. PCT/JP2012/081210 dated Feb. 12, 2013.
European Extended Search Report issued by the European Patent Office dated May 15, 2015 in the corresponding European Patent Application No. 12852730.6.
Dimarzio et al., "Glass temperature of copolymers," Journal of Polymer Science Part A: Polymer Chemistry, Abstract, vol. 40, issue 136, pp. 121-131 (1959).
(Continued)

*Primary Examiner* — Anca Eoff
(74) *Attorney, Agent, or Firm* — Morgan, Lewis & Bockius LLP

(57) ABSTRACT

A binder resin for a nonaqueous secondary battery electrode of the invention satisfies $I_s \geq 30$ ($I_s$ indicates a sum of scattering intensities observed in a particle size range of from 1 to 100 nm) when a solution is formed by dissolving the binder resin in water at a concentration of 5% by mass and particle size distribution is measured by a dynamic light scattering method at 25° C. The binder resin contains a polymer (B) having a structural unit represented by the following Formula (11) and a specific structural unit. The binder resin also contains a polymer ($\alpha$) having a specific structural unit and a structural unit represented by the following Formula (22), and/or a mixture of a polymer ($\beta$1) having a specific structural unit and a polymer ($\beta$2) having a structural unit represented by the following Formula (22).

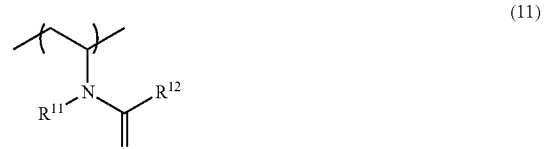

(11)

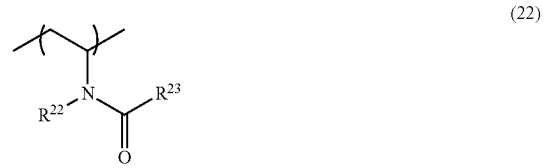

(22)

5 Claims, No Drawings

(51) Int. Cl.
    *H01M 4/04*         (2006.01)
    *H01M 4/525*      (2010.01)
    *H01M 4/587*      (2010.01)

(56) References Cited

U.S. PATENT DOCUMENTS

| | | |
|---|---|---|
| 5,630,907 A | 5/1997 | Nilz et al. |
| 5,965,651 A | 10/1999 | Ishii et al. |
| 6,280,631 B1 | 8/2001 | Sommese et al. |
| 6,455,195 B1 | 9/2002 | Matsuura et al. |
| 2004/0048154 A1 | 3/2004 | Jung et al. |
| 2014/0287308 A1* | 9/2014 | Okada ............ H01M 4/622 429/217 |

FOREIGN PATENT DOCUMENTS

| | | |
|---|---|---|
| JP | 2002-251999 A | 9/2002 |
| JP | 2002-279980 A | 9/2002 |
| JP | 2003-017045 A | 1/2003 |
| JP | 2003-100298 A | 4/2003 |
| JP | 2006-172804 A | 6/2006 |
| JP | 2007-087881 A | 4/2007 |
| JP | 2009-146788 A | 7/2009 |
| JP | 2010-061996 A | 3/2010 |
| JP | 2010-061997 A | 3/2010 |
| JP | 2010-182548 A | 8/2010 |
| WO | 2010/056934 A1 | 5/2010 |
| WO | 2012/176895 A1 | 12/2012 |

OTHER PUBLICATIONS

Decision of Rejection issued in corresponding Japanese Patent Application No. 2012-556295 dated Sep. 6, 2016 with a partial translation of the Decision of Rejection.
Office Action issued in corresponding Taiwan Patent Application No. 101145162 dated Sep. 22, 2016 with a translation of the Search Report for Taiwan Patent Application No. 101145162.
Reference: Polymer Properties, Aldrich, date unknown.
Poly(acrylic acid), Sigma Aldrich, 2015.
Poly(N-vinyl acetamide), Polysciences Inc., 2015.
Office Action issued in corresponding Chinese Patent Application No. 2012800686138 dated Mar. 14, 2017.

* cited by examiner

BINDER RESIN FOR NONAQUEOUS SECONDARY BATTERY ELECTRODE, BINDER RESIN COMPOSITION FOR NONAQUEOUS SECONDARY BATTERY ELECTRODE SLURRY COMPOSITION FOR NONAQUEOUS SECONDARY BATTERY ELECTRODE, ELECTRODE FOR NONAQUEOUS SECONDARY BATTERY, AND NONAQUEOUS SECONDARY BATTERY

TECHNICAL FIELD

The present invention relates to a binder resin for a nonaqueous secondary battery electrode, a binder resin composition for a nonaqueous secondary battery electrode, a slurry composition for a nonaqueous secondary battery electrode, an electrode for a nonaqueous secondary battery, and a nonaqueous secondary battery.

This application is based upon and claims the benefit of priority of the prior Japanese Patent Application No. 2011-265040, filed on Dec. 2, 2011, the prior Japanese Patent Application No. 2012-39952, filed on Feb. 27, 2012, and the prior Japanese Patent Application No. 2012-92117, filed on Apr. 13, 2012, the entire contents of which are incorporated herein by reference.

BACKGROUND ART

Secondary batteries are used for consumer product applications requiring low electric power such as notebook type personal computers and mobile phones, and used as the storage battery of hybrid vehicles and electric vehicles. As the secondary batteries in these applications, a lithium-ion secondary battery which is a kind of nonaqueous secondary batteries (nonaqueous electrolyte secondary batteries) is mostly used due to a high energy density thereof.

Generally, as the electrode of a nonaqueous secondary battery, an electrode including a current collector such as a metal foil and a mixture layer provided on the current collector is used, and an active material and a conductive auxiliary are held by a binder resin in the mixture layer. The electrode is usually produced by mixing and kneading an active material, a conductive auxiliary, a binder resin, and a liquid medium (solvent) to prepare a slurry composition, coating the slurry composition on one or both sides of a current collector using a transfer roll or the like, removing the liquid medium by drying to form a mixture layer, and then performing compression molding using a roll press machine or the like if necessary. As the liquid medium, a liquid medium which disperses an active material and a conductive auxiliary, and dissolves a binder resin is used.

Hitherto, as a binder resin for a nonaqueous secondary battery electrode, for example, a fluorine resin such as polyvinylidene fluoride (PVDF) is used. PVDF is widely used since PVDF has advantages that rheological properties (thixotropy) are favorable when prepared as a slurry composition, and is electrochemically stable in the positive and negative electrodes.

However, when producing an electrode, a binder resin such as PVDF is dissolved in an organic solvent such as N-methyl-2-pyrrolidone (NMP) and used. Accordingly, problems such as a high recovery cost of solvent during drying and high environmental impact become apparent.

For that reason, an attempt to replace the organic solvent with water has recently been made, and PVDF is often used in a latex state dispersed in water for a negative electrode. In addition, as a binder resin for a negative electrode, a binder resin of aqueous dispersion system such as styrene-butadiene rubber (SBR) latex or carboxymethyl cellulose (CMC) serving as a thickener is used in some cases.

However, PVDF or SBR has a problem that the binding strength thereof is low. For that reason, improvement in battery performance such as the capacity of nonaqueous secondary battery, rate characteristics, and cycle characteristics is difficult in a case in which PVDF or SBR is used as a binder resin. For example, an increase in an amount of the conductive auxiliary is effective to improve the rate characteristics affected by the ease of electron transfer. The amount of binder is required to be reduced in order to increase the amount of the conductive auxiliary in the limited space of the battery. However, when the amount of binder is reduced, the adhesive property (binding property) between the current collector and the mixture layer or the adhesive property between the active materials deteriorates, and thus the mixture layer is peeled off from the current collector or the active material is lost from the mixture layer by the repeated charge and discharge, which results in the deterioration in battery performance.

To cope with such problems, a method in which various parameters are defined for the adhesive property (binding property) with respect to the current collector, or the like has been proposed. For example, Patent Document 1 discloses a method in which the second virial coefficient of the binder composition containing a polymer having a THF gel content of 5% or less and an organic solvent having NMP as the main component, which is measured by a static light scattering method, is set to equal to or lower than a specific value, thereby defining the radius of gyration of the polymer in a specific range. In addition, Patent Document 2 discloses a method in which two kinds of liquid medium dispersions of polymers which have the most frequent particle sizes of the primary particles in specific ranges, respectively, are mixed in specific blending amounts.

In addition, since a binder resin of aqueous dispersion system is distributed in the state containing water, there is a problem in that the transportation cost thereof increases. Moreover, there is a concern that the battery performance deteriorates since a fungicide is commonly added in the binder resin of aqueous dispersion system for the purpose of mold growth suppression.

Hence, it has been demanded that the binder resin of aqueous dispersion system is provided in the form of powder, but a latex resin has a composition exhibiting a low glass transition temperature in many cases, and thus there is a problem in that polymer chains are tangled when the latex resin is once powdered, and the latex resin hardly disperses in water again. As a result thereof, it has been difficult to provide the binder resin of aqueous dispersion system in the form of powder.

Consequently, a powder form binder resin that can be used by being dissolved or dispersed in water at the time of producing an electrode is required such that PVDF powder is used by being dissolved in NMP.

On the other hand, CMC can be used by being dissolved in water at the time of producing an electrode since CMC is a water-soluble polymer. However, the quality for each supply lot is hardly stable since CMC is derived from a natural product, as a result thereof, there is a problem in that the quality of the electrode to be obtained is also hardly stable, or the like.

Consequently, a binder resin which is an unnatural product suppliable in stable quality and is soluble in water is desired.

In addition, the binder resin is required to have high battery performance as well.

To cope with such problems, a polymer having an N-vinylacetamide unit has been reported as a binder resin.

For example, Patent Document 3 discloses a resin component containing poly(N-vinylacetamide) and a copolymer of ethylene oxide (EO) and propylene oxide (PO) as a binder resin. According to this binder resin, it is regarded that the binding property, battery characteristics under an environment from a low temperature to room temperature, and the conductivity of lithium ion are excellent.

However, the copolymer of EO and PO is dissolved into the electrolyte in some cases since the EO chain or the PO chain has a molecular structure similar to the composition of the electrolyte, and thus it is concerned that the battery performance is adversely affected.

Patent Document 4 discloses a positive electrode paste for a nonaqueous battery containing poly(N-vinylacetamide) as a polymer containing a repeating structural unit having an amide structure. Poly(N-vinylacetamide) is regarded to be capable of improving the performance required to a secondary battery (especially, a nonaqueous secondary battery) such as paste stability, binding property, and electrochemical stability. In addition, dissolution into the electrolyte also hardly occurs.

CITATION LIST

Patent Document

Patent Document 1: JP 2007-087881 A
Patent Document 2: JP 2003-100298 A
Patent Document 3: JP 2002-117860 A
Patent Document 4: JP 2002-251999 A

DISCLOSURE OF THE INVENTION

Problem to be Solved by the Invention

However, it cannot be said that the thixotropy of the slurry composition is sufficient in the methods described in Patent Documents 1 and 2 in which latex having a small particle size is used since the latex having a small particle size is a butadiene rubber or an acrylic rubber and swells to NMP.

Thixotropy of the slurry composition affects the storage stability of the slurry composition or battery performance. For example, when the thixotropy of the slurry composition is poor, the viscosity of the slurry composition does not change to a lower viscosity at the time of coating (when received shear stress) and thus coating cannot be favorably performed, or the viscosity does not recover to a higher viscosity after coating and thus the internal structure of the mixture layer changes during drying (uneven distribution due to the precipitation of the active material, or the like). As a result thereof, the adhesive property (binding property) between the current collector and the mixture layer, the smoothness (uniformity) of the mixture layer, or the like becomes poor, and thus the battery performance deteriorates.

In addition, as described in Patent Document 4, an electrode using poly(N-vinylacetamide) constituted by only a repeating structural unit having an amide structure as the binder resin is poor in flexibility.

The invention is made in view of such circumstances, and an object thereof is to provide a water-soluble binder resin for a nonaqueous secondary battery electrode by which a slurry composition having a favorable thixotropy is obtained and which can be distributed in the form of powder as well, a binder resin composition for a nonaqueous secondary battery electrode, a slurry composition for a nonaqueous secondary battery electrode, an electrode for a nonaqueous secondary battery, and a nonaqueous secondary battery.

In addition, another object of the invention is to provide a water-soluble binder resin for a nonaqueous secondary battery electrode by which an electrode excellent in flexibility can be formed, a binder resin composition for a nonaqueous secondary battery electrode, a slurry composition for a nonaqueous secondary battery electrode, an electrode for a nonaqueous secondary battery, and a nonaqueous secondary battery.

Means for Solving Problem

As a result of various investigations, the inventors have obtained the following findings.

When a binder resin is dissolved in water used as a liquid medium in the slurry preparing process at a concentration of 5% by mass which is the same level as the concentration in the slurry composition to form a resin solution, the particle size distribution can be measured in some cases if the measurement is performed by a dynamic light scattering method (DLS) even though the binder resin is completely dissolved at first glance. The sum (nanogel strength) of the scattering intensities observed in the particle size range of from 1 to 100 nm in this measurement by DLS shows a positive correlation with the thixotropy of the slurry composition.

In addition, as a result of intensive investigations, the inventors have found out that a polymer obtained by selecting and using a monomer having a specific structure in addition to an amide-based monomer to be the derivation source of an amide structural unit and copolymerizing these can form an electrode which is soluble in water and also excellent in flexibility.

Moreover, as a result of intensive investigations, the inventors have found out that as a binder resin, a polymer having an amide structural unit and a specific structural unit or a mixture of a polymer having an amide structural unit and a polymer having a specific structural unit can form an electrode which is soluble in water and also excellent in flexibility, and is also excellent in binding property, and thus a battery excellent in battery characteristics can be obtained.

A first aspect of the invention has the following features.

<1> A binder resin for a nonaqueous secondary battery electrode, which is used as a binder resin in a slurry composition for a nonaqueous secondary battery electrode including the binder resin, an active material, and water, in which the following Expression (i) is satisfied when a solution is formed by dissolving the binder resin in water at a concentration of 5% by mass and particle size distribution is measured by a dynamic light scattering method at 25° C.;

$$I_s \geq 30 \quad \text{(i)}$$

(in Expression (i), $I_s$ indicates a sum of scattering intensities observed in a particle size range of from 1 to 100 nm.)

<2> The binder resin for a nonaqueous secondary battery electrode according to <1>, which is used as the binder resin in the slurry composition for a nonaqueous secondary battery electrode further including a conductive auxiliary, in which the following Expression (ii) is satisfied when a slurry composition is formed by mixing 100 parts by mass of an active material, 5 parts by mass of a conductive auxiliary, 2 parts by mass of the binder resin, and 40 parts by mass of water, and viscoelasticity is measured at 25° C. by a shear rate program to measure viscoelasticity while changing a shear rate from 0.03 sec$^{-1}$ to 100 sec$^{-1}$, and then to measure viscoelasticity while changing a shear rate from 100 sec$^{-1}$ to 0.03 sec$^{-1}$;

$$\eta_{0.1}/\eta_{80} \geq 20 \qquad (ii)$$

(in Expression (ii), $\eta_{0.1}$ indicates a viscosity at a shear rate of 0.1 sec$^{-1}$ when viscoelasticity is measured while changing a shear rate from 100 sec$^{-1}$ to 0.03 sec$^{-1}$, and $\eta_{80}$ indicates a viscosity at a shear rate of 80 sec$^{-1}$ when viscoelasticity is measured while changing a shear rate from 100 sec$^{-1}$ to 0.03 sec$^{-1}$.)

<3> The binder resin for a nonaqueous secondary battery electrode according to <1> or <2>, which does not include a halogen element.

A second aspect of the invention has the following features.

<4> A binder resin for a nonaqueous secondary battery electrode including a polymer (B) having a structural unit represented by the following Formula (11) and at least one kind of structural units selected from the group consisting of a structural unit represented by the following Formula (12), a structural unit represented by the following Formula (13), and a structural unit derived from a compound represented by the following Formula (31).

[Chem. 1]

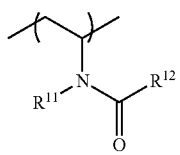

(11)

(In Formula (11), $R^{11}$ and $R^{12}$ each independently represent a hydrogen atom or a hydrocarbon group having from 1 to 5 carbon atoms.)

[Chem. 2]

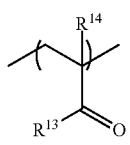

(12)

(In Formula (12), $R^{13}$ represents a hydrogen atom or a monovalent substituent, and $R^{14}$ represents a hydrogen atom or a methyl group.)

[Chem. 3]

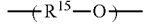

(13)

(In Formula (13), $R^{15}$ represents a divalent substituent.)

[Chem. 4]

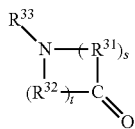

(31)

(In Formula (31), $R^{31}$ and $R^{32}$ each independently represent a divalent substituent, $R^{33}$ represents a monovalent substituent, and any of $R^{31}$ to $R^{33}$ has a vinyl group structure. s and t each independently represent 0 or 1.)

<5> The binder resin for a nonaqueous secondary battery electrode according to <4>, in which the structural unit represented by Formula (13) described above is derived from at least one kind of compounds selected from the group consisting of compounds represented by the following Formulas (14) to (16).

[Chem. 5]

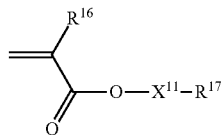

(14)

(In Formula (14), $R^{16}$ represents a hydrogen atom or a methyl group, $R^{17}$ represents a hydrogen atom or a monovalent substituent, and $X^{11}$ represents a divalent substituent having the structural unit represented by Formula (13) described above, and a divalent substituent including at least one kind selected from the group consisting of a polyalkylene glycol repeating unit, a polyester diol repeating unit, and a polycarbonate diol repeating unit.)

[Chem. 6]

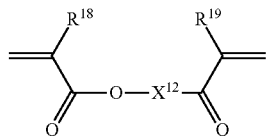

(15)

(In Formula (15), $R^{18}$ and $R^{19}$ each independently represent a hydrogen atom or a methyl group, and $X^{12}$ represents a divalent substituent having the structural unit represented by Formula (13) described above, and a divalent substituent including at least one kind selected from the group consisting of a polyalkylene glycol repeating unit, a polyester diol repeating unit, and a polycarbonate diol repeating unit.)

[Chem. 7]

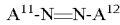

$$A^{11}\text{-}N\!=\!N\text{-}A^{12} \qquad (16)$$

(In Formula (16), $A^{11}$ and $A^{12}$ each independently represent a monovalent substituent having the structural unit represented by Formula (13) described above.)

<6> The binder resin for a nonaqueous secondary battery electrode according to <4> or <5>, in which the structural units represented by Formula (12) described above and/or Formula (13) described above are derived from a monomer (b) satisfying the following condition;

a glass transition temperature of a homopolymer of the monomer (b)≤a glass transition temperature of a homopolymer having the structural unit represented by Formula (11) described above as a structural unit.

<7> The binder resin for a nonaqueous secondary battery electrode according to any one of <4> to <6>, in which the structural units represented by Formula (12) described above and/or Formula (13) described above have an acidic group or a salt thereof.

<8> The binder resin for a nonaqueous secondary battery electrode according to any one of <4> to <7>, in which the polymer (B) is a polymer having the structural unit represented by Formula (11) described above, the structural unit represented by Formula (12) described above, and the structural unit represented by Formula (13) described above, or a polymer having the structural unit represented by Formula (11) described above and two or more different kinds of structural units represented by Formula (12) described above.

A third aspect of the invention has the following features.

<9> A binder resin for a nonaqueous secondary battery electrode including the following component (α) and/or component (β);

the component (α): a polymer (α) having a structural unit represented by the following Formula (21) and a structural unit represented by the following Formula (22), and the component (β): a mixture of a polymer (β1) having a structural unit represented by the following Formula (21) and a polymer (β2) having a structural unit represented by the following Formula (22).

[Chem. 8]

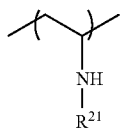

(21)

(In Formula (21), $R^{21}$ represents a hydrogen atom or a hydrocarbon group having from 1 to 5 carbon atoms.)

[Chem. 9]

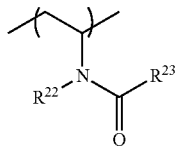

(22)

(In Formula (22), $R^{22}$ and $R^{23}$ each independently represent a hydrogen atom or a hydrocarbon group having from 1 to 5 carbon atoms.)

<10> The binder resin for a nonaqueous secondary battery electrode according to <9>, in which at least one of the polymer (α), the polymer (β1), and the polymer (β2) has a structural unit represented by the following Formula (23).

[Chem. 10]

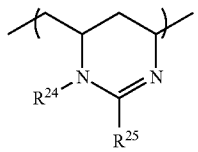

(23)

(In Formula (23), $R^{24}$ and $R^{25}$ each independently represent a hydrogen atom or a hydrocarbon group having from 1 to 5 carbon atoms.)

<11> The binder resin for a nonaqueous secondary battery electrode according to <9> or <10>, which is obtained by hydrolysis of the polymer (β2).

<12> The binder resin for a nonaqueous secondary battery electrode according to any one of <4> to <11>, in which there is no change in a mixture layer when flexibility of an electrode is evaluated by the following flexibility test.

(Flexibility Test)

The binder resin for a nonaqueous secondary battery electrode and water are mixed and kneaded. An active material is added thereto and mixed and kneaded, further, a conductive auxiliary is added thereto and mixed and kneaded in a case in which an electrode is a positive electrode, and then a viscosity thereof is adjusted with water to a viscosity at which coating is possible to obtain a slurry composition. A blending amount is set such that the binder resin for a nonaqueous secondary battery electrode is 2 parts by mass and the conductive auxiliary is 5 parts by mass with respect to 100 parts by mass of the active material.

An electrode having a mixture layer with a film thickness of from 20 to 200 μm formed on a current collector is obtained by coating the slurry composition thus obtained on the current collector and drying the coated slurry composition.

A specimen is prepared by cutting the electrode thus obtained into 3 cm by 5 cm.

A mandrel having a diameter of 8 mm is disposed on a current collector surface of the specimen thus obtained, one side of the specimen is fixed with tape, and a state of the mixture layer when the specimen is bent such that the current collector surface becomes an inside in an environment having a humidity of 10% or less is observed to evaluate flexibility of the electrode.

<13> A binder resin composition for a nonaqueous secondary battery electrode including the binder resin for a nonaqueous secondary battery electrode according to any one of <1> to <12>.

<14> A slurry composition for a nonaqueous secondary battery electrode including the binder resin for a nonaqueous secondary battery electrode according to any one of <1> to <12> or the binder resin composition for a nonaqueous secondary battery electrode according to <13>, an active material, and water.

<15> An electrode for a nonaqueous secondary battery including a current collector and a mixture layer provided on the current collector, in which the mixture layer includes the binder resin for a nonaqueous secondary battery electrode according to any one of <1> to <12> or the binder resin composition for a nonaqueous secondary battery electrode according to <13> and an active material.

<16> An electrode for a nonaqueous secondary battery including a current collector and a mixture layer provided on the current collector, in which the mixture layer is obtained by coating the slurry composition for a nonaqueous secondary battery electrode according to <14> on the current collector and drying the coated slurry composition.

<17> A nonaqueous secondary battery including the electrode for a nonaqueous secondary battery according to <15> or <16>.

Effect of the Invention

According to the invention, it is possible to provide a water-soluble binder resin for a nonaqueous secondary battery electrode by which a slurry composition having a favorable thixotropy is obtained and which can be distributed in the form of powder as well, a binder resin composition for a nonaqueous secondary battery electrode, a slurry composition for a nonaqueous secondary battery electrode, an electrode for a nonaqueous secondary battery, and a nonaqueous secondary battery.

In addition, according to the invention, it is possible to provide a water-soluble binder resin for a nonaqueous secondary battery electrode by which an electrode excellent in flexibility can be formed, a binder resin composition for a nonaqueous secondary battery electrode, a slurry composition for a nonaqueous secondary battery electrode, an electrode for a nonaqueous secondary battery, and a nonaqueous secondary battery.

BEST MODE(S) FOR CARRYING OUT THE INVENTION

Hereinafter, the invention will be described in detail.

Meanwhile, in the invention, the term "water-soluble" means that a binder resin dissolves in water, specifically, the solubility (that is, the extent to which the binder resin will dissolve in 100 g of water at 25° C.) thereof is 0.1 g or more with respect to 100 g of water at 25° C. The solubility is preferably 1 g or more.

In addition, in the present specification, the term "(meth)acryl" is the generic term for acryl and methacryl, the term "(meth)acrylate" is the generic term for acrylate and methacrylate, and the term "(meth)allyl" is the generic term for allyl and methallyl.

[First Aspect]

«Binder Resin for Nonaqueous Secondary Battery Electrode»

The binder resin for a nonaqueous secondary battery electrode (hereinafter, simply referred to as the binder resin) of the first aspect of the invention is a binder resin for a nonaqueous secondary battery electrode used as the binder resin in a slurry composition for a nonaqueous secondary battery electrode containing the binder resin, an active material, and water.

The binder resin of the first aspect of the invention satisfies the following Expression (i) when a solution is obtained by dissolving the binder resin in the water at a concentration of 5% by mass, and the particle size distribution thereof is measured by a dynamic light scattering method at 25° C.

$$I_s \geq 30 \qquad (i)$$

(in Expression (i), $I_s$ indicates the sum of the scattering intensities observed in a particle size range of from 1 to 100 nm.)

The concentration of 5% by mass is an average value as the binder resin concentration in the slurry composition used in the production of the electrode for a nonaqueous secondary battery. In other words, it can be said that the value measured in the particle size distribution measurement reflects the state of the binder resin in the slurry composition.

In a case in which a binder resin exhibits a significantly high solubility with respect to water is used as the binder resin, $I_s$ cannot be measured due to the insufficient strength, but when the solubility is lower, $I_s$ can be measured although the binder resin is dissolved at first glance. It is thought that this is because the polymer molecule is folded to form an aggregated shape, and the size of this lump is detected as the particle size by DLS.

Moreover, the value of $I_s$ in Expression (i) above is correlated with the thixotropy of the slurry composition obtained by mixing the binder resin with the active material and water, and the thixotropy of the slurry composition to be obtained increases as the value of $I_s$ of the binder resin is higher.

In a case in which the value of $I_s$ is 30 or more, that is, the absolute value of the scattering intensity of the particles having a particle size of from 1 to 100 nm is 30 or more, the mixture layer to be formed is sufficiently uniform when an electrode for a nonaqueous secondary battery is formed using the slurry composition, and thus a nonaqueous secondary battery using the electrode exhibits sufficiently excellent battery characteristics.

On the other hand, in a case in which the value of $I_s$ is less than 30, for example, $I_s$ cannot be measured since the binder resin is completely dissolved or the scattering intensity of the particle of more than 100 nm is great, the uniformity of the slurry composition to be obtained is insufficient.

$I_s$ is preferably 40 or more and more preferably 50 or more.

Meanwhile, in Patent Document 1 mentioned in the background art, the radius of gyration of the polymer is measured using a solution diluted with NMP or n-heptane by a static light scattering method, the concentration thereof is as significantly low as from 0.2 to 0.8% by mass. For that reason, the radius of gyration is greatly different from the particle size of the polymer in the slurry composition. In addition, in Patent Document 2, a polymer latex is produced using water as a polymerization medium by an emulsion polymerization, thereafter, water is substituted with NMP, thereby obtaining a binder composition. The most frequent particle size of the primary particles is measured before the substitution with NMP, that is, in the latex state, and thus is greatly different from the particle size of the polymer in the slurry composition.

The "latex" and the "solution" can be distinguished from each other by whether the particle size is observed or not in the laser diffraction type particle size distribution measurement. In the case of the "solution", the particle size is not observed in the laser diffraction type particle size distribution measurement.

The value of $I_s$ can be adjusted by the solubility with respect to water, the composition of the constitutional unit, the mass average molecular weight, the stereoregularity, the crosslink density, or the like of the polymer (A) contained in the binder resin.

For example, in a case in which a certain polymer is used, $I_s$ increases if a polymer exhibiting a higher solubility with respect to water than the polymer is blended when the scattering intensity of the particle of more than 100 nm is great and $I_s$ is less than 30.

In addition, in a case in which the binder resin is completely dissolved and thus $I_s$ cannot be measured, the solubility with respect to water decreases as the mass average molecular weight is greater, and thus $I_s$ tends to increase.

The binder resin of the first aspect of the invention preferably satisfies the following Expression (ii) when a slurry composition is obtained by mixing 100 parts by mass of an active material, 5 parts by mass of a conductive auxiliary, 2 parts by mass of the binder resin, and 40 parts by mass of water, and the viscoelasticity thereof is measured at 25° C. by a shear rate program in which the viscoelasticity is measured while changing the shear rate from 0.03 sec$^{-1}$ to 100 sec$^{-1}$ and then the viscoelasticity is measured while changing the shear rate from 100 sec$^{-1}$ to 0.03 sec$^{-1}$.

$$\eta_{0.1}/\eta_{80} \geq 20 \quad \text{(ii)}$$

(in Expression (ii), $\eta_{0.1}$ indicates the viscosity at the shear rate of 0.1 sec$^{-1}$ when the viscoelasticity is measured while changing the shear rate from 100 sec$^{-1}$ to 0.03 sec$^{-1}$, and $\eta_{80}$ indicates the viscosity at the shear rate of 80 sec$^{-1}$ when the viscoelasticity is measured while changing the shear rate from 100 sec$^{-1}$ to 0.03 sec$^{-1}$.)

The active material used in the preparation of the slurry composition is lithium cobalt oxide (LCO) in the case of the positive electrode (hereinafter, also simply referred to as the positive electrode) and graphite in the case of the negative electrode (hereinafter, also simply referred to as the negative electrode). In addition, the conductive auxiliary is acetylene black.

The viscoelasticity of the slurry composition may be measured using either a stress control type rheometer or a strain control type rheometer, but a stress control type rheometer is preferable in consideration of the viscosity of the slurry composition (slurry viscosity). Conditions such as a plate used for the measurement is not particularly limited, but it is preferable to use a cone plate having φ40 mm and an angle of 2° and set the gap to 69 mm in terms of coping with a wide range of slurry viscosity. The temperature for measurement is set to 25° C.

The shear rate program first measures the viscoelasticity of the slurry composition while changing the shear rate from 0.03 sec$^{-1}$ to 100 sec$^{-1}$. Thereafter, the viscoelasticity of the slurry composition is measured again while changing the shear rate from 100 sec$^{-1}$ to 0.03 sec$^{-1}$.

It indicates that the thixotropy of the slurry composition is higher as the value of $\eta_{0.1}/\eta_{80}$ is greater. It can be said that the thixotropy of the slurry composition is favorable when the value of $\eta_{0.1}/\eta_{80}$ is 20 or more.

The active material or the conductive auxiliary is precipitated with time and thus the mixture layer becomes ununiform in a case in which the value of $\eta_{0.1}/\eta_{80}$ is less than 20.

The upper limit value of $\eta_{0.1}/\eta_{80}$ is not particularly limited, but is preferably 500 or less in terms of preventing the slurry composition from being rapidly solidified after the slurry composition is coated.

The value of $\eta_{0.1}/\eta_{80}$ can be adjusted by the solubility with respect to water, the composition of the constitutional unit, the mass average molecular weight, the stereoregularity, the crosslink density, or the like of the polymer (A) contained in the binder resin.

For example, in the case of the slurry composition using a certain polymer, $\eta_{0.1}/\eta_{80}$ increases if a polymer exhibiting a lower solubility with respect to water than the polymer is blended when the value of $\eta_{0.1}/\eta_{80}$ is less than 20.

In addition, in the case of the slurry composition using a certain polymer, the solubility with respect to water increases if a polymer having a lower mass average molecular weight or a lower viscosity average molecular weight is blended when the value of $\eta_{0.1}/\eta_{80}$ is more than 500, and thus $\eta_{0.1}/\eta_{80}$ tends to decrease.

(Polymer (A))

A polymer (A) is a polymer contained in the binder resin of the first aspect of the invention, and imparts a proper viscosity to the slurry composition and the stability of the slurry composition or battery characteristics.

In the first aspect of the invention, the binder resin is required to have a water solubility enough to dissolve in water used in the preparation of the slurry composition for a nonaqueous secondary battery electrode so as to form a solution having a concentration of 5% by mass or more since the binder resin is formed to a solution having a concentration of 5% by mass and then the particle size distribution thereof is measured by DLS. Consequently, the polymer (A) itself which constitutes the binder resin also has a water solubility enough to dissolve in water used in the preparation of the slurry composition for a nonaqueous secondary battery electrode so as to form a solution having a concentration of 5% by mass or more.

The polymer (A) is not particularly limited as long as the polymer (A) is a polymer (hereinafter, referred to as the synthetic polymer) which is chemically synthesized using a low molecular weight compound as the starting material except a natural polymer such as xanthan gum, mannan, and a salt thereof or a semi-synthetic polymer such as carboxymethyl cellulose (CMC), methyl cellulose, hydroxymethyl cellulose, and a salt thereof. The synthetic polymer is preferable since the synthetic polymer does not use the natural product or the natural product as the starting material and thus the quality for each supply lot is relatively stable.

The polymer (A) may have a constitutional unit derived from a monomer (hereinafter, referred to as the monomer (a1)) containing an acidic group and/or a salt thereof. Examples of the acidic group may include a carboxyl group, a sulfonic acid group, and a phosphoric acid group. Examples of the salt of the acidic groups may include an alkali metal salt, an alkaline earth metal salt, an ammonium salt, a substituted ammonium salt of the acidic groups.

Examples of the alkali metal may include lithium, sodium, and potassium.

Examples of the alkaline earth metal may include magnesium and calcium.

Examples of the substituted ammonium may include an alicyclic ammonium, a saturated cyclic ammonium, and an unsaturated cyclic ammonium.

Examples of the monomer (a1) may include a carboxyl group-containing monovinyl monomer such as (meth)acrylic acid, (anhydrous) itaconic acid, fumaric acid, crotonic acid, and (anhydrous) maleic acid, and a salt thereof; a sulfonic acid group-containing monovinyl monomer such as (meth)allyl sulfonic acid, (meth)allyloxybenzenesulfonic acid, and styrenesulfonic acid, and a salt thereof; and a phosphoric acid group-containing monovinyl monomer such as 2-(meth)acryloyloxyethyl acid phosphate, 2-(meth)acryloyloxyethyl acid phosphate.monoethanolamine, diphenyl ((meth)acryloyloxyethyl) phosphate, (meth)acryloyloxypropyl acid phosphate, 3-chloro-2-acid.phosphooxypropyl (meth)acrylate, acid.phosphooxypolyoxyethylene glycol mono(meth)acrylate, and acid.phosphooxypolyoxypropylene glycol (meth)acrylate, and a salt thereof.

The polymer (A) may have a constitutional unit derived from a monomer (hereinafter, referred to as the monomer (a2)) containing a hydroxyl group, an ether bond, or an amino group except the monomer (a1).

Examples of the monomer (a2) may include a hydroxyl group-containing monovinyl monomer such as 2-hydroxyethyl (meth)acrylate, 3-hydroxypropyl (meth)acrylate, 2-hydroxy-n-propyl(meth)acrylate, and 4-hydroxy-n-butyl (meth)acrylate; an ether bond-containing monovinyl monomer such as 2-ethoxyethyl (meth)acrylate, 1-ethoxyethyl (meth) acrylate, butoxyethylene glycol (meth)acrylate, methoxypolyethylene glycol (meth)acrylate, and tetrahydrofurfuryl (meth)acrylate; and an amino group-containing monovinyl monomer such as (meth)acrylamide, 2-dimethylaminoethyl (meth)acrylate, N-vinylformamide, N-vinylacetamide, N-vinylpyrrolidone, N-vinyl-ε-caprolactam, and N-vinylcarbazole.

Meanwhile, the "vinyl monomer" is a compound having at least one α-methyl vinyl group in which the hydrogen atom bonded to a vinyl group or a carbon atom at the α-position of the vinyl group is substituted with a methyl group.

One kind of these monomer (a1) and monomer (a2) may be used singly, or two or more kinds thereof may be used concurrently.

The total content of the monomer (a1) unit and the monomer (a2) unit in the polymer (A) is not particularly limited as long as the polymer (A) dissolves in water, but is preferably 20% by mole or more, more preferably 30% by mole or more, and particularly preferably 40% by mole or more in the total (100% by mole) of all the constitutional units constituting the polymer (A). The solubility of the polymer (A) in water is particularly improved when the polymer (A) is a polymer (homopolymer or copolymer) containing the monomer (a1) unit and the monomer (a2) unit at a content of 40% by mole or more in total, and thus a mixture layer excellent in the adhesive property (binding property) with respect to the current collector, or the like can be formed.

The upper limit of the total content of the monomer (a1) unit and the monomer (a2) unit is not particularly limited, and may be 100% by mole.

The content of each of the monomer (a1) unit and the monomer (a2) unit is not particularly limited, and can be appropriately set in a range of from 0 to 100% by mole. In addition, in a case in which a unit (arbitrary unit) other than the monomer (a1) unit and the monomer (a2) unit is contained in the polymer (A), the content of each of the monomer (a1) unit and the monomer (a2) unit can be appropriately set in consideration of the balance with the arbitrary unit.

Examples of the arbitrary unit may include a unit derived from a monofunctional monomer (hereinafter, referred to as the monomer (a3)) having one polymerizable functional group (for example, a vinyl group, an α-methyl vinyl group, an allyl group, or the like) or a multifunctional monomer (hereinafter, referred to as the monomer (a4)) having two or more polymerizable functional groups as the arbitrary monomer other than the monomer (a1) and the monomer (a2). Particularly, the polymer (A) has a crosslinked structure when the monomer (a4) is used, and thus the mechanical properties thereof are improved.

Examples of the monomer (a3) may include a (meth)acrylate such as methyl (meth)acrylate, propyl (meth)acrylate, butyl (meth)acrylate, and hexyl (meth)acrylate; a vinyl ketone such as methyl vinyl ketone and isopropyl methyl ketone; a vinyl cyanide monomer such as acrylonitrile, methacrylonitrile, α-cyanoacrylate, dicyanovinylidene, and fumaronitrile ethyl; a vinyl halide monomer such as vinyl chloride, vinyl bromide, and vinylidene chloride; an aromatic vinyl monomer such as styrene and α-methyl styrene; a maleimide such as maleimide and phenyl maleimide; and vinyl acetate.

One kind of these monomers (a3) may be used singly, or two or more kinds thereof may be used concurrently.

The content of the monomer (a3) unit in the polymer (A) is preferably from 0 to 10% by mole and more preferably from 0.01 to 5% by mole in the total (100% by mole) of all the constitutional units constituting the polymer (A).

Examples of the monomer (a4) may include ethylene glycol di(meth)acrylate and triethylene glycol di(meth)acrylate.

One kind of these monomers (a4) may be used singly, or two or more kinds thereof may be used concurrently.

The content of the monomer (a4) unit in the polymer (A) is preferably from 0 to 10% by mole and more preferably from 0.01 to 5% by mole in the total (100% by mole) of all the constitutional units constituting the polymer (A).

The polymer (A) can be produced by polymerizing the monomer (a1) or the monomer (a2) singly or the monomer (a1) and/or the monomer (a2) and the arbitrary monomer (monomer (a3) or monomer (a4)) using a known polymerization method. The polymerization method of these is not particularly limited, and is selected from a solution polymerization, a suspension polymerization, an emulsion polymerization, and the like depending on the kind of the monomer, the solubility of the polymer to be produced, or the like.

For example, the aqueous solution polymerization can be selected in a case in which each of the monomers is soluble in water and the affinity of the polymer to be produced for water is high. The aqueous solution polymerization is a polymerization method in which a polymer is obtained by dissolving a monomer and a water-soluble polymerization initiator in water and heating the resultant solution from the exterior or by the polymerization heat.

In addition, the suspension polymerization, the emulsion polymerization, or the like can be selected in a case in which the solubility of each of the monomers in water is low. The emulsion polymerization is a polymerization method in which a polymer is obtained by adding a monomer, an emulsifier, a water-soluble polymerization initiator, and the like into water, and heating the resultant solution under stirring.

In addition, the initiator used in the polymerization is not particularly limited, and an arbitrary initiator selected from a thermopolymerization initiator, a photopolymerization initiator, and the like can be used depending on the polymerization method. Specific examples thereof may include an azo compound and a peroxide.

In addition, a chain transfer agent may be present in the polymerization system.

The temperature and the time of the polymerization are not particularly limited, but are preferably from 0 to 200° C. and from 0.1 to 100 hours, respectively, from the viewpoint of the progress of the polymerization reaction, the stability of the compound, and the operability.

Moreover, the polymer (A) in powder form is obtained by removing water by filtration, centrifugation, heat drying, vacuum drying, and combination thereof.

The molecular weight of the polymer (A) is not particularly limited, but is preferably from 10,000 to 20,000,000, more preferably from 100,000 to 15,000,000, and particularly preferably from 500,000 to 10,000,000 as the viscosity average molecular weight (Mv). The binding property is enhanced when the molecular weight is equal to or higher than the lower limit value, the water solubility increases when the molecular weight is equal to or lower than the upper limit value, and collectively the dispersibility of the conductive auxiliary becomes more favorable.

The viscosity average molecular weight (Mv) is calculated as the viscosity conversion molecular weight from the viscosity of an aqueous solution of the polymer (A) using poly(N-vinylformamide) (hereinafter, referred to as PNVF) as the standard substance. The example of the calculation method of the viscosity average molecular weight is presented below.

Method of Calculating Viscosity Average Molecular Weight:

The intrinsic viscosity $[\eta]$ is calculated from the reduced viscosity ($\eta sp/C$) of an aqueous solution of the polymer (A) and the Huggins Equation ($\eta sp/C=[\eta]+K'[\eta]^2 C$). Meanwhile, the "C" in the equation is the concentration (g/dL) of the polymer (A) in the aqueous solution of the polymer (A). The method for the measurement of the reduced viscosity of the aqueous solution of the polymer (A) is described below.

The viscosity average molecular weight ("M" in the equation) is calculated from the intrinsic viscosity [η] thus obtained and the Mark-Houwink Equation ([η]=KMa).

Meanwhile, the parameters of PNVF in 1 N saline solution are K=8.31×10$^{-5}$, a=0.76, and K'=0.31.

Method of Measuring Reduced Viscosity:

First, the polymer (A) is dissolved in 1 N saline solution such that a concentration of the polymer (A) is 0.1% by mass, thereby obtaining an aqueous solution of the polymer (A). The flow time ($t_1$) of the aqueous solution of the polymer (A) thus obtained at 25° C. is measured using an Ostwald viscometer.

Separately, as the blank, the flow time ($t_0$) of 1 N saline solution at 25° C. is measured using an Ostwald viscometer.

The reduced viscosity is calculated from the flow times thus obtained by the following Expression (iii).

$$\eta sp/C = \{(t_1/t_0) - 1\}/C \quad \text{(iii)}$$

(in Expression (iii), C is the concentration (g/dL) of the polymer (A) in the aqueous solution of the polymer (A).)

The polymer (A) contained in the binder resin of the first aspect of the invention may be one kind or two or more kinds.

In addition, the binder resin of the first aspect of the invention preferably does not contain a halogen element. In a case in which the binder resin contains a halogen element, a hydrogen halide such as hydrogen fluoride is generated by the electrochemical reaction between the electrolyte and the binder resin during charge and discharge and thus the corrosion of the active material or the like is concerned in a nonaqueous secondary battery equipped with an electrode produced using this binder resin.

The generation of hydrogen halide during charge and discharge is suppressed and thus the corrosion of the active material hardly proceeds when the binder resin does not contain a halogen element.

Here, the expression "not containing a halogen element" means that a polymer containing a halogen element (for example, a fluorine-containing polymer such as PVDF, polytetrafluoroethylene, and polypentafluoropropylene, and the like) is less than 50 ppm by mass in 100% by mass of the binder resin.

Examples of the form of the binder resin may include a powder form and a dope form in which the binder resin is dissolved or dispersed in a solvent such as water or the like. A powder form is preferable during storage and distribution from the viewpoint of stability during storage and distribution, economical efficiency, and ease of handling.

The binder resin of the first aspect of the invention described above satisfies Expression (i) above, and thus a slurry composition exhibiting favorable thixotropy is obtained, moreover the binder resin can be distributed in the form of powder. The storage stability of the slurry composition, or the uniformity and the adhesive property (binding property) of the mixture layer are favorable as the thixotropy of the slurry composition is favorable, and thus the battery characteristics are improved.

«Binder Resin Composition for Nonaqueous Secondary Battery Electrode»

The binder resin composition for a nonaqueous secondary battery electrode (hereinafter, simply referred to as the binder resin composition) of the first aspect of the invention contains the binder resin of the first aspect of the invention described above.

Examples of the form of the binder resin composition may include a powder form and a dope form in which the binder resin composition is dissolved or dispersed in a solvent such as water or the like. A powder form is preferable during storage and distribution from the viewpoint of stability during storage and distribution, economical efficiency, and ease of handling.

The content of the binder resin in the powder form binder resin composition is preferably 50% by mass or more, more preferably 80% by mass or more, and may be 100% by mass. The effect of the invention is remarkably exerted when the content is equal to or higher than the lower limit value.

The binder resin composition of the first aspect of the invention may contain a binder resin (another binder resin) other than the binder resin of the first aspect of the invention, or an additive such as a viscosity modifier, a binding property improver, and a dispersant if necessary in an amount in which the battery performance is not affected.

Examples of another binder resin may include a vinyl acetate copolymer, a styrene-butadiene block copolymer (SBR), an acrylic acid-modified SBR resin (SBR-based latex), and an acrylic rubber-based latex.

The viscosity modifier improves the coating properties of the binder resin. Examples of the viscosity modifier may include a cellulose-based polymer such as carboxymethyl cellulose, methyl cellulose, and hydroxypropyl cellulose, and an ammonium salt thereof; a salt of poly(meth)acrylic acid such as sodium poly(meth)acrylate; polyvinyl alcohol, polyethylene oxide, polyvinylpyrrolidone, a copolymer of acrylic acid or a salt of acrylic acid and vinyl alcohol, maleic anhydride, a copolymer of maleic acid or fumaric acid and vinyl alcohol, modified polyvinyl alcohol, modified polyacrylic acid, polyethylene glycol, and polycarboxylic acid.

It is desirable that an additive be not added if possible since an additive such as the viscosity modifier finally remains in the electrode, and an additive having electrochemical stability is preferably used in the case of adding an additive.

The content of the additive is preferably 50% by mass or less when the binder resin composition is set to 100% by mass in a case in which the binder resin composition contains an additive such as the viscosity modifier. However, it is more preferable that the content of the additive be lower from the viewpoint of enhancing the battery performance.

The binder resin composition of the first aspect of the invention preferably satisfies the following Expression (i) when a solution is obtained by dissolving the binder resin composition in water at a concentration of 5% by mass, and the particle size distribution thereof is measured by a dynamic light scattering method at 25° C.

$$I_s \geq 30 \quad \text{(i)}$$

(in Expression (i), $I_s$ indicates the sum of the scattering intensities observed in a particle size range of from 1 to 100 nm.)

Moreover, the binder resin composition of the first aspect of the invention preferably satisfies the following Expression (ii) when a slurry composition is obtained by mixing 100 parts by mass of an active material, 5 parts by mass of a conductive auxiliary, 2 parts by mass of the binder resin composition, and 40 parts by mass of water, and the viscoelasticity thereof is measured at 25° C. by a shear rate program in which the viscoelasticity is measured while changing the shear rate from 0.03 sec$^{-1}$ to 100 sec$^{-1}$ and then the viscoelasticity is measured while changing the shear rate from 100 sec$^{-1}$ to 0.03 sec$^{-1}$.

$$\eta_{0.1}/\eta_{80} \geq 20 \quad \text{(ii)}$$

(in Expression (ii), $\eta_{0.1}$ indicates the viscosity at the shear rate of 0.1 sec$^{-1}$ when the viscoelasticity is measured while changing the shear rate from 100 sec$^{-1}$ to 0.03 sec$^{-1}$, and $\eta_{80}$ indicates the viscosity at the shear rate of 80 sec$^{-1}$ when the viscoelasticity is measured while changing the shear rate from 100 sec$^{-1}$ to 0.03 sec$^{-1}$.)

The binder resin composition can be produced by a known method. For example, the binder resin composition is obtained by the powder mixing of the powder form binder resin of the first aspect of the invention and a powder form additive if necessary, or by dispersing the powder form binder resin of the first aspect of the invention and a powder form additive if necessary in water.

The binder resin composition of the first aspect of the invention described above contains the binder resin of the first aspect of the invention described above, and thus a slurry composition exhibiting favorable thixotropy is obtained, moreover the binder resin composition can be distributed in the form of powder. The storage stability of the slurry composition, or the uniformity and the adhesive property (binding property) of the mixture layer becomes more favorable as the thixotropy of the slurry composition is more favorable, and thus the battery characteristics are improved.

«Slurry Composition for Nonaqueous Secondary Battery Electrode»

The slurry composition for a nonaqueous secondary battery electrode (hereinafter, simply referred to as the slurry composition) of the first aspect of the invention contains the binder resin of the first aspect of the invention or the binder resin composition of the first aspect of the invention described above, an active material, and water. In other words, the slurry composition of the first aspect of the invention is a slurry composition containing a binder resin, an active material, and water, and a slurry composition for a nonaqueous secondary battery electrode satisfying the following Expression (i) when a solution is obtained by dissolving the binder resin in water at a concentration of 5% by mass, and the particle size distribution thereof is measured by a dynamic light scattering method at 25° C.

$$I_s \geq 30 \quad \text{(i)}$$

(in Expression (i), $I_s$ indicates the sum of the scattering intensities observed in a particle size range of from 1 to 100 nm.)

In addition, the slurry composition of the first aspect of the invention preferably further contains a conductive auxiliary, and preferably satisfies the following Expression (ii) when a slurry composition is obtained by mixing 100 parts by mass of an active material, 5 parts by mass of a conductive auxiliary, 2 parts by mass of a binder resin, and 40 parts by mass of water, and the viscoelasticity thereof is measured at 25° C. by a shear rate program in which the viscoelasticity is measured while changing the shear rate from 0.03 sec$^{-1}$ to 100 sec$^{-1}$ and then the viscoelasticity is measured while changing the shear rate from 100 sec$^{-1}$ to 0.03 sec$^{-1}$.

$$\eta_{0.1}/\eta_{80} \geq 20 \quad \text{(ii)}$$

(in Expression (ii), $\eta_{0.1}$ indicates the viscosity at the shear rate of 0.1 sec$^{-1}$ when the viscoelasticity is measured while changing the shear rate from 100 sec$^{-1}$ to 0.03 sec$^{-1}$, and $\eta_{80}$ indicates the viscosity at the shear rate of 80 sec$^{-1}$ when the viscoelasticity is measured while changing the shear rate from 100 sec$^{-1}$ to 0.03 sec$^{-1}$.)

The binder resin used for the slurry composition of the first aspect of the invention is the binder resin of the first aspect of the invention described above, and thus the detailed description thereof will be omitted here. In addition, the binder resin composition used for the slurry composition of the first aspect of the invention is the binder resin composition of the first aspect of the invention described above, and thus the detailed description thereof will be omitted here.

The content of the binder resin in the slurry composition of the first aspect of the invention is not particularly limited, but is preferably from 0.01 to 15% by mass and more preferably from 0.1 to 10% by mass in the total solid matters (all components except the solvent) of the slurry composition. The adhesive property (binding property) between the current collector and the mixture layer formed using the slurry composition is enhanced when the content is 0.01% by mass or more. An active material or an arbitrary component (for example, a conductive auxiliary) to be described below can be sufficiently contained when the content is 15% by mass or less, and thus the battery characteristics are improved.

The active material used in the slurry composition of the first aspect of the invention is not particularly limited, and a known material can be used depending on what kind of nonaqueous secondary battery the electrode to be produced using the slurry composition is for.

For example, in the case of a lithium-ion secondary battery, as the active material of the positive electrode (positive electrode active material), a material which exhibits a higher potential (with respect to metal lithium) than the active material of the negative electrode (negative electrode active material) and can absorb and desorb lithium ions during charge and discharge is used.

Specific examples of the positive electrode active material may include a lithium-containing metal composite oxide containing at least one or more metals selected from iron, cobalt, nickel, manganese, and vanadium and lithium, and a conductive polymer such as polyarylenevinylene and a derivative thereof such as polyaniline, polythiophene, polyacetylene and a derivative thereof, poly-p-phenylene and a derivative thereof, polypyrrole and a derivative thereof, polythienylene and a derivative thereof, polypyridindiyl and a derivative thereof, and polyisothianaphthenylene and a derivative thereof. As the conductive polymer, a polymer of aniline derivative soluble in an organic solvent is preferable. One kind of these positive electrode active materials may be used singly, or two or more kinds thereof may be used concurrently.

Examples of the negative electrode active material may include a carbon material such as graphite, amorphous carbon, carbon fiber, coke, and activated carbon; and a composite of the carbon material and a metal such as silicon, tin, and silver or an oxide thereof. One kind of these negative electrode active materials may be used singly, or two or more kinds thereof may be used concurrently.

In a lithium-ion secondary battery, it is preferable to use a lithium-containing metal composite oxide as the positive electrode active material and graphite as the negative electrode active material. The voltage of the lithium-ion secondary battery can be increased to, for example, 4 V or higher by such combination.

The content of the active material in the slurry composition of the first aspect of the invention is not particularly limited, but is preferably from 80 to 99.9% by mass and more preferably from 85 to 99% by mass in the total solid matters (all components except the solvent) of the slurry composition. The function as the mixture layer is sufficiently exerted when the content is 80% by mass or more. The adhesive property between the mixture layer and the current collector is favorable when the content is 99.9% by mass or less.

As the solvent contained in the slurry composition of the first aspect of the invention, at least water is used, but a mixed solvent of water and an organic solvent may be used. As the organic solvent, a solvent easily and uniformly dissolving or dispersing the binder resin is selected, and examples thereof may include NMP, an ester solvent (ethyl acetate, n-butyl acetate, butyl cellosolve acetate, butyl carbitol acetate, and the like), a glyme solvent (diglyme, triglyme, tetraglyme, and the like), an alcohol solvent (methanol, ethanol, isopropanol, and the like), and a ketone solvent (acetone, methyl ethyl ketone, methyl isobutyl ketone, and the like). One kind of these organic solvents may be used singly, or two or more kinds thereof may be used concurrently.

Examples of the mixed solvent may include a mixed solvent of water and an alcohol solvent, a mixed solvent of water, NMP, and an ester solvent, and a mixed solvent of water, NMP, and a glyme solvent.

However, it is preferable to use water singly as the solvent since the organic solvent has high environmental impact.

The content of the solvent in the slurry composition of the first aspect of the invention may be the minimum amount required to maintain the state that the binder resin is dissolved at room temperature, but is preferably from 5 to 50% by mass and more preferably from 10 to 40% by mass. The content of the solvent in the slurry composition is determined in consideration of the viscosity of the slurry composition at which coating on the current collector is easily performed when the mixture layer is formed using the slurry composition.

The slurry composition of the first aspect of the invention may contain a component (arbitrary component) other than a binder resin, an active material, and a solvent if necessary.

Examples of the arbitrary component may include a conductive auxiliary, an antioxidant, and a thickener.

Particularly, in a case in which the slurry composition of the first aspect of the invention is a slurry composition to form a mixture layer of the positive electrode or a slurry composition to form a mixture layer of the negative electrode containing metal fine particles such as silicon, the slurry composition preferably contains a conductive auxiliary. By containing a conductive auxiliary, the electrical contact between the active materials or the active material and the metal fine particles can be improved and thus the battery performance such as the discharge rate characteristics of the nonaqueous secondary battery can be enhanced.

Examples of the conductive auxiliary may include acetylene black, carbon black, graphite, channel black, fullerenes, carbon nanotubes, and graphene. One kind of these conductive auxiliaries may be used singly, or two or more kinds thereof may be used concurrently.

The content of the conductive auxiliary in the slurry composition of the first aspect of the invention is not particularly limited, but is preferably from 0.01 to 10% by mass and more preferably from 0.1 to 7% by mass in the total solid matters (all components except the solvent) of the slurry composition. The battery performance is enhanced when the content is 0.01% by mass or more. The adhesive property between the mixture layer and the current collector is favorable when the content is 10% by mass or less.

The slurry composition of the first aspect of the invention can be produced by mixing and kneading a binder resin, an active material, a solvent, and if necessary an arbitrary component (for example, a conductive auxiliary). The mixing and kneading can be performed by a known method.

At the time of the preparation of slurry, the binder resin of the first aspect of the invention may be used in the form of powder as it is or may be used as a resin solution by being dissolved in a solvent in advance before being mixed with the active material or the arbitrary component (for example, a conductive auxiliary).

The slurry composition of the first aspect of the invention described above contains the binder resin of the first aspect of the invention or the first binder resin composition of the invention, and thus exhibits favorable thixotropy. By virtue of this, the storage stability of the slurry composition or the uniformity and the adhesive property (binding property) of the mixture layer are favorable, and thus the battery characteristics are improved.

«Electrode for Nonaqueous Secondary Battery»

The electrode for a nonaqueous secondary battery (hereinafter, simply referred to as the electrode) of the first aspect of the invention includes a current collector and a mixture layer provided on the current collector, and the mixture layer contains the binder resin of the first aspect of the invention described above and an active material.

The current collector may be any material having conductivity, and examples thereof may include a metal such as aluminum, copper, and nickel.

The shape of the current collector can be determined depending on the shape of the desired battery. Examples thereof may include a thin film shape, a reticular shape, and a fibrous shape, and the thin film shape is preferable among them.

The thickness of the current collector is not particularly limited, but is preferably from 5 to 30 µm and more preferably from 8 to 25 µm.

The binder resin used in the mixture layer is the binder resin of the first aspect of the invention described above, and thus the detailed description thereof is omitted here.

The content of the binder resin in the mixture layer is not particularly limited, but is preferably from 0.01 to 15% by mass and more preferably from 0.1 to 10% by mass. The adhesive property (binding property) between the mixture layer formed using the slurry composition of the first aspect of the invention described above and the current collector is enhanced when the content is 0.01% by mass or more. An active material or an arbitrary component (for example, a conductive auxiliary) can be sufficiently contained when the content is 15% by mass or less, and thus the battery characteristics are improved.

Examples of the active material used for the mixture layer may include the same active materials as those exemplified previously in the description of the slurry composition of the first aspect of the invention described above.

The content of the active material in the mixture layer is not particularly limited, but is preferably from 80 to 99.9% by mass and more preferably from 85 to 99% by mass. The function as the mixture layer is sufficiently exerted when the content is 80% by mass or more. The adhesive property (binding property) between the mixture layer and the current collector is favorable when the content is 99.9% by mass or less.

In a case in which the electrode of the first aspect of the invention is a positive electrode or a negative electrode containing metal particles such as silicon, the mixture layer preferably contains a conductive auxiliary. By containing a conductive auxiliary, the battery performance can be enhanced.

Examples of the conductive auxiliary may include the same conductive auxiliaries as those exemplified previously in the description of the slurry composition of the first aspect of the invention described above. One kind of these conductive auxiliaries may be used singly, or two or more kinds thereof may be used concurrently.

The content of the conductive auxiliary in the mixture layer is not particularly limited, but is preferably from 0.01 to 10% by mass and more preferably from 0.1 to 7% by mass. The battery performance is enhanced when the content is 0.01% by mass or more. The adhesive property (binding property) between the mixture layer and the current collector is favorable when the content is 10% by mass or less.

The mixture layer can be formed by coating the slurry composition of the first aspect of the invention described above on a current collector and drying the coated slurry composition.

The mixture layer may be provided on one side or both sides of the current collector in a case in which the current collector has a thin film shape or a reticular shape.

The method of coating the slurry composition is not particularly limited as long as the slurry composition can be coated on the current collector at an arbitrary thickness, and examples thereof may include a doctor blade method, a dipping method, a reverse roll method, a direct roll method, a gravure method, an extrusion method, and a brush coating method.

The coating amount can be appropriately set depending on the thickness of the mixture layer to be formed.

The mixture layer is formed by drying the coated slurry composition to remove the solvent.

The drying method is not particularly limited as long as the solvent can be removed. Examples thereof may include a method to heat to the boiling point of water or higher in a case in which the slurry composition contains water as a solvent; a method to heat to the boiling points of water and an organic solvent or higher in a case in which the slurry composition contains a mixed solvent of water and the organic solvent as a solvent; a method to blow warm air, hot air, or low humidity air; a method to evaporate the solvent under reduced pressure; and a method to irradiate with (far)infrared or an electron beam.

After drying, the mixture layer thus formed may be rolled if necessary. By performing the rolling, the area of the mixture layer is widened and can be adjusted to an arbitrary thickness.

Examples of the rolling method may include a die press method or a roll press method.

Meanwhile, the electrode thus obtained may be cut into an arbitrary dimension.

The thickness of the mixture layer can be appropriately determined depending on the kind of the active material, but, for example, is preferably from 20 to 200 μm and more preferably from 30 to 120 μm.

The electrode of the first aspect of the invention can be used for both the positive electrode and the negative electrode of a nonaqueous secondary battery. Particularly, the electrode is suitable as an electrode for a lithium-ion secondary battery.

Since the mixture layer containing the binder resin of the first aspect of the invention or the binder resin composition of the first aspect of the invention is formed on the current collector in the electrode of the first aspect of the invention described above, the adhesive property (binding property) of the mixture layer with respect to the current collector is high and thus the battery characteristics are improved.

«Nonaqueous Secondary Battery»

The nonaqueous secondary battery (hereinafter, simply referred to as the battery) of the first aspect of the invention is equipped with the electrode for a nonaqueous secondary battery of the first aspect of the invention described above.

The "nonaqueous secondary battery" uses a nonaqueous electrolyte not containing water as the electrolyte, and examples thereof may include a lithium-ion secondary battery.

The nonaqueous secondary battery is usually equipped with an electrode (positive electrode and negative electrode), a nonaqueous electrolyte, and a separator. Examples of the nonaqueous secondary battery may include a nonaqueous secondary battery in which a positive electrode and a negative electrode are disposed by interposing a permeable separator (for example, a porous film of polyethylene or polypropylene) between the electrodes, and a nonaqueous electrolyte is impregnated thereto; and a cylindrical nonaqueous secondary battery in which a wound body obtained by winding a laminate consisting of a negative electrode having a mixture layer formed on both sides of a current collector/a separator/a positive electrode having a mixture layer formed on both sides of a current collector/a separator in a roll shape (spiral shape) is accommodated in a battery can (metal casing with a bottom) together with a nonaqueous electrolyte.

Examples of the nonaqueous electrolyte may include an electrolytic solution prepared by dissolving a solid electrolyte in an organic solvent.

Examples of the organic solvent for the electrolytic solution may include a carbonate such as propylene carbonate, ethylene carbonate, butylene carbonate, dimethyl carbonate, diethyl carbonate, and methyl ethyl carbonate; a lactone such as γ-butyrolactone; an ether such as trimethoxy methane, 1,2-dimethoxyethane, diethyl ether, 2-ethoxy ethane, tetrahydrofuran, and 2-methyltetrahydrofuran; a sulfoxide such as dimethyl sulfoxide; an oxolane such as 1,3-dioxolane and 4-methyl-1,3-dioxolane; a nitrogen-containing compound such as acetonitrile, nitromethane, and NMP; an ester such as methyl formate, methyl acetate, butyl acetate, methyl propionate, ethyl propionate, and phosphoric acid trimester; a glyme such as diglyme, triglyme, and tetraglyme; a ketone such as acetone, diethyl ketone, methyl ethyl ketone, and methyl isobutyl ketone; a sulfone such as sulfolane; an oxazolidinone such as 3-methyl-2-oxazolidinone; and a sultone such as 1,3-propanesultone, 4-butanesultone, and naphthasultone. One kind of these organic solvents may be used singly, or two or more kinds thereof may be used concurrently.

As the solid electrolyte, a known solid electrolyte can be used depending on the kind of the nonaqueous secondary battery or the active material. For examples, in the case of a lithium-ion secondary battery, any known lithium salts can be used, and examples thereof may include $LiClO_4$, $LiBF_4$, $LiI$, $LiPF_6$, $LiCF_3SO_3$, $LiCF_3CO_2$, $LiAsF_6$, $LiSbF_6$, $LiAlCl_4$, $LiCl$, $LiBr$, $LiB(C_2H_5)_4$, $LiCH_3SO_3$, $LiC_4F_9SO_3$, $Li(CF_3SO_2)_2N$, and $Li[(CO_2)_2]_2B$.

The electrolytic solution for a lithium-ion secondary battery is preferably a solution prepared by dissolving $LiPF_6$ in a carbonate.

The battery of the first aspect of the invention uses the electrode of the first aspect of the invention in either one or both of the positive electrode and the negative electrode.

In a case in which either the positive electrode or the negative electrode is the electrode of the first aspect of the invention, a known electrode can be used as the other electrode.

As the separator, a known separator can be used. For example, a porous polymer film produced from a polyolefin polymer such as ethylene homopolymer, propylene homopolymer, ethylene/butene copolymer, ethylene/hexene copolymer, and ethylene/methacrylate copolymer can be used singly, or these can be laminated and used. In addition, a normal porous non-woven fabric, for example, a non-woven fabric formed of a glass fiber having a high melting point, a polyethylene terephthalate fiber, or the like can be used, but the separator is not limited thereto.

The method of producing the battery of the first aspect of the invention is not particularly limited, and a known method can be employed. An example of the method of producing a lithium-ion secondary battery is explained below.

First, a positive electrode and a negative electrode are faced to each other via a separator, wound in a spiral shape depending on the battery shape or folded, and then introduced into a battery container, and a tab terminal that had been welded to the current collector of the negative electrode in advance is welded to the bottom of the battery container.

Next, a nonaqueous electrolyte is injected into the battery container, further a tab terminal that had been welded to the current collector of the positive electrode in advance is welded to the lid of the battery container, the lid is disposed on the top of the battery container via an insulating gasket, and the portion where the battery can and the lid are in contact is sealed by caulking, thereby obtaining a lithium-ion secondary battery.

The shape of the battery may be any shape such as a coin shape, a cylindrical shape, a square shape, and a flat shape.

The battery of the first aspect of the invention described above is equipped with the electrode of the first aspect of the invention, and thus is excellent in battery characteristics.

[Second Aspect]

«Binder Resin for Nonaqueous Secondary Battery Electrode»

The binder resin for a nonaqueous secondary battery electrode (hereinafter, simply referred to as the binder resin) of the second aspect of the invention contains a polymer (B) having a structural unit represented by the following Formula (11) and at least one kind of structural units selected from the group consisting of a structural unit represented by the following Formula (12), a structural unit represented by the following Formula (13), and a structural unit derived from a compound represented by the following Formula (31).

[Chem. 11]

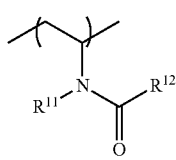

(11)

[Chem. 12]

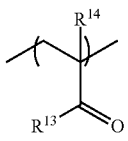

(12)

[Chem. 13]

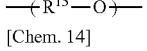

(13)

[Chem. 14]

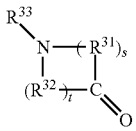

(31)

In Formula (11) above, $R^{11}$ and $R^{12}$ each independently represent a hydrogen atom or a hydrocarbon group having from 1 to 5 carbon atoms.

Specific examples of the a hydrocarbon group may include an alkyl group such as a methyl group, an ethyl group, a n-propyl group, an iso-propyl group, a n-butyl group, a sec-butyl group, a tert-butyl group, and a pentyl group. The hydrocarbon group may be linear or branched.

From the viewpoint of increasing the water solubility of the polymer (B) to be obtained, the number of carbon atom is preferably fewer in a case in which $R^{11}$ and $R^{12}$ are a hydrocarbon group, and $R^{11}$ and $R^{12}$ are preferably each independently a hydrogen atom or an alkyl group having from 1 to 3 carbon atoms and more preferably a hydrogen atom or a methyl group. Particularly, in terms of improving the water solubility, $R^{11}$ is preferably a hydrogen atom and $R^{12}$ is preferably a hydrogen atom or a methyl group. Among them, $R^{12}$ is particularly preferably a hydrogen atom.

The content of the structural unit represented by Formula (11) above is preferably from 1 to 99.9% by mole, more preferably from 10 to 99% by mole, and particularly preferably from 20 to 99% by mole in a case in which the total of all the structural units constituting the polymer (B) is set to 100% by mole. When the content of the structural unit represented by Formula (11) above is within the above range, although the detail will be described later, the polymer (B) hardly swells with respect to the electrolytic solution (nonaqueous electrolyte) when used in an electrode and the binding property is maintained, and thus excellent cycle characteristics can be exhibited.

Examples of the monomer (hereinafter, referred to as the "monomer (b1)") which is the derivation source of the structural unit represented by Formula (11) above may include N-vinylformamide and N-vinylacetamide.

In Formula (12) above, $R^{13}$ represents a hydrogen atom or a monovalent substituent and $R^{14}$ represents a hydrogen atom or a methyl group.

Examples of the monovalent substituent may include a hydrocarbon group and various substituents containing a heteroatom such as an oxygen atom, a sulfur atom, or a nitrogen atom.

Specific examples of $R^{13}$ may include a hydrogen atom, a basic group such as a hydroxyl group, a thiol group, and an amino group and a salt thereof, an alkyl group having from 1 to 10 carbon atoms, and an alkoxy group having an alkyl group having from 1 to 10 carbon atoms, but are not limited thereto. In addition, $R^{13}$ may form a salt of the acid in a case in which $R^{13}$ forms an acid by bonding with the carbonyl group described in Formula (12) above which is a structural unit. Moreover, $R^{13}$ may have an acidic group such as a hydroxyl group, a thiol group, a phosphoric acid group, a sulfonic acid group, and a carboxyl group and a salt thereof, and a basic group such as an amino group and a salt thereof in the structure.

The content of the structural unit represented by Formula (12) above is preferably from 0.1 to 90% by mole and more preferably from 1 to 80% by mole in a case in which the total of all the structural units constituting the polymer (B) is set to 100% by mole. An electrode excellent in flexibility can be formed when the content of the structural unit represented by Formula (22) above is 0.1% by mole or more.

Examples of the monomer (hereinafter, referred to as the "monomer (b2)") which is the derivation source of the structural unit represented by Formula (12) above may include a (meth)acrylate such as methyl (meth)acrylate, propyl (meth)acrylate, butyl (meth)acrylate, hexyl (meth)acrylate, and 2-methoxyethyl acrylate; (meth)acrylic acid and a salt thereof; a sulfonic acid group-containing monovinyl monomer such as (meth)allylsulfonic acid, (meth)allyloxybenzenesulfonic acid, and styrenesulfonic acid, and a salt thereof; a phosphoric acid group-containing monovinyl monomer such as 2-(meth)acryloyloxyethyl acid phosphate, 2-(meth)acryloyloxyethyl acid phosphate.monoethanolamine, diphenyl((meth)acryloyloxyethyl) phosphate, (meth)acryloyloxypropyl acid phosphate, 3-chloro-2-acid-.phosphoxypropyl (meth)acrylate, acid.phosphooxypolyoxyethylene glycol mono(meth)acrylate, and acid.phosphooxypolyoxypropylene glycol (meth)acrylate, and a salt thereof; a vinyl ketone such as (meth)acrylamide, methyl vinyl ketone, and isopropyl methyl ketone; and (meth)acrylamide, but are not limited thereto.

One kind of these monomers (b2) may be used singly, or two or more kinds thereof may be used concurrently.

In Formula (13) above, $R^{15}$ represents a divalent substituent.

Examples of the divalent substituent may include a linear or branched divalent hydrocarbon group or a divalent substituent obtained by removing two hydrogen atoms from an arbitrary carbon atom of an aromatic ring or an alicyclic compound. The divalent substituents may be single or bonded to another substituent, and may contain a hetero atom in the backbone thereof or the substituent.

Specific examples thereof may include a linear or branched divalent hydrocarbon group such as an ethylene group, a propylene group, and a butylene group, or a divalent substituent obtained by removing two hydrogen atoms from an arbitrary carbon atom of an aromatic ring such as a benzene ring, a naphthalene ring, and a thiophene ring or an alicyclic compound such as cyclohexane.

As the structural unit represented by Formula (13) above, a polyalkylene glycol repeating unit, a polyester diol repeating unit, and a polycarbonate diol repeating unit are preferable. Moreover, an alkylene oxide unit having from 2 to 4 carbon atoms is preferable, and specifically, an ethylene oxide unit and a propylene oxide unit are preferable. However, the structural unit represented by Formula (13) above is not particularly limited as long as the structural unit is a polyalkylene glycol repeating unit, a polyester diol repeating unit, and a polycarbonate diol repeating unit which have an arbitrary hydrocarbon group.

In addition, the structural unit represented by Formula (13) above may have an acidic group such as a phosphoric acid group, a sulfonic acid group, and a carboxyl group or a salt thereof in the structure.

The content of the structural unit represented by Formula (13) above is preferably from 0.1 to 90% by mole in a case in which the total of all the structural units constituting the polymer (B) is set to 100% by mole. An electrode excellent in flexibility can be formed when the content of the structural unit represented by Formula (13) above is 0.1% by mole or more. The content is preferably from 0.1 to 30% by mole in order to suppress the gelation when the polymer (B) is dissolved in water particularly in a case in which the structural unit represented by Formula (13) above is derived from a bifunctional monomer such as diacrylate, which will be described below and with which a crosslinking reaction proceeds.

The structural unit represented by Formula (13) above may be introduced into the polymer (B) by any derivation. For example, a polymerization may be performed using a monomer (compound) containing a substituent having the structural unit represented by Formula (13) above, a polymerization may be performed using a polymerization initiator containing a substituent having the structural unit represented by Formula (13) above, or the structural unit represented by Formula (13) above may be introduced into the polymer (B) after polymerization.

The structural unit represented by Formula (13) above is preferably derived from at least one kind of compounds selected from the group consisting of compounds represented by the following Formulas (14) to (16). Meanwhile, the compound represented by the following Formula (14) is a mono(meth)acrylate, the compound represented by the following Formula (15) is a di(meth)acrylate, and these compounds are the monomers to be the starting materials of the polymer (B). Meanwhile, the compound represented by the following Formula (16) is a polymerization initiator used when the polymer (B) is polymerized.

[Chem. 15]

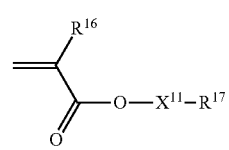

(14)

[Chem. 16]

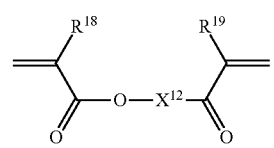

(15)

[Chem. 17]

(16)

In Formula (14) above, $R^{16}$ represents a hydrogen atom or a methyl group.

$R^{17}$ represents a hydrogen atom or a monovalent substituent. Examples of the monovalent substituent may include a linear or branched monovalent hydrocarbon group; a monovalent substituent obtained by removing one hydrogen atom from an arbitrary carbon atom of an aromatic ring or an alicyclic compound; and an acidic group and a salt thereof. The monovalent substituents may be single or bonded to another substituent, and may contain a hetero atom in the backbone thereof or the substituent. Specific examples thereof may include a linear or branched monovalent hydrocarbon group such as an alkyl group having from 1 to 20 carbon atoms; a monovalent substituent obtained by removing one hydrogen atom from an arbitrary carbon atom of an aromatic ring such as a benzene ring, a naphthalene ring, and a thiophene ring or an alicyclic compound such as cyclohexane; an acidic group such as a phosphoric acid group, a carboxyl group and a sulfonic acid group, and a salt thereof.

$X^{11}$ represents a divalent substituent having the structural unit represented by Formula (13) above. Specifically, $X^{11}$ is a divalent substituent containing at least one kind selected from the group consisting of a polyalkylene glycol repeating unit, a polyester diol repeating unit, and a polycarbonate diol repeating unit. Among them, a divalent substituent having a polyalkylene glycol repeating unit is preferable.

The form of $X^{11}$ may be the repetition of a single structural unit or the repetition of two or more structural units. In addition, the arrangement of the structural units is not particularly limited, and the respective structural units may be present at random, in block, or alternately in a case in which the form of $X^{11}$ is the repetition of two or more structural units.

Examples of the compound represented by Formula (14) above (hereinafter, referred to as the monomer (b4)) may include the following compounds.

BLEMMER E (having 1 ethylene glycol repeating unit) and BLEMMER PE Series (for example, having about from 2 to 8 ethylene glycol repeating units) in which $R^{16}$ is a methyl group, $R^{17}$ is a hydrogen atom, and $X^{11}$ is an ethylene glycol repeating unit.

BLEMMER P (having 1 repeating unit) and BLEMMER PP Series (for example, having about from 4 to 13 repeating units) in which $R^{16}$ is a methyl group, $R^{17}$ is a hydrogen atom, and $X^{11}$ is a propylene glycol repeating unit.

BLEMMER 50PEP-300 (having about 3.5 ethylene glycol repeating units and about 2.5 propylene glycol repeating units), BLENMER 70PEP-350B (having about 5 ethylene glycol repeating units and about 2 propylene glycol repeating units) in which $R^{16}$ is a methyl group, $R^{17}$ is a hydrogen atom, and $X^{11}$ is an ethylene glycol repeating unit and a propylene glycol repeating unit.

BLEMMER 55PET-800 (having about 10 ethylene glycol repeating units and about 5 butylene glycol repeating units) in which $R^{16}$ is a methyl group, $R^{17}$ is a hydrogen atom, and $X^{11}$ is an ethylene glycol repeating unit and a butylene glycol repeating unit.

BLENMER AE series (for example, having about from 2 to 10 ethylene glycol repeating units) in which $R^{16}$ is a hydrogen atom, $R^{17}$ is a hydrogen atom, and $X^{11}$ is an ethylene glycol repeating unit.

BLEMMER AP Series (for example, having about from 3 to 9 propylene glycol repeating units) in which $R^{16}$ is a hydrogen atom, $R^{17}$ is a hydrogen atom, and $X^{11}$ is a propylene glycol repeating unit.

BLEMMER PME-Series (for example, having about from 2 to 90 ethylene glycol repeating units) in which $R^{16}$ is a methyl group, $R^{17}$ is a methyl group, and $X^{11}$ is an ethylene glycol repeating unit.

AM-130G (for example, having about 13 ethylene glycol repeating units) in which $R^{16}$ is a methyl group, $R^{17}$ is a methyl group, and $X^{11}$ is an ethylene glycol repeating unit.

BLEMMER 50POEP-800B (having about 8 ethylene glycol repeating units and about 6 propylene glycol repeating units) in which $R^{16}$ is a methyl group, $R^{17}$ is $CH_2CH(C_2H_5)C_4H_9$, and $X^{11}$ is an ethylene glycol repeating unit and a propylene glycol repeating unit.

BLEMMER PSE-1300 (having about 30 ethylene glycol repeating units) in which $R^{16}$ is a methyl group, $R^{17}$ is an octadecyl group, and $X^{11}$ is an ethylene glycol repeating unit.

BLEMMER PAE series (for example, having 1 or 2 ethylene glycol repeating units) in which $R^{16}$ is a methyl group, $R^{17}$ is a phenyl group, and $X^{11}$ is an ethylene glycol repeating unit.

BLEMMER ANP-300 (having about 5 propylene glycol repeating units) in which $R^{16}$ is a hydrogen atom, $R^{17}$ is a group obtained by substituting one of the hydrogen atoms of the phenyl group with a nonyl group, and $X^{11}$ is a propylene glycol repeating unit.

BLEMMER AAE series (for example, having about from 1 to 5.5 ethylene glycol repeating units) in which $R^{16}$ is a hydrogen atom, $R^{17}$ is a phenyl group, and $X^{11}$ is an ethylene glycol repeating unit.

Methacryloyloxyethyl phosphate (having 1 ethylene glycol repeating unit) in which $R^{16}$ is a hydrogen atom, $R^{17}$ is a phosphoric acid group, and $X^{11}$ is an ethylene glycol repeating unit.

One kind of these monomers (b4) may be used singly, or two or more kinds thereof may be used concurrently.

An example of the structural formulas of the monomers (b4) described above is presented below.

[Chem. 18]

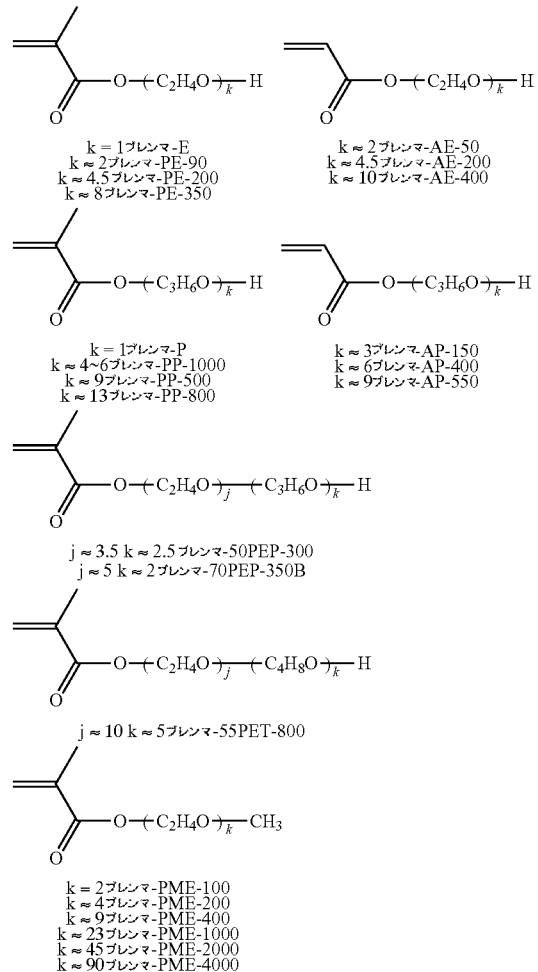

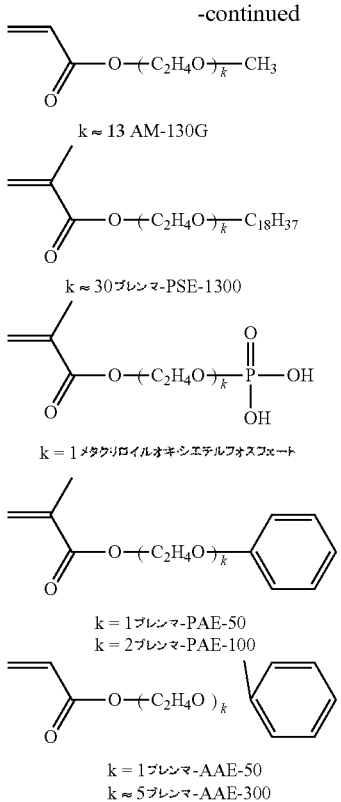

BLEMMER-E
BLEMMER-PE-90
BLEMMER-PE-200
BLEMMER-PE-350
BLEMMER-AE-50
BLEMMER-AE-200
BLEMMER-AE-400
BLEMMER-P
BLEMMER-PP-1000
BLEMMER-PP-500
BLEMMER-PP-800
BLEMMER-AP-150
BLEMMER-AP-400
BLEMMER-AP-550
BLEMMER-50PEP-300
BLEMMER-7-PEP-350B
BLEMMER-55PET-800
BLEMMER-PME-100
BLEMMER-PME-200
BLEMMER-PME-400
BLEMMER-PME-1000
BLEMMER-PME-2000
BLEMMER-PME-4000
AM-130G
BLEMMER-PSE-1300
Methacryloyloxyethyl phosphate
BLEMMER-PAE-50
BLEMMER-PAE-100
BLEMMER-AAE-50
BLEMMER-AAE-300

In Formula (15) above, $R^{18}$ and $R^{19}$ each independently represent a hydrogen atom or a methyl group. $X^{12}$ represents a divalent substituent having the structural unit represented by Formula (13) above. Specifically, $X^{12}$ is a divalent substituent containing at least one kind selected from the group consisting of a polyalkylene glycol repeating unit, a polyester diol repeating unit, and a polycarbonate diol repeating unit. Among them, a divalent substituent having a polyalkylene glycol repeating unit is preferable.

The form of $X^{12}$ may be the repetition of a single structural unit or the repetition of two or more structural units. In addition, the arrangement of the structural units is not particularly limited, and the respective structural units may be present at random, in block, or alternately in a case in which the form of $X^{12}$ is the repetition of two or more structural units.

Examples of the compound represented by Formula (15) above (hereinafter, referred to as the monomer (b5)) may include the following compounds.

BLENMER PDE series (for example, having about from 2 to 14 ethylene glycol repeating units) in which $R^{18}$ is a methyl group, $R^{19}$ is a methyl group, and $X^{12}$ is an ethylene glycol repeating unit.

BLEMMER ADE series (for example, having about from 4 to 14 ethylene glycol repeating units) in which $R^{18}$ is a hydrogen atom, $R^{19}$ is a hydrogen atom, and $X^{12}$ is an ethylene glycol repeating unit.

BLENMER PDP series (for example, having about from 7 to 12 propylene glycol repeating units) in which $R^{18}$ is a methyl group, $R^{19}$ is a methyl group, and $X^{12}$ is a propylene glycol repeating unit.

BLEMMER ADP series (for example, having about 6 propylene glycol repeating units) in which $R^{18}$ is a hydrogen atom, $R^{19}$ is a hydrogen atom, and $X^{12}$ is a propylene glycol repeating unit.

BLEMMER ADT series (for example, having about 3 butylene glycol repeating units) in which $R^{18}$ is a hydrogen atom, $R^{19}$ is a hydrogen atom, and $X^{12}$ is a butylene glycol repeating unit.

BLENMER PDBE series (for example, having about from 4 to 30 ethylene glycol repeating units) in which $R^{18}$ is a methyl group, $R^{19}$ is a methyl group, and $X^{12}$ contains an ethylene glycol repeating unit and $-C_6H_4-C(CH_3)_2-C_6H_4-$.

BLENMER PDBP series (for example, having about 10 propylene glycol repeating units) in which $R^{18}$ is a methyl group, $R^{19}$ is a methyl group, and $X^{12}$ contains a propylene glycol repeating unit and $-C_6H_4-C(CH_3)_2-C_6H_4-$.

An example of the structural formulas of the monomers (b5) described above is presented below.

[Chem. 19]

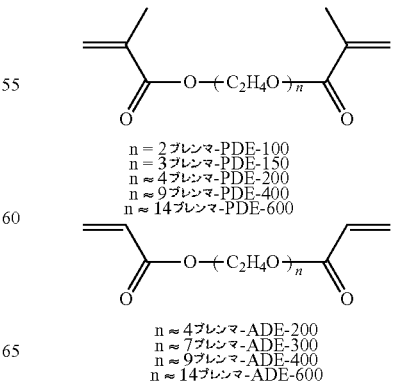

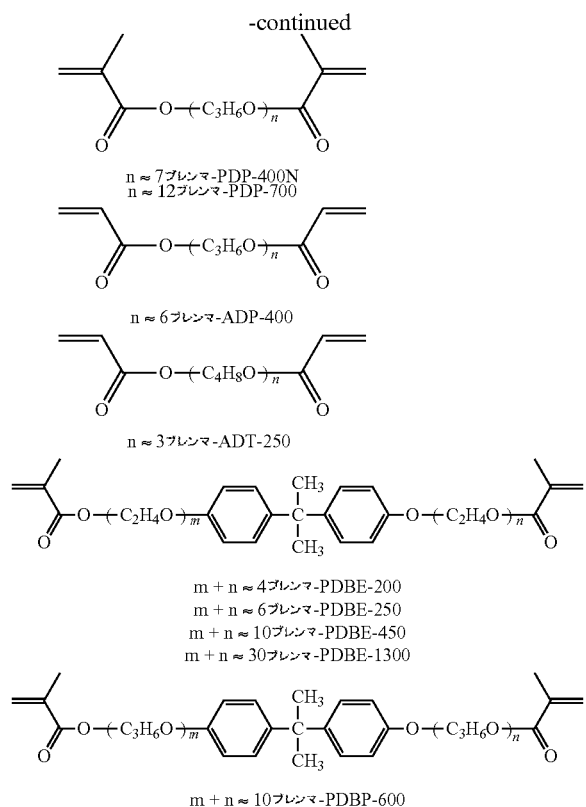

BLEMMER-PDE-100
BLEMMER-PDE-150
BLEMMER-PDE-200
BLEMMER-PDE-400
BLEMMER-PDE-600
BLEMMER-ADE-200
BLEMMER-ADE-300
BLEMMER-ADE-400
BLEMMER-ADE-600
BLEMMER-PDP-400N
BLEMMER-PDP-700
BLEMMER-ADP-400
BLEMMER-ADT-250
BLEMMER-PDBE-200
BLEMMER-PDBE-250
BLEMMER-PDBE-450
BLEMMER-PDBE-1300
BLEMMER-PDBP-600

In addition, as the monomer (b5), the following monomers may be used in addition to the monomers described above, for example, Acryl Ester PBOM (polybutylene glycol dimethacrylate, mass average molecular weight (Mn)=650 for $X^{12}$) and KPBM (dimethacrylate having polyester of 2-butyl-2-ethyl-1,3-propanediol and adipic acid as a repeating unit, Mn=1800 for $X^{12}$) manufactured by Mitsubishi Rayon Co., Ltd.; BLEMMER PDT-650 (polytetramethylene glycol dimethacrylate, 9 tetramethylene glycol repeating units, Mn=648 for $X^{12}$) and BLEMMER 40PDC 1700B (dimethacrylate of random copolymer of polyethylene glycol and polypropylene glycol, Mn=1700 for $X^{12}$) manufactured by NOF CORPORATION; NK Ester A-PTNG65 (polyethylene glycol diacrylate, 9 ethylene glycol repeating units, Mn=600 for $X^{12}$), NK Ester A-600 (polyethylene glycol diacrylate, 14 ethylene glycol repeating units, Mn=600 for $X^{12}$), NK Ester A-1000 (polyethylene glycol diacrylate, 23 ethylene glycol repeating units, Mn=1000 for $X^{12}$), NK Ester APG-700 (polypropylene glycol diacrylate, 12 propylene glycol repeating units, Mn=700 for $X^{12}$), NK Ester 14G (polyethylene glycol dimethacrylate, about 14 ethylene glycol repeating units, Mn=600 for $X^{12}$), and NK Ester 23G (polyethylene glycol dimethacrylate, 23 ethylene glycol repeating units Mn=1000 for $X^{12}$) manufactured by SHIN-NAKAMURA CHEMICAL CO., LTD.; and UH-100DM (polyhexane carbonate diol dimethacrylate, Mn=800 for $X^{12}$) manufactured by UBE INDUSTRIES, LTD.

One kind of these monomers (b5) may be used singly, or two or more kinds thereof may be used concurrently.

In Formula (16) above, $A^{11}$ and $A^{12}$ each independently represent a monovalent substituent having the structural unit represented by Formula (13) above.

Examples of the polymerization initiator represented by Formula (16) above may include an azo polymerization initiator containing a polyethylene glycol unit. Among them, "VPE-0201", "VPE-0401", and "VPE-0601" which are a polyethylene glycol (PEG) unit-containing polymeric-azo-initiator, manufactured by Wako Pure Chemical Industries, Ltd. are preferable as a commercially available product. These are compounds having a polyethylene glycol repeating unit as $A^{11}$ and $A^{12}$ in Formula (16) above.

One kind of these polymerization initiators may be used singly, or two or more kinds thereof may be used concurrently.

A structural formula is presented below as an example of the polymerization initiator represented by Formula (16) above.

[Chem. 20]

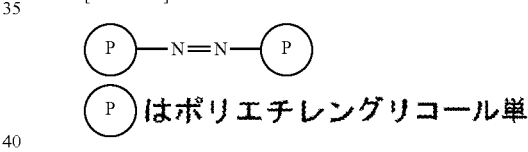

Ⓟ is a polyethylene glycol unit.

Meanwhile, the molecular weights of the polyethylene glycol unit are about 2000, about 4000, and about 6000 in VPE-0201, VPE-0401, and VPE-0601 manufactured by Wako Pure Chemical Industries, Ltd., respectively.

In Formula (31) above, $R^{31}$ and $R^{32}$ each independently represent a divalent substituent, $R^{33}$ represents a monovalent substituent, and any of $R^{31}$ to $R^{33}$ has a vinyl group structure. s and t each independently represent 0 or 1.

Examples of the monovalent substituent and the divalent substituent may include a linear, branched, or cyclic hydrocarbon group having from 1 to 20 carbon atoms, and a group in which one or two or more of the carbon atoms constituting the hydrocarbon group is substituted with a heteroatom such as an oxygen atom, a sulfur atom, or a nitrogen atom. This hydrocarbon group may contain a hydroxyl group, an ether group, an ester group, a carbonyl group, an aldehyde group, a primary to tertiary amino group, a nitro group, a cyano group, an acetal group, a thiol group, a thioether group, a thioester group, or the like. In addition, $R^{31}$ to $R^{33}$ may have an acidic group such as a phosphoric acid group, sulfonic acid group, and a carboxyl group and a salt thereof, and a basic group such as an amino group and a salt thereof in the structure.

As the vinyl group structure contained in any of $R^{31}$ to $R^{33}$, a vinyl group structure represented by the following Formula (32) or (33) is preferable from the viewpoint of increasing the water solubility.

[Chem. 21]

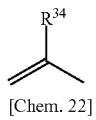
(32)

[Chem. 22]

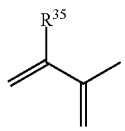
(33)

In Formula (32) above, $R^{34}$ represents a hydrogen atom or a methyl group.

In Formula (33) above, $R^{35}$ represents a hydrogen atom or a methyl group.

As the vinyl group structure, a vinyl group structure represented by Formula (32) above is more preferable. Among them, a vinyl group structure having a hydrogen atom as $R^{34}$ is preferable. A vinylidene group or a vinylene group is preferable as $R^{31}$ or $R^{32}$ in a case in which $R^{31}$ or $R^{32}$ has a vinyl group structure. A vinyl group is preferable as $R^{33}$ in a case in which $R^{33}$ has a vinyl group structure.

Examples of the compound represented by Formula (31) above (hereinafter, referred to as the "monomer (b7)") may include N-vinyl-2-pyrrolidone, N-vinyl-2-caprolactam, N-isopropenyl-2-pyrrolidone, and N-isopropenyl-2-caprolactam. Among them, N-vinyl-2-pyrrolidone is preferable.

The content of the structural unit derived from the compound represented by Formula (31) above is preferably from 0.1 to 50% by mole, more preferably from 0.1 to 20% by mole, and still more preferably from 0.1 to 10% by mole in a case in which all the structural units constituting the polymer (B) are set to 100% by mole. The dispersibility of the slurry composition can be improved when the content of the structural unit derived from the compound represented by Formula (31) above is 0.1% by mole or more.

The polymer (B) may contain a unit (hereinafter, referred to as the "arbitrary unit") other than the structural units represented by Formulas (11), (12), and (13) above and the structural unit derived from the compound represented by Formula (31) above if necessary.

The monomer to be the derivation source of the arbitrary unit (hereinafter, referred to as the "monomer (b8)") is not particularly limited as long as a monomer is copolymerizable with the monomers (b1), (b2), (b4), (b5), and (b7), and examples thereof may include a vinyl cyanide monomer such as acrylonitrile, methacrylonitrile, α-cyanoacrylate, dicyanovinylidene, and fumaronitrile ethyl; a vinyl halide monomer such as vinyl chloride, vinyl bromide, and vinylidene chloride; a carboxyl group-containing monomer such as itaconic acid and crotonic acid, and a salt thereof; an aromatic vinyl monomer such as styrene and α-methylstyrene; a maleimide such as maleimide and phenylmaleimide; a sulfonic acid group-containing vinyl monomer such as (meth)allyl sulfonic acid, (meth)allyloxybenzenesulfonic acid, and styrenesulfonic acid, and a salt thereof; a phosphoric acid group-containing vinyl monomer and a salt thereof; and vinyl acetate.

One kind of these monomers (b8) may be used singly, or two or more kinds thereof may be used concurrently.

The content of the arbitrary unit is preferably from 0 to 49% by mole and more preferably from 0 to 20% by mole in a case in which the total of all the structural units constituting the polymer (B) is set to 100% by mole. Deterioration in battery performance can be suppressed when the content of the arbitrary unit is within the above range.

In the binder resin of the second aspect of the invention, the structural units represented by Formula (12) above and/or Formula (13) above are preferably derived from the monomers satisfying the following condition and thus an electrode superior in flexibility can be obtained.

Glass transition temperature of homopolymer of monomer (b)≤glass transition temperature of homopolymer having the structural unit represented by Formula (11) above as a structural unit Meanwhile, the glass transition temperatures are the glass transition temperature of the homopolymer of each monomer presented in Polymer Handbook Fourth Edition (A WiLEY-INTERSCIENCE PUBLICATION). For the monomer which is not presented in the Polymer Handbook, the numerical values obtained under the same conditions for the homopolymer of the monomer (b) and the homopolymer having the structural unit represented by Formula (11) above as a structural unit, or the like can be used. In addition, the value obtained by, for example, a known measuring method such as differential scanning calorimetry as the analytical method may be used. Moreover, the monomer (b) satisfying the above described condition may form an acidic salt or a basic salt.

The glass transition temperature of the homopolymer of the monomer (b) used in the invention is preferably 110° C. or lower and still more preferably 50° C. or lower in terms of obtaining an electrode superior in flexibility.

Meanwhile, the glass transition temperature of poly(N-vinylformamide) by differential scanning calorimetry is 126° C. The conditions at this time are as follows.

Equipment: DSC7 (manufactured by PerkinElmer Co., Ltd)

Measured at a temperature rising rate of 10° C./min under nitrogen flow

Specific examples of the monomer (b) may include the following monomers, but are not limited thereto. The numerical value in the parentheses is the glass transition temperature of the homopolymer of each monomer presented in Polymer Handbook Fourth Edition (A WiLEY-INTERSCIENCE PUBLICATION).

Examples of the monomer (b) may include methyl acrylate (10° C.), butyl methacrylate (20° C.), 2-ethyl butyl acrylate (−50° C.), 3-methoxypropyl acrylate (−75° C.), 2-ethylhexyl acrylate (−50° C.), butyl acrylate (−54° C.), hexyl acrylate (−57° C.), 2-methoxyethyl acrylate (−50° C.), and acrylic acid (108° C.).

In addition, NK Ester AM-90G (methoxypolyethylene glycol #400 acrylate), NK Ester AMP-20GY (phenoxypolyethylene glycol acrylate), NK Ester A-SA (2-acryloyloxy succinate), NK Ester A-200 (polyethylene glycol #200 diacrylate), NK Ester S (stearyl acrylate), and NK Ester SA (2-methacryloyloxyethyl succinate) which are manufactured by SHIN-NAKAMURA CHEMICAL CO., LTD. may be used as the monomer (b).

In addition, the structural units represented by Formula (12) above and/or Formula (13) above preferably have an acidic group or a salt thereof, and thus the binding property of the mixture layer with respect to the current collector is improved.

The polymer (B) is preferably a polymer having the structural unit represented by Formula (11) above, the structural unit represented by Formula (12) above, and the structural unit represented by Formula (13) above, or a polymer having the structural unit represented by Formula (11) above and two or more different kinds of structural units represented by Formula (12) above, and thus an electrode superior in flexibility can be obtained and the binding property is improved as well.

The polymer (B) is obtained by a method to copolymerize the monomer (b1) with at least one of the monomer (b2), a monomer (the monomer (b4), (b5), or the like) to be the derivation source of the structural unit represented by Formula (13) above, and the monomer (b7), and if necessary, the monomer (b8); a method to copolymerize the monomer (b1) with at least one of the monomer (b2), a monomer (the monomer (b4), (b5), or the like) to be the derivation source of the structural unit represented by Formula (13) above, and the monomer (b7), and if necessary, the monomer (b8) using the polymerization initiator represented by Formula (16) above; or a method to polymerize or copolymerize the monomer (b1) with if necessary, the monomer (b2), the monomer (b7), and the monomer (b8) using the polymerization initiator represented by Formula (16) above. The polymerization method is not particularly limited, and a solution polymerization, a suspension polymerization, an emulsion polymerization, or the like can be selected depending on the kind of the monomer used, the solubility of polymer (B) to be produced, or the like.

For example, the aqueous solution polymerization can be used in a case in which the monomer to be used is soluble in water and the polymer (B) to be produced has a sufficient affinity for water. The aqueous solution polymerization is a method to obtain the polymer (B) by dissolving a monomer of a starting material and a water-soluble polymerization initiator in water and heating the resultant solution.

In addition, the suspension polymerization or the emulsion polymerization can be used in a case in which the solubility of the monomer to be used in water is low. The emulsion polymerization is a method to obtain the polymer (B) by adding a monomer of a starting material, an emulsifier, and a water-soluble polymerization initiator into water and heating the resultant solution under stirring.

After polymerization, the polymer (B) in powder form is obtained by removing water by filtration, centrifugation, heat drying, vacuum drying, and combination thereof.

The molecular weight of the polymer (B) is not particularly limited, but is preferably from 10,000 to 20,000,000, more preferably from 100,000 to 15,000,000, still more preferably from 500,000 to 10,000,000, and particularly preferably from 1,000,000 to 5,000,000 as the viscosity average molecular weight (Mv). The binding property is enhanced when the molecular weight is equal to or higher than the lower limit value, the water solubility increases when the molecular weight is equal to or lower than the upper limit value, and collectively the dispersibility of the conductive auxiliary becomes more favorable.

The viscosity average molecular weight (Mv) is calculated as the viscosity conversion molecular weight from the viscosity of an aqueous solution of the polymer (B) using poly(N-vinylformamide) (hereinafter, referred to as PNVF) as the standard substance. Examples of the calculation method of the viscosity average molecular weight may include the same calculation method as that described in the first aspect.

The binder resin of the second aspect of the invention may be composed of the polymer (B) only, but may also contain other polymers other than the polymer (B) in the range that does not impair the effect of the invention.

Examples of other polymers may include polyacrylic acid and a salt thereof, polyvinyl alcohol, and polyacrylamide, and one kind of these polymers may be used singly or two or more kinds thereof may be used concurrently.

The content of other polymers in 100% by mass of the binder resin is preferably from 0 to 50% by mass.

Examples of the form of the binder resin may include a powder form and a dope form in which the binder resin is dissolved or dispersed in a solvent such as water or the like. A powder form is preferable during storage and distribution from the viewpoint of stability during storage and distribution, economical efficiency, and ease of handling.

The binder resin of the second aspect of the invention described above contain the polymer (B) obtained by selecting and using at least one of the monomer (b2) to be the derivation source of the structural unit represented by Formula (12) above, a monomer (the monomer (b4), (b5), or the like) to be the derivation source of the structural unit represented by Formula (13) above, and the compound (the monomer (b7)) represented by Formula (31) above in addition to the monomer (b1) to be the derivation source of the structural unit represented by Formula (11) above and copolymerizing these, or the polymer (B) obtained by selecting and using the polymerization initiator represented by Formula (16) above and polymerizing at least the monomer (b1). An electrode produced using the polymer (B) is excellent in flexibility since the polymer (B) is soluble in water and has the structural unit represented by Formula (11) above and at least one kind of structural units selected from the group consisting of the structural unit represented by Formula (12) above, the structural unit represented by the following Formula (13), and a structural unit derived from the compound represented by the following Formula (31).

Consequently, the binder resin of the second aspect of the invention which contains the polymer (B) is soluble in water and can form an electrode excellent in flexibility. Specifically, it is possible to form an electrode having a mixture layer exhibiting no change when the flexibility of the electrode is evaluated according to the following flexibility test.

Here, the expression "there is no change in the mixture layer" means a state that the horizontal stripes are not formed or cracking or peeling does not occur on the mixture layer.

(Flexibility Test)

The binder resin for a nonaqueous secondary battery electrode and water are mixed and kneaded. An active material is added thereto and mixed and kneaded, further, a conductive auxiliary is added thereto and mixed and kneaded in a case in which the electrode is a positive electrode, and then the viscosity thereof is adjusted with water to a viscosity at which coating is possible, thereby obtaining a slurry composition. The blending amount is set such that the binder resin for a nonaqueous secondary battery electrode is 2 parts by mass and the conductive auxiliary is 5 parts by mass with respect to 100 parts by mass of the active material.

The slurry composition thus obtained is coated on the current collector and dried, thereby obtaining an electrode in which a mixture layer having a film thickness of from 20 to 200 μm is formed on a current collector.

A specimen is prepared by cutting the electrode thus obtained into 3 cm in width by 5 in length.

A mandrel having a diameter of 8 mm is disposed on the current collector surface of the specimen thus obtained, one side of the specimen is fixed with tape, and then the state of the mixture layer when the specimen is bent such that the current collector surface becomes the inside in an environment having a humidity of 10% or less is observed, thereby evaluating the flexibility of the electrode.

In addition, the binding property of the binder resin is also improved when the polymer (B) is a polymer having at least the structural unit represented by Formula (11) above and the structural unit represented by Formula (12) above, or a polymer having the structural unit represented by Formula (11) above and two or more different kinds of structural units represented by Formula (12) above.

«Binder Resin Composition for Nonaqueous Secondary Battery Electrode»

The binder resin composition for a nonaqueous secondary battery electrode (hereinafter, simply referred to as the binder resin composition) of the second aspect of the invention contains the binder resin of the second aspect of the invention described above.

Examples of the form of the binder resin composition may include a powder form and a dope form in which the binder resin composition is dissolved or dispersed in a solvent such as water or the like. A powder form is preferable during storage and distribution from the viewpoint of stability during storage and distribution, economical efficiency, and ease of handling.

The content of the binder resin in the powder form binder resin composition is preferably 50% by mass or more, more preferably 80% by mass or more, and may be 100% by mass. The effect of the invention is remarkably exerted when the content is equal to or higher than the lower limit value.

The binder resin composition of the second aspect of the invention may contain a binder resin (another binder resin) other than the binder resin of the second aspect of the invention, or an additive such as a viscosity modifier a binding property improver, and a dispersant if necessary in an amount in which the battery performance is not affected.

Examples of other binder resins may include the other binder resins previously exemplified in the description of the binder resin composition of the first aspect or a fluorine-based resin such as polyvinylidene fluoride (PVDF), polytetrafluoroethylene (PTFE), tetrafluoroethylene-perfluoroalkyl vinyl ether copolymer (PFA), tetrafluoroethylene-hexafluoropropylene copolymer (FEP), and ethylene-tetrafluoroethylene copolymer (ETFE).

Examples of the viscosity modifier may include the same viscosity modifiers as those exemplified previously in the description of the binder resin composition of the first aspect.

It is desirable that an additive is not added if possible since an additive such as the viscosity modifier finally remains in the electrode, and an additive having electrochemical stability is preferably used in the case of adding an additive.

The content of the additive is preferably 50% by mass or less when the binder resin composition is set to 100% by mass in a case in which the binder resin composition contains an additive such as the viscosity modifier. However, it is more preferable as the content of the additive is lower from the viewpoint of enhancing the battery performance.

The binder resin composition can be produced by a known method. For example, the binder resin composition is obtained by the powder mixing of the powder form binder resin of the second aspect of the invention and a powder form additive if necessary, or by dispersing the powder form binder resin of the second aspect of the invention and if necessary, a powder form additive in water.

The binder resin composition for a nonaqueous secondary battery electrode of the second aspect of the invention described above contains the binder resin of the second aspect of the invention described above, and thus is soluble in water and can form an electrode excellent in flexibility.

Particularly, the binding property of the binder resin composition is also improved when the polymer (B) contained in the binder resin is a polymer having at least the structural unit represented by Formula (11) above and the structural unit represented by Formula (12) above, or a polymer having the structural unit represented by Formula (11) above and two or more different kinds of structural units represented by Formula (12) above.

«Slurry Composition for Nonaqueous Secondary Battery Electrode»

The slurry composition for a nonaqueous secondary battery electrode (hereinafter, simply referred to as the slurry composition) of the second aspect of the invention contains the binder resin of the second aspect of the invention or the binder resin composition of the second aspect of the invention described above, an active material, and water.

The binder resin used for the slurry composition of the second aspect of the invention is the binder resin of the second aspect of the invention described above, and thus the detailed description thereof will not be provided here. In addition, the binder resin composition used for the slurry composition of the second aspect of the invention is the binder resin composition of the second aspect of the invention described above, and thus the detailed description thereof will not be provided here.

The content of the binder resin in the slurry composition of the second aspect of the invention is not particularly limited, but is preferably from 0.01 to 15% by mass and more preferably from 0.1 to 10% by mass in the total solid matters (all components except the solvent) of the slurry composition. The adhesive property (binding property) between the mixture layer formed using the slurry composition and the current collector is enhanced when the content is 0.01% by mass or more. An active material or an arbitrary component (for example, a conductive auxiliary) to be described below can be sufficiently contained when the content is 15% by mass or less, and thus the battery characteristics are improved.

The active material used in the slurry composition of the second aspect of the invention is not particularly limited, and a known material can be used depending on what kind of nonaqueous secondary battery the electrode to be produced using the slurry composition is for.

For example, in the case of a lithium-ion secondary battery, a material which exhibits a higher potential (with respect to metal lithium) than the active material of the negative electrode (negative electrode active material) and can absorb and desorb lithium ions during charge and discharge is used as the active material of the positive electrode (positive electrode active material).

Specific examples of the positive electrode active material and the negative electrode active material may include the same positive electrode active materials and negative electrode active materials as those exemplified previously in the description of the slurry composition of the first aspect. One kind of these positive electrode active materials and negative electrode active materials may be used singly, or two or more kinds thereof may be used concurrently.

In a lithium-ion secondary battery, it is preferable to use a lithium-containing metal composite oxide as the positive electrode active material and graphite as the negative electrode active material. The voltage of the lithium-ion secondary battery can be increased to, for example, 4 V or higher by such combination.

The content of the active material in the slurry composition of the second aspect of the invention is not particularly limited, but is preferably from 80 to 99.9% by mass and more preferably from 85 to 99% by mass in the total solid matters (all components except the solvent) of the slurry composition. The function as the mixture layer is sufficiently exerted when the content is 80% by mass or more. The adhesive property (binding property) between the mixture layer and the current collector is favorable when the content is 99.9% by mass or less.

As the solvent contained in the slurry composition of the second aspect of the invention, at least water is used, but a mixed solvent of water and an organic solvent may be used. As the organic solvent, a solvent easily and uniformly dissolving or dispersing the binder resin is selected, and specific examples thereof may include the same organic solvents as those exemplified in the description of the slurry composition of the first aspect. One kind of these organic solvents may be used singly, or two or more kinds thereof may be used concurrently.

Examples of the mixed solvent may include a mixed solvent of water and an alcohol solvent, a mixed solvent of water, NMP, and an ester solvent, and a mixed solvent of water, NMP, and a glyme solvent.

However, it is preferable to use water singly as the solvent since the organic solvent has high environmental impact.

The content of the solvent in the slurry composition of the second aspect of the invention may be the minimum amount required to maintain the state that the binder resin or the binder resin composition is dissolved or dispersed at room temperature, but is preferably from 5 to 50% by mass and more preferably from 10 to 40% by mass. The content of the solvent in the slurry composition is determined in consideration of the viscosity of the slurry composition at which coating on the current collector is easily performed when the mixture layer is formed using the slurry composition.

The slurry composition of the second aspect of the invention may contain a component (arbitrary component) other than the binder resin of the second aspect of the invention or the binder resin composition of the second aspect of the invention, an active material, and a solvent if necessary.

Examples of the arbitrary component may include a conductive auxiliary, an antioxidant, and a thickener.

Particularly, in a case in which the slurry composition of the second aspect of the invention is a slurry composition to form a mixture layer of the positive electrode or a slurry composition to form a mixture layer of the negative electrode containing metal fine particles such as silicon, the slurry composition preferably contains a conductive auxiliary. By containing a conductive auxiliary, the electrical contact between the active materials or the active material and the metal fine particles can be improved and thus the battery performance such as the discharge rate characteristics of a nonaqueous secondary battery can be enhanced.

Examples of the conductive auxiliary may include the same conductive auxiliaries as those exemplified previously in the description of the slurry composition of the first aspect. One kind of these conductive auxiliaries may be used singly, or two or more kinds thereof may be used concurrently.

The content of the conductive auxiliary in the slurry composition of the second aspect of the invention is not particularly limited, but is preferably from 0.01 to 10% by mass and more preferably from 0.1 to 7% by mass in the total solid matters (all components except the solvent) of the slurry composition. The battery performance is enhanced when the content of the conductive auxiliary is 0.01% by mass or more. The adhesive property (binding property) between the mixture layer and the current collector is favorable when the content is 10% by mass or less.

The slurry composition of the second aspect of the invention can be produced by mixing and kneading the binder resin of the second aspect of the invention or the binder resin composition of the second aspect of the invention, an active material, a solvent, and if necessary, an arbitrary component (for example, a conductive auxiliary). The mixing and kneading can be performed by a known method.

At the time of the preparation of slurry, the binder resin of the second aspect of the invention or the binder resin composition of the second aspect of the invention may be used in the form of powder as it is or may be used as a resin solution by being dissolved in the solvent in advance before being mixed with the active material or the arbitrary component (for example, a conductive auxiliary).

The slurry composition of the second aspect of the invention described above contains the binder resin of the second aspect of the invention or the binder resin composition of the second aspect of the invention, and thus can form an electrode excellent in flexibility.

Particularly, a mixture layer exhibiting excellent binding property with respect to a current collector can be formed when the polymer (B) contained in the binder resin is a polymer having at least the structural unit represented by Formula (11) above and the structural unit represented by Formula (12) above, or a polymer having the structural unit represented by Formula (11) above and two or more different kinds of structural units represented by Formula (12) above.

«Electrode for Nonaqueous Secondary Battery»

The electrode for a nonaqueous secondary battery (hereinafter, simply referred to as the electrode) of the second aspect of the invention is equipped with a current collector and a mixture layer provided on the current collector, and the mixture layer contains the binder resin of the second aspect of the invention or the binder resin composition of the second aspect of the invention described above and an active material.

The current collector may be any material having conductivity, and examples thereof may include a metal such as aluminum, copper, and nickel.

The shape of the current collector can be determined depending on the shape of the desired battery. Examples thereof may include a thin film shape, a reticular shape, and a fibrous shape, and the thin film shape is preferable among them.

The thickness of the current collector is not particularly limited, but is preferably from 5 to 30 μm and more preferably from 8 to 25 μm.

The binder resin used in the mixture layer is the binder resin of the second aspect of the invention described above, and thus the detailed description thereof is not provided here.

The content of the binder resin in the mixture layer is not particularly limited, but is preferably form 0.01 to 15% by mass and more preferably from 0.1 to 10% by mass. The adhesive property (binding property) between the mixture layer formed using the slurry composition of the second aspect of the invention described above and the current collector is enhanced when the content is 0.01% by mass or more. An active material or an arbitrary component (for example, a conductive auxiliary) can be sufficiently contained when the content is 15% by mass or less, and thus the battery characteristics are improved.

Examples of the active material used for the mixture layer may include the same active materials as those exemplified previously in the description of the slurry composition of the first aspect.

The content of the active material in the mixture layer is not particularly limited, but is preferably from 80 to 99.9% by mass and more preferably from 85 to 99% by mass. The function as the mixture layer is sufficiently exerted when the content is 80% by mass or more. The adhesive property (binding property) between the mixture layer and the current collector is favorable when the content is 99.9% by mass or less.

In a case in which the electrode of the second aspect of the invention is a positive electrode or a negative electrode containing metal fine particles such as silicon, the mixture layer preferably contains a conductive auxiliary. By containing a conductive auxiliary, the battery performance can be enhanced.

Examples of the conductive auxiliary may include the same conductive auxiliaries as those exemplified previously in the description of the slurry composition of the first aspect. One kind of these conductive auxiliaries may be used singly, or two or more kinds thereof may be used concurrently.

The content of the conductive auxiliary in the mixture layer is not particularly limited, but is preferably from 0.01 to 10% by mass and more preferably from 0.1 to 7% by mass. The battery performance is enhanced when the content of the conductive auxiliary is 0.01% by mass or more. The adhesive property (binding property) between the mixture layer and the current collector is favorable when the content is 10% by mass or less.

The mixture layer can be formed by dissolving or dispersing the binder resin of the second aspect of the invention or the binder resin composition of the second aspect of the invention described above, an active material, and if necessary, an arbitrary component (for example, a conductive auxiliary) in a solvent to prepare the slurry composition of the second aspect (slurry preparing process), coating the slurry composition on a current collector (coating process), drying the coated slurry composition to remove the solvent (solvent removing process), and if necessary, rolling (rolling process).

The mixture layer may be provided on one side or both sides of the current collector in a case in which the current collector has a thin film shape or a reticular shape.

The method of coating the slurry composition is not particularly limited as long as the slurry composition can be coated on the current collector at an arbitrary thickness, and examples thereof may include the same coating methods as those exemplified previously in the description of the electrode of the first aspect.

The coating amount can be appropriately set depending on the thickness of the mixture layer to be formed.

The mixture layer is formed by drying the coated slurry composition to remove the solvent.

The drying method is not particularly limited as long as the solvent can be removed. Examples thereof may include the same drying methods as those exemplified previously in the description of the electrode of the first aspect.

After drying, the mixture layer thus formed may be rolled if necessary. By performing rolling, the area of the mixture layer is widened and can be adjusted to an arbitrary thickness.

Examples of the rolling method may include a die press method or a roll press method.

Meanwhile, the electrode thus obtained may be cut into an arbitrary dimension.

The thickness of the mixture layer can be appropriately determined depending on the kind of the active material, but is, for example, preferably from 20 to 200 µm and more preferably from 30 to 120 µm.

The electrode of the second aspect of the invention can be used for both the positive electrode and negative electrode of a nonaqueous secondary battery. Particularly, the electrode is suitable as an electrode for a lithium-ion secondary battery.

The electrode of the second aspect of the invention described above is excellent in flexibility since the mixture layer containing the binder resin of the second aspect of the invention or the binder resin composition of the second aspect of the invention is formed on the current collector.

Particularly, the binding property of the mixture layer with respect to the current collector is also excellent when the polymer (B) contained in the binder resin is a polymer having at least the structural unit represented by Formula (11) above and the structural unit represented by Formula (12) above, or a polymer having the structural unit represented by Formula (11) above and two or more different kinds of structural units represented by Formula (12) above.

«Nonaqueous Secondary Battery»

The nonaqueous secondary battery (hereinafter, simply referred to as the battery) of the second aspect of the invention is equipped with the electrode for a nonaqueous secondary battery of the second aspect of the invention described above.

The "nonaqueous secondary battery" uses a nonaqueous electrolyte not containing water as the electrolyte, and examples thereof may include a lithium-ion secondary battery. The nonaqueous secondary battery is usually equipped with an electrode (positive electrode and negative electrode), a nonaqueous electrolyte, and a separator, and examples thereof may include the same nonaqueous secondary batteries as those exemplified previously in the description of the battery of the first aspect.

Examples of the nonaqueous electrolyte may include an electrolytic solution prepared by dissolving a solid electrolyte in an organic solvent.

Examples of the organic solvent for the electrolytic solution may include the same organic solvents for the electrolytic solution as those exemplified previously in the description of the nonaqueous secondary battery of the first aspect. One kind of these organic solvents may be used singly, or two or more kinds thereof may be used concurrently.

As the solid electrolyte, a known solid electrolyte can be used depending on the kind of the nonaqueous secondary battery or the active material. For examples, in the case of a lithium-ion secondary battery, any known lithium salts can be used, and examples thereof may include the same solid electrolytes as those exemplified previously in the description of the battery of the first aspect.

The electrolytic solution for a lithium-ion secondary battery is preferably a solution prepared by dissolving $LiPF_6$ in a carbonate.

The battery of the second aspect of the invention uses the electrode of the second aspect of the invention in either one or both of the positive electrode and the negative electrode.

In a case in which either the positive electrode or the negative electrode is the electrode of the second aspect of the invention, a known electrode can be used as the other electrode.

As the separator, a known separator can be used, and examples thereof may include the same separators as those exemplified previously in the description of the battery of the first aspect.

The method of producing the battery of the second aspect of the invention is not particularly limited, and a known method can be employed. Examples thereof may include the same method of producing a lithium-ion secondary battery as that exemplified previously in the description of the battery of the first aspect.

Meanwhile, the electrode of the second aspect of the invention is excellent in flexibility, and thus is easily wound or folded.

The shape of the battery may be any shape such as a coin shape, a cylindrical shape, a square shape, and a flat shape.

The battery of the second aspect of the invention described above is equipped with the electrode of the second aspect of the invention, and thus is excellent in battery performance. The electrode is hardly broken even when stress is applied since the electrode is excellent in flexibility and the binder resin is hardly dissolved into the electrolyte solution, and thus high battery performance can be maintained, which leads to the excellent battery performance. The battery performance is more improved when the binding property of the mixture layer with respect to the current collector is high.

[Third Aspect]

«Binder Resin for Nonaqueous Secondary Battery Electrode»

The binder resin for a nonaqueous secondary battery electrode (hereinafter, simply referred to as the binder resin) of the third aspect of the invention contains the following component (α) and/or component (β).

Component (α): a polymer (α) having a structural unit represented by the following Formula (21) and a structural unit represented by the following Formula (22).

Component (β): a mixture of a polymer (β1) having a structural unit represented by the following Formula (21) and a polymer (β2) having a structural unit represented by the following Formula (22).

The polymer (β1) has the structural unit represented by the following Formula (21) at preferably 10% by mole or more, more preferably 30% by mole or more, still more preferably 50% by mole or more, and particularly preferably 80% by mole or more.

The polymer (β2) has the structural unit represented by the following Formula (22) at preferably 10% by mole or more, more preferably 30% by mole or more, still more preferably 50% by mole or more, and particularly preferably 80% by mole or more.

The component (β) is more preferably a mixture of the polymer (β1) having the structural unit represented by the following Formula (21) at 80% by mole or more and the polymer (β2) having the structural unit represented by the following Formula (22) at 80% by mole or more.

The polymer (β1) does not have the structural unit represented by the following Formula (22) and the polymer (β2) does not have the structural unit represented by the following Formula (21).

[Chem. 23]

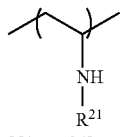

(21)

[Chem. 24]

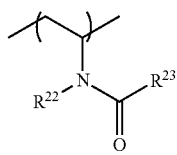

(22)

In Formula (21) above, $R^{21}$ represents a hydrogen atom or a hydrocarbon group having from 1 to 5 carbon atoms.

Specific examples of the hydrocarbon group may include an alkyl group such as a methyl group, an ethyl group, a n-propyl group, an iso-propyl group, a n-butyl group, a sec-butyl group, a tert-butyl group, and a pentyl group. The hydrocarbon group may be linear or branched.

From the viewpoint of increasing the water solubility of the binder resin, the number of carbon atom is preferably fewer in a case in which $R^{21}$ is a hydrocarbon group, and $R^{21}$ is preferably a hydrogen atom or an alkyl group having from 1 to 3 carbon atoms, more preferably a hydrogen atom or a methyl group, and particularly preferably a hydrogen atom.

The content of the structural unit represented by Formula (21) above is preferably from 0.1 to 99.9% by mole, more preferably from 1 to 99% by mole, and particularly preferably from 3 to 97% by mole in a case in which the total of the structural units constituting the binder resin is set to 100% by mole. The binding property with the current collector tends to be more favorable as the content of the structural unit represented by Formula (21) above is higher. In addition, excellent flexibility can be imparted to the electrode to be produced.

As the method of measuring the content of the structural unit represented by Formula (21) above in the binder resin, a colloid titration method to be described below can be suitably used.

An aqueous solution of the binder resin is accurately weighed and introduced into a volumetric flask, and then demineralized water is added thereto. The aqueous solution of the binder resin is taken from this volumetric flask by a transfer pipette and demineralized water is added thereto, and then the pH thereof is adjusted to 2.5 with a 1 N hydrochloric acid solution while checking the pH using a pH meter, thereby preparing a test solution.

The test solution thus obtained is added with toluidine blue and titrated with potassium N/400-polyvinyl sulfate solution. The point at which the color of the test solution is changed from blue to purple is taken as the endpoint. The content of the structural unit represented by Formula (21) above is determined from the titration result.

Examples of the monomer (hereinafter, referred to as the "monomer (c1)") to be the derivation source of the structural unit represented by Formula (21) above may include vinyl amine, allylamine, and (meth)acrylamide.

In Formula (22) above, $R^{22}$ and $R^{23}$ each independently represent a hydrogen atom or a hydrocarbon group having from 1 to 5 carbon atoms.

Specific examples of the hydrocarbon group may include an alkyl group such as a methyl group, an ethyl group, a n-propyl group, an iso-propyl group, a n-butyl group, a sec-butyl group, a tert-butyl group, and a pentyl group. The hydrocarbon group may be linear or branched.

From the viewpoint of increasing the water solubility of the binder resin, the number of carbon atom is preferably fewer in a case in which $R^{22}$ and $R^{23}$ are a hydrocarbon group, and $R^{22}$ and $R^{23}$ are each independently preferably a hydrogen atom or an alkyl group having from 1 to 3 carbon atoms, more preferably a hydrogen atom or a methyl group. Particularly, in terms of improving the water solubility, it is preferably that $R^{22}$ is a hydrogen atom and $R^{23}$ is a hydrogen atom or a methyl group, and among them, it is particularly preferably that $R^{23}$ is a hydrogen atom.

The content of the structural unit represented by Formula (22) above is preferably from 0.1 to 99.9% by mole, more preferably from 1 to 99% by mole, and particularly preferably from 3 to 97% by mole in a case in which the total of the structural units constituting the binder resin is set to 100% by mole. The viscosity stability of the slurry composition prepared by containing the binder resin tends to be improved as the content of the structural unit represented by Formula (22) above is higher.

As the method of measuring the content of the structural unit represented by Formula (22) above in the binder resin, the $^{13}$C-NMR measurement to be described below is suitable.

The $^{13}$C-NMR measurement is performed as follows. In 900 mg of heavy water added with 0.5% by mass of sodium 3-(trimethylsilyl)-1-propanesulfonate as the standard substance, 15 mg of the binder resin powder obtained by the freeze-drying of an aqueous solution of the binder resin is dissolved, this solution is introduced into a test tube having a diameter of 5 mm φ so as to have a liquid height of about 5 cm, and then the measurement is performed using a nuclear magnetic resonance apparatus, for example, under the following conditions.

Observation frequency: 500 MHz (1H decoupling pulse mode)
Measuring temperature: 30° C.
Integration number: 10,000 times Meanwhile, in the Fourier transform of the FID signal, zero filling is performed two times and then the broadening factor is set to 10 Hz.

The signal intensity of from 160 to 165 ppm is taken as the structural unit represented by Formula (22) above among the $^{13}$C-NMR spectra thus obtained, and the content of the structural unit represented by Formula (22) above is obtained from the ratio of the integral values of the signal intensities.

Examples of the monomer (hereinafter, referred to as the "monomer (c2)") to be the derivation source of the structural unit represented by Formula (22) above may include N-vinylformamide and N-vinylacetamide.

At least one of the polymer (α), the polymer (β1), and the polymer (β2) may have a structural unit represented by the following Formula (23).

[Chem. 25]

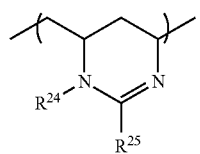

(23)

In Formula (23) above, $R^{24}$ and $R^{25}$ each independently represent a hydrogen atom or a hydrocarbon group having from 1 to 5 carbon atoms.

Specific examples of the hydrocarbon group may include an alkyl group such as a methyl group, an ethyl group, a n-propyl group, an iso-propyl group, a n-butyl group, a sec-butyl group, a tert-butyl group, and a pentyl group. The hydrocarbon group may be linear or branched.

From the viewpoint of increasing the water solubility of the binder resin, the number of carbon atom is preferably fewer in a case in which $R^{24}$ and $R^{25}$ are a hydrocarbon group, and $R^{24}$ and $R^{25}$ are each independently preferably a hydrogen atom or an alkyl group having from 1 to 3 carbon atoms, more preferably a hydrogen atom or a methyl group. Particularly, in terms of improving the water solubility, it is preferably that $R^{24}$ is a hydrogen atom and $R^{25}$ is a hydrogen atom or a methyl group, and among them, it is particularly preferably that $R^{25}$ is a hydrogen atom.

The content of the structural unit represented by Formula (23) above is preferably from 0 to 50% by mole, in a case in which the total of the structural units constituting the binder resin is set to 100% by mole.

As the method of measuring the content of the structural unit represented by Formula (23) above in the binder resin, the $^{13}$C-NMR measurement exemplified previously in the description of the method of measuring the content of the structural unit represented by Formula (22) above is suitable.

The signal intensity of from 150 to 155 ppm is taken as the structural unit represented by Formula (23) above among the $^{13}$C-NMR spectra thus obtained, and the content of the structural unit represented by Formula (23) above is obtained from the ratio of the integral values of the signal intensities.

The structural unit represented by the following Formula (23) is formed by removing water or the like through a chemical reaction between the structural units represented by Formulas (21) and (22) above in a case in which either $R^{21}$ of the structural unit represented by Formula (21) above or $R^{22}$ of the structural unit represented by Formula (22) above is a hydrogen atom.

The polymer (α), the polymer (β1), and the polymer (β2) may have a unit (hereinafter, referred to as the "arbitrary unit") other than the structural units represented by Formulas (21) and (22) above if necessary.

The monomer (hereinafter, referred to as the "monomer (c3)") to be the derivation source of the arbitrary unit is not particularly limited as long as a monomer is copolymerizable with the monomer (c1) and the monomer (c2), and examples thereof may include a vinyl cyanide monomer such as acrylonitrile, methacrylonitrile, α-cyanoacrylate, dicyanovinylidene, and fumaronitrile ethyl; a (meth)acrylate such as (meth)acrylate, propyl (meth)acrylate, butyl (meth)acrylate, and hexyl (meth)acrylate; a carboxyl group-containing monomer such as (meth)acrylic acid, itaconic acid, and crotonic acid, and a salt thereof, an aromatic vinyl monomer such as styrene and α-methylstyrene; a maleimide such as maleimide and phenylmaleimide; a sulfonic acid group-containing vinyl monomer such as (meth)allyl sulfonic acid, (meth)allyloxybenzenesulfonic acid, and styrenesulfonic acid, and a salt thereof, a phosphoric acid group-containing vinyl monomer such as 2-(meth)acryloyloxyethyl acid phosphate, 2-(meth)acryloyloxyethyl acid phosphate.monoethanolamine salt, diphenyl((meth)acryloyloxyethyl) phosphate, (meth)acryloyloxypropyl acid phosphate, 3-chloro-2-acid phosphooxypropyl (meth)acrylate, acid.phosphooxypolyoxyethylene glycol mono(meth)

acrylate, and acid.phosphooxypolyoxypropylene glycol (meth)acrylate, and a salt thereof, dimethylaminoethyl (meth)acrylate; vinyl acetate; and N-vinylpyrrolidone.

One kind of these monomers (c3) may be used singly, or two or more kinds thereof may be used concurrently.

The mass average molecular weight of the polymer (α) is preferably from 5,000 to 10,000,000 and more preferably from 10,000 to 7,500,000. The binding property is enhanced when the mass average molecular weight of the polymer (α) is equal to or higher than the lower limit value, and the water solubility is more favorable when the mass average molecular weight is equal to or lower than the upper limit value.

The mass average molecular weight of the polymer (β1) is preferably from 5,000 to 10,000,000 and more preferably from 10,000 to 7,500,000. The binding property is enhanced when the mass average molecular weight of the polymer (β1) is equal to or higher than the lower limit value, and the water solubility is more favorable when the mass average molecular weight is equal to or lower than the upper limit value.

The mass average molecular weight of the polymer (β2) is preferably from 5,000 to 10,000,000 and more preferably from 10,000 to 7,500,000. The binding property is enhanced when the mass average molecular weight of the polymer (β2) is equal to or higher than the lower limit value, and the water solubility is more favorable when the mass average molecular weight is equal to or lower than the upper limit value.

The mass average molecular weights of the polymer (α), the polymer (β1), and the polymer (β2) can be measured using gel permeation chromatography (GPC).

In addition, the viscosity conversion molecular weights of the polymer (α), the polymer (β1), and the polymer (β2) can be determined from the viscosity of the aqueous solution obtained by dissolving each of the polymers in water, respectively.

The content of the component (α) and the component (β) in the binder resin is preferably the amount in which the contents of the structural units represented by Formulas (21) and (22) above are in the above described range.

The binder resin of the third aspect of the invention may be composed of only the component (α) and/or the component (β), or may be a mixture of the polymer (α) and the polymer (β1) or a mixture of the polymer (α) and the polymer (β2).

In addition, another polymer other than the component (α) and the component (β) may be contained in the range in which the effect of the invention is not impaired.

Examples of another polymer may include polyacrylic acid and a salt thereof, polyvinyl alcohol, and polyvinylpyrrolidone, and one kind of these may be used singly or two or more kinds thereof may be used concurrently.

Another polymer can be used at about from 0 to 20 parts by mass in a case in which the total of the component (α) and the component (β) is set to 100 parts by mass.

The polymer (β1) is obtained by polymerizing a monomer starting material containing the monomer (c1).

The polymer (β2) is obtained by polymerizing a monomer starting material containing the monomer (c2).

The monomer (c3) may be contained in the monomer starting materials of the polymer (β1) and the polymer (β2) if necessary.

The polymer (α1) is obtained by copolymerizing the monomer (c1), the monomer (c2), and if necessary the monomer (c3).

The polymerization method is not particularly limited, and a solution polymerization, a suspension polymerization, an emulsion polymerization, or the like can be selected depending on the kind of the monomer to be used, the solubility of the polymer to be produced, or the like.

For example, the aqueous solution polymerization can be selected in a case in which each of the monomers is soluble in water and the affinity of the polymer to be produced for water is sufficient. The aqueous solution polymerization is a method to obtain a polymer by dissolving a monomer of a starting material and a water-soluble polymerization initiator in water and heating the resultant solution.

In addition, the suspension polymerization, the emulsion polymerization, or the like can be selected in a case in which the solubility of the monomer to be used in water is low. The emulsion polymerization is a method to obtain a polymer by adding a monomer of a starting material, an emulsifier, a water-soluble polymerization initiator, and the like into water, and heating the resultant solution under stirring.

After polymerization, a polymer in powder form is obtained by removing water by filtration, centrifugation, heat drying, vacuum drying, and combination thereof.

The binder resin can be produced as follows, for example.

The polymer (α) is obtained by the above described method, and then another polymer may be added thereto in a case in which the binder resin contains the component (α).

Meanwhile, the polymer (β1) and polymer (β2) are obtained by the above described method, thereafter the mixture (β) is obtained by mixing these polymers, and another polymer may be further added thereto in a case in which the binder resin contains the component (β).

In addition, the binder resin is also obtained by hydrolyzing the polymer (β2). According to this method, the binder resin can be produced without using the monomer (c1) in the polymerization when the monomer (c1) is unstable as a substance, and thus the binder resin can be more stably provided.

A polymer (corresponding to the polymer (α)) having the structural unit represented by Formula (21) above and the structural unit represented by Formula (22) above, a polymer (corresponding to the polymer (α)) having the structural unit represented by Formula (21) above, the structural unit represented by Formula (22) above, and structural unit represented by Formula (23) above, and a polymer (corresponding to the polymer (β2)) having the structural unit represented by Formula (22) above, and structural unit represented by Formula (23) above is obtained by hydrolyzing the polymer (β2). Moreover, the polymer (β1)) in which the structural unit represented by Formula (22) above is substituted with the structural unit represented by Formula (21) above is obtained when the hydrolysis of the polymer (β2) has proceeded at almost 100%.

Examples of the method of hydrolysis may include a hydrolysis by acid, a hydrolysis by an alkali, and a hydrolysis by applying heat. Among these, the hydrolysis by an alkali is preferable.

Examples of the alkali (base) used for the hydrolysis by an alkali may include the metal hydroxides of the metals of Group 1 and Group 2 in the periodic table. Specific examples thereof may include sodium hydroxide, lithium hydroxide, potassium hydroxide, calcium hydroxide, strontium hydroxide, and barium hydroxide.

In addition, ammonia and an alkyl derivative of ammonia, for example, an amine such as alkylamine and allylamine are also suitable as the alkali. Examples of the amine may include triethylamine, monoethanolamine, diethanolamine, triethanolamine, morpholine, and aniline. Among these, sodium hydroxide, lithium hydroxide, and potassium hydroxide are preferable as the alkali.

The pH of the reaction liquid thus obtained is acidic or alkaline in a case in which the polymer (β2) is hydrolyzed using an acid or an alkali, but the reaction liquid may be neutralized to obtain a neutral aqueous solution if necessary. In addition, the reaction liquid obtained by hydrolysis can be used as the binder resin as it is, but a polymer obtained by removing water from the reaction liquid may be used as the binder resin.

Meanwhile, since the polymer (β1) having the structural unit represented by Formula (21) above at 90% by mole or more is obtained in a case in which the hydrolysis of the polymer (β2) has proceeded at almost 100%, a mixture of this polymer (β1) and the polymer (β2) is used as the binder resin.

Examples of the form of the binder resin may include a powder form, a granular form, and a dope form in which the binder resin is dissolved or dispersed in a solvent such as water or the like.

The binder resin of the third aspect of the invention described above contains the component (α) (that is, polymer (α) having the structural unit represented by Formula (22) above which is an amide structural unit and the structural unit represented by Formula (21) above), and/or the component (β) (that is, a mixture of the polymer (β2) having the structural unit represented by Formula (22) above and the polymer (β1) having the structural unit represented by Formula (21) above). The polymer (α), the polymer (β1), and the polymer (β2) are soluble in water and excellent in flexibility. Moreover, an electrode produced using a mixture of the polymer (α) or the polymer (β1) and the polymer (β2) is excellent in binding property, and the battery equipped with the electrode is excellent in battery characteristics as well.

Consequently, the binder resin of the third aspect of the invention is soluble in water and can form an electrode excellent in flexibility. Specifically, it is possible to form an electrode having a mixture layer exhibiting no change when the flexibility of the electrode is evaluated according to the flexibility test described in the second aspect. Moreover, the binder resin of the third aspect of the invention is also excellent in binding property, and thus a battery excellent in battery characteristics is obtained.

«Binder Resin Composition for Nonaqueous Secondary Battery Electrode»

The binder resin composition for a nonaqueous secondary battery electrode (hereinafter, simply referred to as the binder resin composition) of the third aspect of the invention contains the binder resin of the third aspect of the invention described above.

Examples of the form of the binder resin composition may include a powder form and a dope form in which the binder resin composition is dissolved or dispersed in a solvent such as water or the like.

The content of the binder resin in the binder resin composition is preferably 50% by mass or more, more preferably 80% by mass or more, and may be 100% by mass. The effect of the invention is remarkably exerted when the content is equal to or more than the lower limit value.

The binder resin composition of the third aspect of the invention may contain a binder resin (another binder resin) other than the binder resin of the third aspect of the invention, or an additive such as a viscosity modifier a binding property improver, and a dispersant if necessary in an amount in which the battery performance is not affected.

Examples of another binder resin may include the same binder resins as those exemplified previously in the descriptions of the binder resin compositions of the first aspect and the second aspect.

Examples of the viscosity modifier may include the same viscosity modifiers as those exemplified previously in the description of the binder resin composition of the first aspect.

It is desirable that an additive is not added if possible since an additive such as the viscosity modifier finally remains in the electrode, and an additive having electrochemical stability is preferably used in the case of adding an additive.

The content of the additive is preferably 50% by mass or less when the binder resin composition is set to 100% by mass in a case in which the binder resin composition contains an additive such as the viscosity modifier. However, it is more preferable as the content of the additive is lower from the viewpoint of enhancing the battery performance.

The binder resin composition can be produced by a known method. For example, the binder resin composition is obtained by the powder mixing of the binder resin of the third aspect of the invention and if necessary another binder resin in powder form or a powder form additive, or by dispersing the binder resin of the third aspect of the invention and if necessary another binder resin in powder form or a powder form additive in water.

The binder resin composition of the third aspect of the invention described above contains the binder resin of the third aspect of the invention described above, and thus is soluble in water and can form an electrode excellent in flexibility. Moreover, the binder resin composition of the third aspect of the invention is also excellent in binding property, and thus a battery excellent in battery characteristics is obtained.

«Slurry Composition for Nonaqueous Secondary Battery Electrode»

The slurry composition for a nonaqueous secondary battery electrode (hereinafter, simply referred to as the slurry composition) of the third aspect of the invention contains the binder resin of the third aspect of the invention or the binder resin composition of the third aspect of the invention described above, an active material, and water.

The binder resin used for the slurry composition of the third aspect of the invention is the binder resin of the third aspect of the invention described above, and thus the detailed description thereof will be omitted here. In addition, the binder resin composition used for the slurry composition of the third aspect of the invention is the binder resin composition of the third aspect of the invention described above, and thus the detailed description thereof will be omitted here.

The content of the binder resin in the slurry composition of the third aspect of the invention is not particularly limited, but is preferably from 0.01 to 15% by mass and more preferably from 0.1 to 10% by mass in the total solid matters (all components except the solvent) of the slurry composition. The adhesive property (binding property) between the mixture layer formed using the slurry composition and the current collector is enhanced when the content is 0.01% by mass or more. An active material or an arbitrary component (for example, a conductive auxiliary) to be described below can be sufficiently contained when the content is 15% by mass or less, and thus the battery characteristics are improved.

The active material used in the slurry composition of the third aspect of the invention is not particularly limited, and a known material can be used depending on what kind of nonaqueous secondary battery the electrode to be produced using the slurry composition is for.

For example, in the case of a lithium-ion secondary battery, a material which exhibits a higher potential (with respect to metal lithium) than the active material of the negative electrode (negative electrode active material) and can absorb and desorb lithium ions during charge and discharge is used as the active material of the positive electrode (positive electrode active material).

Specific examples of the positive electrode active material and the negative electrode active material may include the same positive electrode active materials and negative electrode active materials as those exemplified previously in the description of the slurry composition of the first aspect. One kind of these positive electrode active materials and negative electrode active materials may be used singly, or two or more kinds thereof may be used concurrently.

In a lithium-ion secondary battery, it is preferable to use a lithium-containing metal composite oxide as the positive electrode active material and graphite as the negative electrode active material. The voltage of the lithium-ion secondary battery can be increased to, for example, 4 V or higher by such combination.

The content of the active material in the slurry composition of the third aspect of the invention is not particularly limited, but is preferably from 80 to 99.9% by mass and more preferably from 85 to 99% by mass in the total solid matters (all components except the solvent) of the slurry composition. The function as the mixture layer is sufficiently exerted when the content is 80% by mass or more. The adhesive property (binding property) between the mixture layer and the current collector is favorable when the content is 99.9% by mass or less.

As the solvent contained in the slurry composition of the third aspect of the invention, at least water is used, but a mixed solvent of water and an organic solvent may be used. As the organic solvent, a solvent easily and uniformly dissolving or dispersing the binder resin is selected, and specific examples thereof may include the same organic solvents as those exemplified in the description of the slurry composition of the first aspect. One kind of these organic solvents may be used singly, or two or more kinds thereof may be used concurrently.

Examples of the mixed solvent may include a mixed solvent of water and an alcohol solvent, a mixed solvent of water, NMP, and an ester solvent, and a mixed solvent of water, NMP, and a glyme solvent.

However, it is preferable to use water singly as the solvent since the organic solvent has high environmental impact.

The content of the solvent in the slurry composition of the third aspect of the invention may be the minimum amount required to maintain the state that the binder resin is dissolved or dispersed at room temperature, but is preferably from 5 to 50% by mass and more preferably from 10 to 40% by mass. The content of the solvent in the slurry composition is determined in consideration of the viscosity of the slurry composition at which coating on the current collector is easily performed when the mixture layer is formed using the slurry composition.

The slurry composition of the third aspect of the invention may contain a component (arbitrary component) other than the binder resin of the third aspect of the invention or the binder resin composition of the third aspect of the invention, an active material, and a solvent if necessary.

Examples of the arbitrary component may include a conductive auxiliary, an antioxidant, and a thickener.

Particularly, in a case in which the slurry composition of the third aspect of the invention is a slurry composition to form a mixture layer of the positive electrode or a slurry composition to form a mixture layer of the negative electrode containing metal fine particles such as silicon, the slurry composition preferably contains a conductive auxiliary. By containing a conductive auxiliary, the electrical contact between the active materials or the active material and the metal fine particles can be improved and thus the battery performance such as the discharge rate characteristics of a nonaqueous secondary battery can be enhanced.

Examples of the conductive auxiliary may include the same conductive auxiliaries as those exemplified previously in the description of the slurry composition of the first aspect. One kind of these conductive auxiliaries may be used singly, or two or more kinds thereof may be used concurrently.

The content of the conductive auxiliary in the slurry composition of the second aspect of the invention is not particularly limited, but is preferably from 0.01 to 10% by mass and more preferably from 0.1 to 7% by mass in the total solid matters (all components except the solvent) of the slurry composition. The battery performance is enhanced when the content is 0.01% by mass or more. The adhesive property (binding property) between the mixture layer and the current collector is favorable when the content is 10% by mass or less.

The slurry composition of the third aspect of the invention can be produced by mixing and kneading the binder resin of the third aspect of the invention or the binder resin composition of the third aspect of the invention, an active material, a solvent, and if necessary an arbitrary component (for example, a conductive auxiliary). The mixing and kneading can be performed by a known method.

At the time of the preparation of slurry, the binder resin of the third aspect of the invention or the binder resin composition of the third aspect of the invention may be used as it is or may be used as a resin solution by being dissolved in the solvent in advance before being mixed with the active material or the arbitrary component (for example, a conductive auxiliary).

The slurry composition of the third aspect of the invention described above contains the binder resin of the third aspect of the invention or the binder resin composition of the third aspect of the invention, and thus can form an electrode excellent in flexibility. Moreover, the slurry composition of the third aspect of the invention is also excellent in binding property, and thus a battery excellent in battery characteristics is obtained.

«Electrode for Nonaqueous Secondary Battery»

The electrode for a nonaqueous secondary battery (hereinafter, simply referred to as the electrode) of the third aspect of the invention is equipped with a current collector and a mixture layer provided on the current collector, and the mixture layer contains the binder resin of the third aspect of the invention or the binder resin composition of the third aspect of the invention described above and an active material.

The current collector may be any material having conductivity, and examples thereof may include a metal such as aluminum, copper, and nickel.

The shape of the current collector can be determined depending on the shape of the desired battery. Examples thereof may include a thin film shape, a reticular shape, and a fibrous shape, and the thin film shape is preferable among them.

The thickness of the current collector is not particularly limited, but is preferably from 5 to 30 μm and more preferably from 8 to 25 μm.

The binder resin used in the mixture layer is the binder resin of the third aspect of the invention described above, and thus the detailed description thereof is omitted here.

The content of the binder resin in the mixture layer is not particularly limited, but is preferably form 0.01 to 15% by mass and more preferably from 0.1 to 10% by mass. The adhesive property (binding property) between the mixture layer formed using the slurry composition of the third aspect of the invention described above and the current collector is enhanced when the content is 0.01% by mass or more. An active material or an arbitrary component (for example, a conductive auxiliary) can be sufficiently contained when the content is 15% by mass or less, and thus the battery characteristics are improved.

Examples of the active material used for the mixture layer may include the same active materials as those exemplified previously in the description of the slurry composition of the first aspect.

The content of the active material in the mixture layer is not particularly limited, but is preferably from 80 to 99.9% by mass and more preferably from 85 to 99% by mass. The function as the mixture layer is sufficiently exerted when the content is 80% by mass or more. The adhesive property (binding property) between the mixture layer and the current collector is favorable when the content is 99.9% by mass or less.

In a case in which the electrode of the third aspect of the invention is a positive electrode or a negative electrode containing metal fine particles such as silicon, the mixture layer preferably contains a conductive auxiliary. By containing a conductive auxiliary, the battery performance can be enhanced.

Examples of the conductive auxiliary may include the same conductive auxiliaries as those exemplified previously in the description of the slurry composition of the first aspect. One kind of these conductive auxiliaries may be used singly, or two or more kinds thereof may be used concurrently.

The content of the conductive auxiliary in the mixture layer is not particularly limited, but is preferably from 0.01 to 10% by mass and more preferably from 0.1 to 7% by mass. The battery performance is enhanced when the content is 0.01% by mass or more. The adhesive property (binding property) between the mixture layer and the current collector is favorable when the content is 10% by mass or less.

The mixture layer can be formed by dissolving or dispersing the binder resin of the third aspect of the invention or the binder resin composition of the third aspect of the invention described above, an active material, and if necessary an arbitrary component (for example, a conductive auxiliary) in a solvent to prepare the slurry composition of the third aspect (slurry preparing process), coating the slurry composition on a current collector (coating process), drying the coated slurry composition to remove the solvent (solvent removing process), and if necessary rolling (rolling process).

The mixture layer may be provided on one side or both sides of the current collector in a case in which the current collector has a thin film shape or a reticular shape.

The method of coating the slurry composition is not particularly limited as long as the slurry composition can be coated on the current collector at an arbitrary thickness, and examples thereof may include the same coating methods as those exemplified previously in the description of the electrode of the first aspect.

The coating amount can be appropriately set depending on the thickness of the mixture layer to be formed.

The mixture layer is formed by drying the coated slurry composition to remove the solvent.

The drying method is not particularly limited as long as the solvent can be removed. Examples thereof may include the same drying methods as those exemplified previously in the description of the electrode of the first aspect.

After drying, the mixture layer thus formed may be rolled if necessary. By performing rolling, the area of the mixture layer is widened and can be adjusted to an arbitrary thickness.

Examples of the rolling method may include a die press method or a roll press method.

Meanwhile, the electrode thus obtained may be cut into an arbitrary dimension.

The thickness of the mixture layer can be appropriately determined depending on the kind of the active material, but is, for example, preferably from 20 to 200 μm and more preferably from 30 to 120 μm.

The electrode of the third aspect of the invention can be used for both the positive electrode and negative electrode of a nonaqueous secondary battery. Particularly, the electrode is suitable as an electrode for a lithium-ion secondary battery.

The electrode of the third aspect of the invention described above is excellent in flexibility since the mixture layer containing the binder resin of the third aspect of the invention or the binder resin composition of the third aspect of the invention is formed on the current collector. Moreover, the mixture layer of the electrode of the third aspect of the invention is excellent in binding property with respect to the current collector. In addition, the active material is hardly lost, and thus a high discharge capacity is maintained over a long period of time.

«Nonaqueous Secondary Battery»

The nonaqueous secondary battery (hereinafter, simply referred to as the battery) of the third aspect of the invention is equipped with the electrode for a nonaqueous secondary battery of to the third aspect of the invention described above.

The "nonaqueous secondary battery" uses a nonaqueous electrolyte not containing water as the electrolyte, and examples thereof may include a lithium-ion secondary battery. The nonaqueous secondary battery is usually equipped with an electrode (positive electrode and negative electrode), a nonaqueous electrolyte, and a separator, and examples thereof may include the same nonaqueous secondary batteries as those exemplified previously in the description of the battery of the first aspect.

Examples of the nonaqueous electrolyte may include an electrolytic solution prepared by dissolving a solid electrolyte in an organic solvent.

Examples of the organic solvent for the electrolytic solution may include the same organic solvents for the electrolytic solution as those exemplified previously in the description of the nonaqueous secondary battery of the first aspect. One kind of these organic solvents may be used singly, or two or more kinds thereof may be used concurrently.

As the solid electrolyte, a known solid electrolyte can be used depending on the kind of the nonaqueous secondary battery or the active material. For examples, in the case of a lithium-ion secondary battery, any known lithium salts can be used, and examples thereof may include the same solid electrolytes as those exemplified previously in the description of the battery of the first aspect.

The electrolytic solution for a lithium-ion secondary battery is preferably a solution prepared by dissolving $LiPF_6$ in a carbonate.

The battery of the third aspect of the invention uses the electrode of the third aspect of the invention in either one or both of the positive electrode and the negative electrode.

In a case in which either the positive electrode or the negative electrode is the electrode of the third aspect of the invention, a known electrode can be used as the other electrode.

As the separator, a known separator can be used, and examples thereof may include the same separators as those exemplified previously in the description of the battery of the first aspect.

The method of producing the battery of the third aspect of the invention is not particularly limited, and a known method can be employed. Examples thereof may include the same method of producing a lithium-ion secondary battery as that exemplified previously in the description of the battery of the first aspect.

Meanwhile, the electrode of the third aspect of the invention is excellent in flexibility, and thus is easily wound or folded.

The shape of the battery may be any shape such as a coin shape, a cylindrical shape, a square shape, and a flat shape.

The battery of the third aspect of the invention described above is equipped with the electrode of to the third aspect of the invention, and thus is excellent in battery performance. The electrode is hardly broken even when stress is applied since the electrode is excellent in flexibility and the binder resin is hardly dissolved into the electrolyte solution, and thus high battery performance can be maintained, which leads to the excellent battery performance. In addition, the binding property of the mixture layer with respect to the current collector is high since the mixture layer contains the binder resin of the third aspect of the invention or the binder resin composition of the third aspect of the invention, and thus the battery performance is more improved.

EXAMPLES

Hereinafter, the invention will be described in detail with reference to Examples and Comparative Examples. However, the invention is not limited by the following description.

[Production of Binder Resin]

Production Example 1-1

Production of Polymer (A-1)

The pH of an aqueous monomer solution obtained by mixing 29.1 parts by mass of N-vinylformamide, 0.9 part by mass of acrylic acid added with an aqueous lithium hydroxide solution so as to have a pH of 9, and 0.8 part by mass of sodium acetate with respect to 70 parts by mass of deionized water was adjusted to 6.3 with phosphoric acid to obtain an adjusted monomer solution.

This adjusted monomer solution was cooled to 5° C. and then introduced into an adiabatic reactor equipped with a thermometer, and nitrogen aeration was performed for 15 minutes. Thereafter, 1500 ppm (with respect to the monomer) 2,2'-azobis[N-(2-carboxyethyl)-2-methylpropionamidine] ("VA-057" manufactured by Wako Pure Chemical Industries, Ltd.) was added thereto as a 10% by mass aqueous solution, subsequently 200 ppm (with respect to the monomer) t-butyl hydroperoxide was added thereto as a 10% by mass aqueous solution, and further 200 ppm (with respect to the monomer) sodium hydrogen sulfite was added thereto as a 10% by mass aqueous solution, thereby performing the polymerization.

Aging was performed for another 1 hour after the internal temperature exceeded the peak, the gel was taken out and ground with a meat chopper, and then dried for 10 hours at 60° C., and the solid thus obtained was ground, thereby obtaining a polymer in powder form. This was used as a polymer (A-1).

Meanwhile, the viscosity average molecular weight (Mv) of the polymer (A-1) calculated by the following method was 1,750,000 in terms of PNVF.

Method of Calculating Viscosity Average Molecular Weight:

The intrinsic viscosity [η] was calculated from the reduced viscosity (ηsp/C) of an aqueous solution of the polymer (A-1) and the Huggins Equation ($\eta sp/C=[\eta]+K'[\eta]^2 C$). Meanwhile, the "C" in the equation is the concentration (g/dL) of the polymer (A-1) in the aqueous solution of the polymer (A-1). The method of measuring the reduced viscosity of the aqueous solution of the polymer (A-1) is described below.

The viscosity average molecular weight ("M" in the equation) was calculated from the intrinsic viscosity [η] thus obtained and the Mark-Houwink Equation ($[\eta]=KM^a$).

Meanwhile, the parameters of PNVF in 1 N saline solution are $K=8.31\times10^{-5}$, $a=0.76$, and $K'=0.31$.

Method of Measuring Reduced Viscosity:

First, the polymer (A-1) was dissolved in 1 N saline solution such that the concentration of the polymer (A-1) was 0.1% by mass, thereby obtaining an aqueous solution of the polymer (A-1). The flow time ($t_1$) of the aqueous solution of the polymer (A-1) thus obtained at 25° C. was measured using an Ostwald viscometer.

Separately, as the blank, the flow time ($t_0$) of 1 N saline solution at 25° C. was measured using an Ostwald viscometer.

The reduced viscosity was calculated from the flow times thus obtained by the following Expression (iii).

$$\eta sp/C=\{(t_1/t_0)-1\}/C \quad \text{(iii)}$$

(in Expression (iii), C is the concentration (g/dL) of the polymer (A-1) in the aqueous solution of the polymer (A-1).)

Production Example 1-2

Production of Polymer (A-2)

A polymer in power form was obtained in the same manner as in Production Example 1-1 except using 0.9 part by mass of methyl acrylate instead of 0.9 part by mass of acrylic acid added with an aqueous lithium hydroxide solution so as to have a pH of 9. This was used as a polymer (A-2).

Meanwhile, the viscosity average molecular weight (Mv) of the polymer (A-2) calculated by the same method as that of the polymer (A-1) was 2,370,000 in terms of PNVF.

Production Example 1-3

Production of Polymer (A-3)

A polymer in power form was obtained in the same manner as in Production Example 1-1 except using 0.9 part by mass of methoxypolyethylene glycol monomethacrylate ("BLEMMER PME-200" manufactured by NOF CORPORATION) instead of 0.9 part by mass of acrylic acid added with an aqueous lithium hydroxide solution so as to have a pH of 9. This was used as a polymer (A-3).

Meanwhile, the viscosity average molecular weight (Mv) of the polymer (A-3) calculated by the same method as that of the polymer (A-1) was 2,900,000 in terms of PNVF.

<Polymer (A-5)>

A polyacrylic acid (mass average molecular weight (Mw): about 1,000,000) manufactured by Wako Pure Chemical Industries, Ltd. was used as a polymer (A-5) as it Was.

Examples 1-1 to 1-3 and Comparative Example 1-1

The polymers (A-1) to (A-3) obtained in Production Examples 1-1 to 1-3 and the commercially available polyacrylic acid used as a polymer (A-5) were used as the binder resin, respectively.

The $I_s$ of the binder resin thus obtained was measured by the following procedure.

In addition, various characteristics of the slurry compositions for a positive electrode obtained using the respective binder resins, the electrodes (positive electrode) produced using the slurry compositions for a positive electrode, and the secondary batteries produced using the electrodes (positive electrode) were evaluated by the following procedures. The results are shown in Table 1.

(1) Measurement of $I_s$ of Binder Resin

To 0.5 part by mass of the binder resins of Examples 1-1 to 1-3 and Comparative Example 1-1, 9.5 parts by mass of distilled water was added, and the resultant was stirred for 24 hours using a stirring bar, thereby preparing the sample solutions.

The particle size distribution of the binder resin in the sample solution was measured using concentrated system particle size analyzer FPAR-1000 (high sensitivity specification, diluted solution type probe) manufactured by OTSUKA ELECTRONICS CO., LTD. under the following measurement condition.

Measurement condition: After the measurement at a temperature of 25° C. for a cumulative time of 180 seconds was repeated three times, the analysis was performed by the MARQUARDT method, and the average of the particle size distribution data obtained in three times of measurement was calculated to use as the particle size distribution of the binder resin. Meanwhile, the particle size range was set to from 0.1 to 1,000,000 nm.

The sum $I_s$ of the scattering intensities observed in the particle size range of from 1 to 100 nm was obtained from the measurement results.

(2) Preparation of Slurry Composition for Positive Electrode

A slurry composition for a positive electrode was prepared by mixing 100 parts by mass of lithium cobalt oxide ("Cellseed C-5H" manufactured by Nippon Chemical Industrial Co., Ltd.) as the active material, 5 parts by mass of acetylene black ("Denka Black" manufactured by DENKI KAGAKU KOGYO KABUSHIKI KAISHA) as a conductive auxiliary, 2 parts by mass of the binder resin of Examples 1-1 to 1-3 and Comparative Example 1-1 with 40 parts by mass of distilled water using a rotary and revolutionary stirrer ("AWATORIRENTARO" manufactured by THINKY) under a condition of rotation at 1000 rpm and revolution at 2000 rpm.

(3) Evaluation of Thixotropy of Slurry Composition for Positive Electrode

The shear rate-viscosity curve of the slurry composition for a positive electrode prepared in (2) above was measured using stress control rheometer AR550 manufactured by TA Instruments Waters LC. For the measurement, a cone plate having ϕ 40 mm and an angle of 2° was used, the gap was set to 69 mm, and the temperature was set to 25° C. As the shear rate program, a shear rate program to measure the viscoelasticity while changing a shear rate from 0.03 sec$^{-1}$ to 100 sec$^{-1}$, and then to measure the viscoelasticity while changing a shear rate from 100 sec$^{-1}$ to 0.03 sec$^{-1}$ was used.

The viscoelasticity was measured at 25° C. by the shear rate program described above, after the shear rate reached 100 sec$^{-1}$, the viscosity ($\eta_{80}$) at the shear rate of 80 sec$^{-1}$ and the viscosity ($\eta_{0.1}$) at the shear rate of 0.1 sec$^{-1}$ when the viscoelasticity is measured while changing the shear rate from 100 sec$^{-1}$ to 0.03 sec$^{-1}$ were obtained, and $\eta_{0.1}$ was divided by $\eta_{80}$, thereby obtaining $\eta_{0.1}/\eta_{80}$ of the binder resin.

It indicates that the thixotropy of the slurry composition is higher as the value of $\eta_{0.1}/\eta_{80}$ is greater. It is considered that thixotropy is favorable when the value of $\eta_{0.1}/\eta_{80}$ is 20 or more.

(4) Production of Electrode (Positive Electrode)

The slurry composition for a positive electrode prepared in (2) above was coated on an aluminum foil (19 cm×25 cm, and thickness: 20 μm) using a doctor blade, and the resultant was dried for 1 hour at 80° C. in a circulation type hot air dryer and then further dried under reduced pressure for 12 hours at 100° C. by a vacuum dryer, thereby obtaining an electrode (positive electrode) in which a mixture layer having a film thickness of 80 μm is coated on an aluminum foil.

(5) Evaluation of Uniformity of Mixture Layer

The vertical cross section of the electrode (positive electrode) produced in (4) above was cut using a cross section specimen preparation device ("SM-09010" manufactured by JEOL Ltd.), and then the cross section was observed at three positions at which the surface of the mixture layer and the adhesion interface between the aluminum foil and the mixture layer could be simultaneously observed in the visual field of 1000 magnifications using a scanning electron microscope ("SU1510" manufactured by Hitachi High-Technologies Corporation). Among the images thus obtained, the proportion (SU) of the area occupied by the active material (lithium cobalt oxide) in the image of 10 μm toward the mixture layer center from the surface of the mixture layer by 50 μm width and the proportion (SB) of the area occupied by the active material (lithium cobalt oxide) in the image of 10 μm toward the mixture layer center from the adhesion interface between the aluminum foil and the mixture layer by 50 μm width were determined by an image analysis software ("Image-Pro PLUS ver4.5.0" developed by Media Cybernetics Inc.), and evaluated as follows.

◯: The absolute value of (SU/SB)−1 is 0.1 or smaller.

Δ: The absolute value of (SU/SB)−1 is greater than 0.1 and 0.2 or smaller.

x: The absolute value of (SU/SB)−1 is greater than 0.2.

To be "◯" indicates that the active material is homogeneously present in the entire mixture layer and thus the paint characteristics are favorable.

(6) Production of Secondary Battery (2016-Type Coin Battery)

The electrode (positive electrode) produced in (4) above and a commercially available metal lithium electrode (negative electrode) were faced to each other via a separator (trade name: Celgard #2400). A 2016-type coin battery was produced using, as the nonaqueous electrolyte, 1 M solution of lithium hexafluorophosphate obtained using a mixture of ethylene carbonate/diethyl carbonate=1/2 (volume ratio) as a solvent.

(7) Measurement of Initial Battery Capacity of Secondary Battery

Immediately after the production of the 2016-type coin battery by (6) above, the battery capacity when the battery was charged to 4.2 V at 60° C. and a charge and discharge rate of 0.5 C by a constant current anodizing process (current density: 0.6 mA/g—active material) was measured, and the measured value was taken as the initial battery capacity.

TABLE 1

| | Kind of polymer | $I_s$ | Thixotropy of slurry composition $[\eta_{0.1}/\eta_{80}]$ | Uniformity of mixture layer | Initial battery capacity (mAh/g) |
|---|---|---|---|---|---|
| Example 1-1 | A-1 | 102.1 | 25 | ◦ | 355 |
| Example 1-2 | A-2 | 101.5 | 132 | ◦ | 353 |
| Example 1-3 | A-3 | 232.2 | 44 | ◦ | 350 |
| Comparative Example 1-1 | A-5 | 20.4 | 6 | x | 335 |

As shown in the results of Table 1, the binder resins of Examples 1-1 to 1-3 exhibited a great $I_s$ value, and as the result thereof, the thixotropy of the obtained slurry compositions for a positive electrode were favorable. The storage stability of the slurry composition or the uniformity of the mixture layer becomes more favorable as the thixotropy of the slurry composition is more favorable and thus the battery characteristics are improved. In fact, the electrode (positive electrode) obtained using the slurry composition for a positive electrode of each Example was favorable in the uniformity of the mixture layer. In addition, the initial battery capacity of the secondary battery obtained using the electrode (positive electrode) was also favorable.

On the other hand, the value of $I_s$ of the binder resin of Comparative Example 1-1 was less than 30, and thus the thixotropy thereof was poor.

Production Example 1-5

Production of N-Vinylformamide Polymer

The pH of an aqueous monomer solution obtained by mixing 30 parts by mass of N-vinylformamide (molecular weight: 71.08) with respect to 70 parts by mass of deionized water was adjusted to 6.3 with phosphoric acid to obtain an adjusted monomer solution.

This adjusted monomer solution was cooled to 5° C. and then introduced into an adiabatic reactor equipped with a thermometer, and nitrogen aeration was performed for 15 minutes. Thereafter, 0.4 part by mass of a 10% by mass aqueous solution of 2,2'-azobis[N-(2-carboxyethyl)-2-methylpropionamidine] ("VA-057" manufactured by Wako Pure Chemical Industries, Ltd.) was added thereto, subsequently 0.1 part by mass of a 10% by mass aqueous solution of t-butyl hydroperoxide and 0.1 part by mass of a 10% by mass aqueous solution of sodium hydrogen sulfite were added thereto, respectively, thereby performing the polymerization.

Aging was performed for another 1 hour after the internal temperature exceeded the peak, the gel was taken out and ground with a meat chopper, and then dried for 10 hours at 60° C., and the solid thus obtained was ground, thereby obtaining N-vinylformamide polymer in powder form.

Meanwhile, the viscosity average molecular weight (Mv) of the N-vinylformamide polymer calculated by the same method as that of the polymer (A-1) was 2,630,000 in terms of PNVF.

Production Example 1-6

Production of Polymer (A-6)

An aqueous polymer solution was prepared by dissolving 4 parts by mass of N-vinylformamide polymer obtained in Production Example 1-5 in 90 parts by mass of deionized water.

Separately, an aqueous solution of lithium hydroxide monohydrate was prepared by dissolving 0.24 part by mass of lithium hydroxide monohydrate (molecular weight: 42) of an amount that is 1% with respect to N-vinylformamide polymer as a molar ratio in 6 parts by mass of deionized water.

The aqueous solution of lithium hydroxide monohydrate was added to the aqueous polymer solution, the mixture was uniformly stirred and then heated for 5 hours at 75° C., thereby performing the hydrolysis reaction thereof. The reaction solution after the hydrolysis reaction was cooled to obtain an aqueous solution of the polymer (A-6).

Into a 50 mL round-bottom flask, 10 parts by mass of the aqueous solution of the polymer (A-6) thus obtained was transferred and freeze-dried for 48 hours at an degree of vacuum of from 15 to 25 Pa and a trap temperature of from −35° C. to −50° C. using the FT-1000 type freeze dryer manufactured by TOKYO RIKAKIKAI CO., LTD., thereby obtaining the polymer (A-6).

Production Example 1-7

Production of Polymer (A-7)

A polymer in powder form was obtained in the same manner as in Production Example 1-6 except changing the amount of lithium hydroxide monohydrate added to 4.7 parts by mass (an amount that is 20% with respect to N-vinylformamide polymer of Production Example 1-5 as a molar ratio). This was used as a polymer (A-7).

Production Example 1-8

Production of Polymer (A-8)

A polymer in powder form was obtained in the same manner as in Production Example 1-6 except changing the amount of lithium hydroxide monohydrate added to 11.8 parts by mass (an amount that is 50% with respect to N-vinylformamide polymer of Production Example 1-5 as a molar ratio). This was used as a polymer (A-8).

Production Example 1-9

Production of Polymer (A-9)

A polymer in powder form was obtained in the same manner as in Production Example 1-6 except changing to 11.2 parts by mass (an amount that is 50% with respect to N-vinylformamide polymer of Production Example 1-5 as a molar ratio) of sodium hydroxide (molecular weight: 40) instead of lithium hydroxide monohydrate. This was used as a polymer (A-9).

Examples 1-4 to 1-7

The polymers (A-6) to (A-9) obtained in Production Examples 1-6 to 1-9 were used as the binder resin, respectively.

The $I_s$ of the binder resin thus obtained was measured by the same procedure as (1) above.

In addition, various characteristics of the slurry compositions for a negative electrode obtained using the respective binder resins, the electrodes (negative electrode) produced using the slurry compositions for a negative electrode, and the batteries produced using the electrodes (negative electrode) were evaluated by the following procedures. The results are shown in Table 2.

(8) Preparation of Slurry Composition for Negative Electrode

A slurry composition for a negative electrode was prepared by mixing 100 parts by mass of a natural graphite-based negative electrode active material ("MPGC16" manufactured by Mitsubishi Chemical Corporation) as the active material, 5 parts by mass of acetylene black ("Denka Black" manufactured by DENKI KAGAKU KOGYO KABUSHIKI KAISHA) as a conductive auxiliary, 2 parts by mass of the binder resin of Examples 1-4 to 1-7 with 40 parts by mass of distilled water using a rotary and revolutionary stirrer ("AWATORIRENTARO" manufactured by THINKY) under a condition of rotation at 1000 rpm and revolution at 2000 rpm.

(9) Evaluation of Thixotropy of Slurry Composition for Negative Electrode $\eta_{0.1}/\eta_{80}$ of the binder resin was determined in the same manner as in (3) above except using the slurry composition for a negative electrode prepared in (8) above.

(10) Production of Electrode (Negative Electrode)

The slurry composition for a negative electrode prepared in (8) above was coated on an aluminum foil (19 cm×25 cm, and thickness: 20 µm) using a doctor blade, and the resultant was dried for 1 hour at 80° C. in a circulation type hot air dryer and then further dried under reduced pressure for 12 hours at 100° C. by a vacuum dryer, thereby obtaining an electrode (negative electrode) in which a mixture layer having a film thickness of 80 µm is coated on an aluminum foil.

(11) Evaluation of Uniformity of Mixture Layer

The uniformity of the mixture layer was evaluated in the same manner as in (5) above except using the electrode (negative electrode) produced in (10) above.

(12) Production of Secondary Battery (2016-Type Coin Battery)

A commercially available metal lithium electrode (positive electrode) and the electrode (negative electrode) produced in (10) above were faced to each other via a separator (trade name: Celgard #2400). A 2016-type coin battery was produced using, as the nonaqueous electrolyte, 1 M solution of lithium hexafluorophosphate obtained using a mixture of ethylene carbonate/diethyl carbonate=1/2 (volume ratio) as a solvent.

(13) Measurement of Initial Battery Capacity of Secondary Battery

Immediately after the produce of the 2016-type coin battery by (12) above, the battery capacity when the battery was charged to 3.0 V at 60° C. and a charge and discharge rate of 0.5 C by a constant current anodizing process (current density: 0.6 mA/g—active material) was measured, and the measured value was taken as the initial battery capacity.

TABLE 2

| | Kind of polymer | $I_s$ | Thixotropy of slurry composition $[\eta_{0.1}/\eta_{80}]$ | Uniformity of mixture layer | Initial battery capacity (mAh/g) |
|---|---|---|---|---|---|
| Example 1-4 | A-6 | 374.1 | 161 | ○ | 355 |
| Example 1-5 | A-7 | 411.3 | 90 | ○ | 353 |
| Example 1-6 | A-8 | 342.1 | 171 | ○ | 351 |
| Example 1-7 | A-9 | 419.4 | 213 | ○ | 357 |

As shown in the results of Table 2, the binder resins of Examples 1-4 to 1-7 exhibited a great $I_s$ value, and as the result thereof, the thixotropy of the slurry compositions for a negative electrode obtained was favorable. The storage stability of the slurry composition or the uniformity of the mixture layer becomes more favorable as the thixotropy of the slurry composition is more favorable, and thus the battery characteristics are improved. In fact, the electrode (negative electrode) obtained using the slurry composition for a negative electrode of each Example was favorable in the uniformity of the mixture layer. In addition, the initial battery capacity of the secondary battery obtained using the electrode (negative electrode) was also favorable.

Production Example 2-1

Production of Polymer (B-1)

The pH of an aqueous monomer solution obtained by mixing 29.1 parts by mass of N-vinylformamide, 0.9 part by mass of methyl acrylate, and 1.5 parts by mass of sodium acetate with respect to 70 parts by mass of deionized water was adjusted to 6.3 with phosphoric acid to obtain an adjusted monomer solution.

This adjusted monomer solution was cooled to 5° C. and then introduced into an adiabatic reactor equipped with a thermometer, and nitrogen aeration was performed for 15 minutes. Thereafter, 1500 ppm (with respect to the monomer) 2,2'-azobis[N-(2-carboxyethyl)-2-methylpropionamidine] ("VA-057" manufactured by Wako Pure Chemical Industries, Ltd.) was added thereto as a 10% by mass aqueous solution, subsequently 200 ppm (with respect to the monomer) t-butyl hydroperoxide was added thereto as a 10% by mass aqueous solution, and further 200 ppm (with respect to the monomer) sodium hydrogen sulfite was added thereto as a 10% by mass aqueous solution, thereby performing the polymerization.

Aging was performed for another 1 hour after the internal temperature exceeded the peak, the gel was taken out and ground with a meat chopper, and then dried for 10 hours at 60° C., and the solid thus obtained was ground, thereby obtaining a polymer in powder form. This was used as a polymer (B-1).

Production Example 2-2

Production of Polymer (B-2)

A polymer in powder form was obtained by performing the same operation as in Production Example 2-1 except using 27.0 parts by mass of N-vinylformamide and 3.0 parts by mass of methyl acrylate as the monomers. This was used as a polymer (B-2).

Production Example 2-3

Production of Polymer (B-3)

A polymer in powder form was obtained by performing the same operation as in Production Example 2-1 except using 25.5 parts by mass of N-vinylformamide and 4.5 parts by mass of methyl acrylate as the monomers. This was used as a polymer (B-3).

Production Example 2-4

Production of Polymer (B-4)

A polymer in powder form was obtained by performing the same operation as in Production Example 2-1 except using 24.0 parts by mass of N-vinylformamide and 6.0 parts by mass of methyl acrylate as the monomers. This was used as a polymer (B-4).

Production Example 2-5

Production of Polymer (B-5)

A polymer in powder form was obtained by performing the same operation as in Production Example 2-1 except not using methyl acrylate but using 28.5 parts by mass of N-vinylformamide and 1.5 parts by mass of acrylic acid added with an aqueous lithium hydroxide solution so as to have a pH of 9 as the monomers. This was used as a polymer (B-5).

Production Example 2-6

Production of Polymer (B-6)

A polymer in powder form was obtained by performing the same operation as in Production Example 2-1 except not using methyl acrylate but using 27.0 parts by mass of N-vinylformamide and 3.0 parts by mass of acrylic acid added with an aqueous lithium hydroxide solution so as to have a pH of 9 as the monomers. This was used as a polymer (B-6).

Production Example 2-7

Production of Polymer (B-7)

A polymer in powder form was obtained by performing the same operation as Production Example 2-1 except not using methyl acrylate but using 21.0 parts by mass of N-vinylformamide and 9.0 parts by mass of 2-methoxyethyl acrylate as the monomers. This was used as a polymer (B-7).

Production Example 2-8

Production of Polymer (B-8)

A polymer in powder form was obtained by performing the same operation as Production Example 2-1 except not using methyl acrylate but using 18.0 parts by mass of N-vinylformamide and 12.0 parts by mass of 2-methoxyethyl acrylate as the monomers. This was used as a polymer (B-8).

Production Example 2-9

Production of Polymer (B-9)

A polymer in powder form was obtained by performing the same operation as Production Example 2-1 except not using methyl acrylate but using 29.1 parts by mass of N-vinylformamide and 0.9 part by mass of methoxypolyethylene glycol monomethacrylate ("BLEMMER PME-200" manufactured by NOF CORPORATION) as the monomers. This was used as a polymer (B-9).

Production Example 2-10

Production of Polymer (B-10)

A polymer in powder form was obtained by performing the same operation as Production Example 2-1 except not using methyl acrylate but using 28.5 parts by mass of N-vinylformamide and 1.5 parts by mass of methoxypolyethylene glycol monomethacrylate ("BLEMMER PME-200" manufactured by NOF CORPORATION) as the monomers. This was used as a polymer (B-10).

Production Example 2-11

Production of Polymer (B-11)

A polymer in powder form was obtained by performing the same operation as Production Example 2-1 except not using methyl acrylate but using 30 parts by mass of N-vinylformamide as the monomer, and using 0.88 part by mass (with respect to the monomer) of an azo polymerization initiator containing a polyethylene glycol unit ("VPE-0201" manufactured by Wako Pure Chemical Industries, Ltd.) instead of 2,2'-azobis[N-(2-carboxyethyl)-2-methylpropionamidine]. This was used as a polymer (B-11).

Production Example 2-12

Production of Polymer (B-12)

A polymer in powder form was obtained by performing the same operation as Production Example 2-1 except not using methyl acrylate but using 28.5 parts by mass of N-vinylformamide and 1.5 parts by mass of methoxypolyethylene glycol monomethacrylate ("BLEMMER PME-200" manufactured by NOF CORPORATION) as the monomers, and using 0.88 part by mass (with respect to the monomer) of an azo polymerization initiator containing a polyethylene glycol unit ("VPE-0201" manufactured by Wako Pure Chemical Industries, Ltd.) instead of 2,2'-azobis[N-(2-carboxyethyl)-2-methylpropionamidine]. This was used as a polymer (B-12).

Production Example 2-13

Production of Polymer (B-13)

A polymer in powder form was obtained by performing the same operation as Production Example 2-1 except not using methyl acrylate but using 27.0 parts by mass of N-vinylformamide and 3.0 parts by mass of methoxypolyethylene glycol #550 acrylate ("AM-130G" manufactured by SHIN-NAKAMURA CHEMICAL CO., LTD.) as the monomers. This was used as a polymer (B-13).

Production Example 2-14

Production of Polymer (B-14)

A polymer in powder form was obtained by performing the same operation as in Production Example 2-1 except using 27.0 parts by mass of N-vinylformamide, 2.1 parts by mass of methyl acrylate, and 0.9 part by mass of acrylic acid added with an aqueous lithium hydroxide solution so as to have a pH of 9 as the monomers. This was used as a polymer (B-14).

Production Example 2-15

Production of Polymer (B-15)

A polymer in powder form was obtained by performing the same operation as in Production Example 2-1 except using 18.0 parts by mass of N-vinylformamide, 10.5 parts by mass of methyl acrylate, and 1.5 parts by mass of acrylic acid added with an aqueous lithium hydroxide solution so as to have a pH of 9 as the monomers. This was used as a polymer (B-15).

Production Example 2-16

Production of Polymer (B-16)

A polymer in powder form was obtained by performing the same operation as in Production Example 2-1 except using 18.0 parts by mass of N-vinylformamide, 8.4 parts by mass of methyl acrylate, and 3.6 parts by mass of acrylic acid added with an aqueous lithium hydroxide solution so as to have a pH of 9 as the monomers. This was used as a polymer (B-16).

Production Example 2-17

Production of Polymer (B-17)

A polymer in powder form was obtained by performing the same operation as in Production Example 2-1 except not using methyl acrylate but using 9.0 parts by mass of N-vinylformamide, 16.5 parts by mass of 2-methoxyethyl acrylate, and 4.5 parts by mass of acrylic acid added with an aqueous lithium hydroxide solution so as to have a pH of 9 as the monomers. This was used as a polymer (B-17).

Production Example 2-18

Production of Polymer (B-18)

A polymer in powder form was obtained by performing the same operation as in Production Example 2-1 except not using methyl acrylate but using 28.5 parts by mass of N-vinylformamide and 1.5 parts by mass N-vinyl-2-pyrrolidone as the monomers. This was used as a polymer (B-18).

Production Example 2-19

Production of Polymer (B-19)

A polymer in powder form was obtained by performing the same operation as in Production Example 2-1 except not using methyl acrylate but using 27.0 parts by mass of N-vinylformamide and 3.0 parts by mass N-vinyl-2-pyrrolidone as the monomers. This was used as a polymer (B-19).

Production Example 2-20

Production of Polymer (B-20)

A polymer in powder form was obtained by performing the same operation as in Production Example 2-1 except not using methyl acrylate but using only 30.0 parts by mass of N-vinylformamide as the monomer. This was used as a polymer (B-20).

Examples 2-1 to 2-19 and Comparative Example 2-1

The polymers (B-1) to (B-20) obtained in Production Example 2-1 to 2-19 were used as the binder resin, respectively.

Various characteristics of the slurry compositions for a positive electrode obtained using the respective binder resins, the electrodes (positive electrode) produced using the slurry compositions for a positive electrode, and the batteries produced using the electrodes (positive electrode) were evaluated by the following procedures. The results are shown in Table 3.

(14) Preparation of Slurry Composition for Positive Electrode

The mixing and kneading of 0.06 g of the binder resin of Examples 2-1 to 1-19 and Comparative Example 2-1 and 2.0 g of water was performed using a rotary and revolutionary stirrer ("AWATORIRENTARO" manufactured by THINKY) under a condition of rotation at 1000 rpm and revolution at 2000 rpm. Thereto, 3.0 g of lithium cobalt oxide ("Cellseed C-5H" manufactured by Nippon Chemical Industrial Co., Ltd.) was added, and the resultant was further mixed and kneaded by a rotary and revolutionary stirrer. Thereto, 0.15 g of acetylene black (manufactured by DENKI KAGAKU KOGYO KABUSHIKI KAISHA) was further added, and the resultant was mixed and kneaded, thereafter, the viscosity thereof was adjusted with water to a viscosity at which coating is possible, thereby preparing a slurry composition for a positive electrode.

(15) Evaluation of Dispersibility

The state of the slurry composition for a positive electrode prepared in (14) above was visually observed, and the dispersibility thereof was evaluated by the following evaluation criteria. Meanwhile, the evaluation of dispersibility was conducted only for Examples 2-18 and 2-19 and Comparative Example 2-1.

◯: the aggregation of the contents of the slurry composition for a positive electrode is not acknowledged.

x: the aggregation of the contents of the slurry composition for a positive electrode is acknowledged.

(16) Production of Electrode (Positive Electrode)

The slurry composition for a positive electrode prepared in (14) above was coated on an aluminum foil (19 cm×25 cm, and thickness: 20 μm) using a doctor blade, and the resultant was dried for 10 minutes at 100° C. on a hot plate and then further dried under reduced pressure for 12 hours at 0.6 kPa and 100° C. by a vacuum dryer, thereby obtaining an electrode (positive electrode) in which a mixture layer having a film thickness shown in Table 3 was formed on a current collector (aluminum foil). An electrode (positive electrode) having an electrode density of 3 g/cm$^3$ was obtained by further pressing the electrode thus obtained at 100° C. by a nip roll press (linear pressure: about 150 kgF/cm).

(17) Evaluation of Flexibility

The pressed electrode (positive electrode) which is produced in (16) above was cut into 3 cm by 5 cm to use as a specimen 2-1. Subsequently, a mandrel (having a diameter of 10 mm, 8 mm, 6 mm, and 5 mm, respectively) was disposed on the aluminum foil surface of the specimen 2-1 and one side of the specimen 2-1 was fixed with tape, and the state of the mixture layer when the specimen 2-1 was bent such that the aluminum foil surface became the inside in an environment having a humidity of 10% or less was observed at 60 magnifications by a microscope, and the flexibility of the electrode was evaluate by the following evaluation criteria.

○: there is no change.
Δ: horizontal stripes are formed.
x: cracking or peeling occurred.

(18) Measurement of Peel Strength

The pressed electrode (positive electrode) which is produced in (16) above was cut into a 30 mm square to use as a specimen 2-2. With regard to the specimen 2-2, the measurement was performed using a borazon cutting edge with a 1 mm width (rake angle: 20°, clearance angle: 10°, and knife angle: 60°) under a condition of an initial pressure load of 0.5 N, a balance load of 0.3→0.2 N, a horizontal velocity of 1 μm/sec, a vertical velocity of 0.2 μm/sec, and an initial contact load of from 0.08 to 1 N. The maximum stress value when borazon cutting edge moved the interface between the mixture layer and the aluminum foil was recorded for three points. The average value of these maximum stress values was taken as the peel strength of the mixture layer and the current collector. It indicates that the mixture layer is more strongly bonded to the current collector as this value is greater.

Meanwhile, the measurement of peel strength was performed only for Examples 2-1 to 2-8 and 2-14 to 2-19, and Comparative Example 2-1.

binder resins of Examples 2-1 to 2-17 consisting of any of the polymers (B-1) to (B-17) having the structural unit represented by Formula (1) above and the structural units represented by Formula (2) above and/or Formula (3) above, and the binder resins of Examples 2-18 and 2-19 consisting of any of the polymers (B-18) and (B-19) having the structural unit represented by Formula (1) above and a structural unit derived from the compound represented by Formula (31) above.

Particularly, the binder resins of Examples 2-5, 2-6, and 2-14 to 2-17 consisting of any of the polymers (B-5) and (B-6) obtained by copolymerizing N-vinylformamide and acrylic acid neutralized with lithium hydroxide and the polymers (B-14) to (B-17) obtained by copolymerizing three kinds of monomers were excellent in binding property.

In addition, slurry compositions excellent in dispersibility were obtained using the binder resins of Examples 2-18 and 2-19 consisting of any of the polymers (B-18) and (B-19) having a structural unit derived from the compound represented by Formula (31) above.

On the other hand, the electrodes (positive electrode) obtained using the binder resin of Comparative Example 2-1 consisting of the polymer (B-20) not having any of the structural unit represented by Formula (2) above, the structural units represented by Formula (3) above, and a structural unit derived from the compound represented by Formula (31) above was inferior in flexibility compared to the electrodes of Examples 2-1 to 2-19.

Production Example 3-1

The pH of an aqueous monomer solution obtained by mixing 30 parts by mass of N-vinylformamide (molecular weight: 71.08) with respect to 70 parts by mass of deionized water was adjusted to 6.3 with phosphoric acid to obtain an adjusted monomer solution.

This adjusted monomer solution was cooled to 5° C. and then introduced into an adiabatic reactor equipped with a thermometer, and nitrogen aeration was performed for 15

TABLE 3

| | Kind of polymer | Dispersibility | Film thickness (μm) | Flexibility 10 mm | 8 mm | 6 mm | 5 mm | Peel strength (N/cm) |
|---|---|---|---|---|---|---|---|---|
| Example 2-1 | B-1 | — | 59.1 | ○ | ○ | Δ | Δ | 0.04 |
| Example 2-2 | B-2 | — | 60.6 | ○ | ○ | Δ | x | 0.04 |
| Example 2-3 | B-3 | — | 57.7 | ○ | ○ | Δ | x | 0.02 |
| Example 2-4 | B-4 | — | 58.2 | ○ | ○ | ○ | ○ | 0.03 |
| Example 2-5 | B-5 | — | 61.0 | ○ | ○ | Δ | x | 0.39 |
| Example 2-6 | B-6 | — | 60.8 | ○ | ○ | Δ | Δ | 0.48 |
| Example 2-7 | B-7 | — | 55.3 | ○ | ○ | ○ | ○ | 0.03 |
| Example 2-8 | B-8 | — | 60.3 | ○ | ○ | ○ | ○ | 0.08 |
| Example 2-9 | B-9 | — | 59.0 | ○ | ○ | ○ | Δ | — |
| Example 2-10 | B-10 | — | 62.0 | ○ | ○ | ○ | ○ | — |
| Example 2-11 | B-11 | — | 68.0 | ○ | ○ | ○ | ○ | — |
| Example 2-12 | B-12 | — | 65.0 | ○ | ○ | ○ | ○ | — |
| Example 2-13 | B-13 | — | 51.0 | ○ | ○ | ○ | ○ | — |
| Example 2-14 | B-14 | — | 55.0 | ○ | ○ | Δ | Δ | 0.22 |
| Example 2-15 | B-15 | — | 54.0 | ○ | ○ | ○ | ○ | 0.28 |
| Example 2-16 | B-16 | — | 56.0 | ○ | ○ | Δ | Δ | 0.60 |
| Example 2-17 | B-17 | — | 47.0 | ○ | ○ | ○ | Δ | 0.60 |
| Example 2-18 | B-18 | ○ | 68.0 | ○ | ○ | ○ | ○ | 0.05 |
| Example 2-19 | B-19 | ○ | 67.0 | ○ | ○ | Δ | Δ | 0.04 |
| Comparative Example 2-1 | B-20 | x | 63.9 | ○ | x | x | x | 0.20 |

As shown in the results of Table 3, electrodes (positive electrode) excellent in flexibility were obtained using the minutes. Thereafter, 0.4 parts by mass of a 10% by mass aqueous solution of 2,2'-azobis[N-(2-carboxyethyl)-2-methylpropionamidine] ("VA-057" manufactured by Wako Pure Chemical Industries, Ltd.) was added thereto, subsequently 0.1 part by mass of a 10% by mass aqueous solution of t-butyl hydroperoxide and 0.1 part by mass of a 10% by mass aqueous solution of sodium hydrogen sulfite were added thereto, respectively, thereby performing the polymerization.

Aging was performed for another 1 hour after the internal temperature exceeded the peak, the gel was taken out and ground with a meat chopper, and then dried for 10 hours at 60° C., and the solid thus obtained was ground, thereby obtaining N-vinylformamide polymer (corresponding to the polymer (β2)) in powder form.

Subsequently, an aqueous polymer solution was prepared by dissolving 4 parts by mass of N-vinylformamide polymer thus obtained in 90 parts by mass of deionized water.

Separately, an aqueous solution of lithium hydroxide monohydrate was prepared by dissolving 11.8 parts by mass of lithium hydroxide monohydrate (molecular weight: 42) of an amount that is 50% with respect to N-vinylformamide polymer as a molar ratio in 6 parts by mass of deionized water.

The aqueous solution of lithium hydroxide monohydrate was added to the aqueous polymer solution, the mixture was uniformly stirred and then heated for 5 hours at 75° C., thereby performing the hydrolysis reaction thereof. The reaction solution after the hydrolysis reaction was cooled to obtain an aqueous solution of the binder resin α-1 (aqueous binder resin α-1 solution).

(Measurement of Content of Constitutional Unit)

The content of the structural unit represented by Formula (21) above in the binder resin was measured by a colloid titration method to be described below.

An aqueous solution of the binder resin was accurately weighed and introduced into a volumetric flask, and then demineralized water was added thereto. The aqueous solution of the binder resin is taken from this volumetric flask by a transfer pipette and demineralized water was added thereto, and then the pH thereof was adjusted to 2.5 with a 1 N hydrochloric acid solution using a pH meter while checking the pH. The resultant solution was used as the test solution.

The test solution thus obtained was added with toluidine blue and titrated with potassium N/400-polyvinyl sulfate solution ("PVSK" manufactured by Wako Pure Chemical Industries, Ltd.). The point at which the color of the test solution was changed from blue to purple was taken as the endpoint. The content of the structural unit represented by Formula (21) above was determined from the titration result. The result thereof is shown in Table 4.

In Table 4, the expression "unit (21)" represents the structural unit represented by Formula (21) above.

In addition, the contents of the structural units represented by Formulas (22) and (23) above in the binder resin were determined by the $^{13}C$-NMR measurement to be described below.

In 900 mg of heavy water added with 0.5% by mass of sodium 3-(trimethylsilyl)-1-propanesulfonate as the standard substance, 15 mg of the binder resin powder obtained by the freeze-drying of an aqueous solution of the binder resin was dissolved. This solution was introduced into a test tube having a diameter of 5 mm φ so as to have a liquid height of about 5 cm, and then the measurement was performed using a nuclear magnetic resonance apparatus ("VarianInova 500 type FT-NMR" manufactured by Agilent Technologies) under the following conditions.

Observation frequency: 500 MHz (1H decoupling pulse mode)

Measuring temperature: 30° C.

Integration number: 10,000 times

Meanwhile, in the Fourier transform of the FID signal, zero filling was performed two times and then the broadening factor was set to 10 Hz.

The signal intensity of from 160 to 165 ppm was taken as the structural unit represented by Formula (22) above and the signal intensity of from 150 to 155 ppm was taken as the structural unit represented by Formula (23) above among the $^{13}C$-NMR spectra thus obtained, and the contents of the structural units represented by Formulas (22) and (23) above in the structural units excepting the structural unit represented by Formula (21) above were determined from the ratio of the integral values of the signal intensities, respectively. The results are shown in Table 4.

In Table 4, the expression "unit (22)" represents the structural unit represented by Formula (22) above, and the expression "unit (23)" represents the structural unit represented by Formula (23) above.

Production Example 3-2

An aqueous solution of the binder resin α-2 (aqueous binder resin α-2 solution) was obtained in the same manner as in Production Example 3-1 except changing the amount of lithium hydroxide monohydrate added to 4.7 parts by mass (an amount that is 20% with respect to N-vinylformamide polymer as a molar ratio).

The contents of the structural units represented by Formulas (21) to (23) above were determined for the binder resin α-2 thus obtained. The results are shown in Table 4.

Production Example 3-3

An aqueous solution of the binder resin α-3 (aqueous binder resin α-3 solution) was obtained in the same manner as in Production Example 3-1 except using 11.2 parts by mass (an amount that is 50% with respect to N-vinylformamide polymer as a molar ratio) of sodium hydroxide (molecular weight: 40) instead of lithium hydroxide monohydrate.

The contents of the structural units represented by Formulas (21) to (23) above were determined for the binder resin α-3 thus obtained. The results are shown in Table 4.

Production Example 3-4

An aqueous solution of the binder resin β1-4 (aqueous binder resin β1-4 solution) was obtained in the same manner as in Production Example 3-1 except using sodium hydroxide (molecular weight: 40) instead of lithium hydroxide monohydrate and changing the amount of sodium hydroxide added to 33.7 parts by mass (an amount that is 150% with respect to N-vinylformamide polymer as a molar ratio).

The contents of the structural units represented by Formulas (21) to (23) above were determined for the binder resin β1-4 thus obtained. The results are shown in Table 4.

Separately, an aqueous polymer solution was obtained by dissolving 4 parts by mass of N-vinylformamide polymer in 96 parts by mass of deionized water, and this solution was used as an aqueous solution of the binder resin β2-4 (aqueous binder resin β2-4 solution).

The aqueous binder resin β1-4 solution and the aqueous binder resin β2-4 solution were mixed at a proportion at which the molar ratio of the aqueous binder resin β1-4 solution to the aqueous binder resin β2-4 solution was 50:50. This was used as an aqueous solution of the binder resin β-4 (aqueous binder resin β-4 solution).

Production Example 3-5

An aqueous solution of the binder resin α-5 (aqueous binder resin α-5 solution) was obtained in the same manner as in Production Example 3-1 except changing the amount of lithium hydroxide monohydrate added to 1.2 parts by mass (an amount that is 5% with respect to N-vinylformamide polymer as a molar ratio).

The contents of the structural units represented by Formulas (21) to (23) above were determined for the binder resin α-5 thus obtained. The results are shown in Table 4.

Production Example 3-6

The neutralization treatment of the aqueous binder resin α-2 solution obtained in Production Example 3-2 was performed with a 1 N aqueous nitric acid solution so as to have a pH of 6.5. The aqueous solution obtained by the neutralization treatment was used as an aqueous solution of the binder resin α-6 (aqueous binder resin α-6 solution).

The contents of the structural units represented by Formulas (21) to (23) above were determined for the binder resin α-6 thus obtained. The results are shown in Table 4.

Production Example 3-7

An aqueous polymer solution was prepared by dissolving 3 parts by mass of N-vinylacetamide polymer (molecular weight: 85.10) in 90 parts by mass of deionized water.

Separately, an aqueous solution of lithium hydroxide monohydrate was prepared by dissolving 7.0 parts by mass of lithium hydroxide monohydrate (molecular weight: 42) of an amount that is 150% with respect to N-vinylacetamide polymer as a molar ratio in 7.0 parts by mass of deionized water.

The aqueous solution of lithium hydroxide monohydrate was added to the aqueous polymer solution, the mixture was uniformly stirred and then heated for 15 hours at 90° C., thereby performing the hydrolysis reaction thereof. The reaction solution after the hydrolysis reaction was cooled to obtain an aqueous solution of the binder resin α-7 (aqueous binder resin α-7 solution).

The contents of the structural units represented by Formulas (21) to (23) above were determined for the binder resin α-7 thus obtained. The results are shown in Table 4.

Production Example 3-8

An aqueous polymer solution was obtained by dissolving 4 parts by mass of N-vinylacetamide polymer in 96 parts by mass of deionized water, and this was used as an aqueous solution of the binder resin β2-8 (aqueous binder resin β2-8 solution).

The contents of the structural units represented by Formulas (21) to (23) above in the binder resin β2-8 thus obtained are shown in Table 4.

TABLE 4

| Kind of | Content of structural unit (% by mole) | | |
|---|---|---|---|
| binder resin | Unit (21) | Unit (22) | Unit (23) |
| Production Example 3-1 | α-1 | 42 | 47 | 11 |
| Production Example 3-2 | α-2 | 19 | 78 | 3 |
| Production Example 3-3 | α-3 | 42 | 46 | 12 |
| Production Example 3-4 | β 1-4 | 95 | Not detected | Not detected |
| Production Example 3-5 | α-5 | 5 | 94 | 1 |
| Production Example 3-6 | α-6 | 19 | 64 | 17 |
| Production Example 3-7 | α-7 | 11 | 89 | Not detected |
| Production Example 3-8 | β 2-8 | Not detected | 100 | Not detected |

The binder resin α-1 obtained in Production Example 3-1 was a polymer (corresponding to the polymer (α) having the structural unit represented by Formula (21) above (provided that, $R^{21}$ in Formula (21) represents a hydrogen atom) at 42% by mole, the structural unit represented by Formula (22) above (provided that, $R^{22}$ and $R^{23}$ in Formula (22) represent a hydrogen atom) at 47% by mole, and the structural unit represented by Formula (23) above (provided that, $R^{24}$ and $R^{25}$ in Formula (23) represent a hydrogen atom) at 11% by mole.

The binder resin α-2 obtained in Production Example 3-2 was a polymer (corresponding to the polymer (α) having the structural unit represented by Formula (21) above (provided that, $R^{21}$ in Formula (21) represents a hydrogen atom) at 19% by mole, the structural unit represented by Formula (22) above (provided that, $R^{22}$ and $R^{23}$ in Formula (22) represent a hydrogen atom) at 78% by mole, and the structural unit represented by Formula (23) above (provided that, $R^{24}$ and $R^{25}$ in Formula (23) represent a hydrogen atom) at 3% by mole.

The binder resin α-3 obtained in Production Example 3-3 was a polymer (corresponding to the polymer (α) having the structural unit represented by Formula (21) above (provided that, $R^{21}$ in Formula (21) represents a hydrogen atom) at 42% by mole, the structural unit represented by Formula (22) above (provided that, $R^{22}$ and $R^{23}$ in Formula (22) represent a hydrogen atom) at 46% by mole, and the structural unit represented by Formula (23) above (provided that, $R^{24}$ and $R^{25}$ in Formula (23) represent a hydrogen atom) at 12% by mole.

The binder resin β1-4 obtained in Production Example 3-4 was a polymer (corresponding to the polymer (β1)) having the structural unit represented by Formula (21) above (provided that, $R^{21}$ in Formula (21) represents a hydrogen atom) at 95% by mole. In addition, the binder resin β-4 was a mixture of the binder resin β1-4 (corresponding to the polymer (β1)) and a polymer (corresponding to the polymer (β2)) having the structural unit represented by Formula (22) above (provided that, $R^{22}$ and $R^{23}$ in Formula (22) represent a hydrogen atom) at 100% by mole.

The binder resin α-5 obtained in Production Example 3-5 was a polymer (corresponding to the polymer (α)) having the structural unit represented by Formula (21) above (provided that, $R^{21}$ in Formula (21) represents a hydrogen atom) at 5% by mole, the structural unit represented by Formula (22) above (provided that, $R^{22}$ and $R^{23}$ in Formula (22) represent a hydrogen atom) at 94% by mole, and the structural unit represented by Formula (23) above (provided that, $R^{24}$ and $R^{25}$ in Formula (23) represent a hydrogen atom) at 1% by mole.

The binder resin α-6 obtained in Production Example 3-6 was a polymer (corresponding to the polymer (α)) having the structural unit represented by Formula (21) above (provided that, $R^{21}$ in Formula (21) represents a hydrogen atom) at 19% by mole, the structural unit represented by Formula (22) above (provided that, $R^{22}$ and $R^{23}$ in Formula (22) represent a hydrogen atom) at 64% by mole, and the structural unit represented by Formula (23) above (provided that, $R^{24}$ and $R^{25}$ in Formula (23) represent a hydrogen atom) at 17% by mole.

The binder resin α-7 obtained in Production Example 3-7 was a polymer (corresponding to the polymer (α)) having the structural unit represented by Formula (21) above (provided that, $R^{21}$ in Formula (21) represents a hydrogen atom) at 11% by mole and the structural unit represented by Formula (22) above (provided that, $R^{22}$ and $R^{23}$ in Formula (22) represent a hydrogen atom) at 89% by mole.

The binder resin β2-8 obtained in Production Example 3-8 was a polymer (corresponding to the polymer (β2)) having the structural unit represented by Formula (22) above (provided that, $R^{22}$ and $R^{23}$ in Formula (22) represent a hydrogen atom) at 100% by mole.

Meanwhile, the concentration of the binder resin in each of the aqueous binder resin solutions obtained in Production Examples 3-1 to 3-5 and 3-8 was 4% by mass, and the concentration of the binder resin in each of the aqueous binder resin solutions obtained in Production Examples 3-6 and 3-7 was 3% by mass.

Example 3-1

<Preparation of Slurry Composition for Negative Electrode>

The mixing and kneading of 2.5 g of the aqueous binder resin α-1 solution and 5.0 g of a natural graphite-based negative electrode active material ("MPGC16" manufactured by Mitsubishi Chemical Corporation) was performed using a rotary and revolutionary stirrer ("AWATORI-RENTARO" manufactured by THINKY) under a condition of rotation at 1000 rpm and revolution at 2000 rpm. Thereafter, the viscosity thereof was adjusted with water to a viscosity at which coating is possible, thereby preparing a slurry composition for a negative electrode.

<Production of Electrode (Negative Electrode)>

The slurry composition for a negative electrode thus obtained was coated on an aluminum foil (19 cm×25 cm, and thickness: 20 μm) using a doctor blade, and the resultant was dried for 1 hour at room temperature and then further dried under reduced pressure for 12 hours at 0.6 kPa and 100° C. by a vacuum dryer, thereby obtaining an electrode (negative electrode) in which a mixture layer having a film thickness of 80 μm was formed on a current collector (aluminum foil). An electrode (negative electrode) having an electrode density of 1.5 g/cm³ was obtained by further pressing the electrode thus obtained at 100° C. by a nip roll press (linear pressure: about 150 kgF/cm).

Separately, an electrode (negative electrode) in which a mixture layer having a film thickness of 50 μm was formed on a current collector (aluminum foil) was produced in the same manner.

The electrode (negative electrode) having a mixture layer with a film thickness of 80 μm was used in the evaluations of flexibility and binding property to be described below, and the electrode (negative electrode) having a mixture layer with a film thickness of 50 μm was used in the evaluation of battery characteristics.

<Evaluation>

(19) Evaluation of Flexibility

The pressed electrode (negative electrode) which is produced above was cut into 3 cm by 5 cm to use as a specimen 3-1. Subsequently, a mandrel (having a diameter of 16 mm, 10 mm, 8 mm, 5 mm, 3 mm, and 2 mm, respectively) was disposed on the aluminum foil surface of the specimen 3-1 and one side of the specimen 3-1 was fixed with tape, and the state of the mixture layer when the specimen 3-1 was bent such that the aluminum foil surface became the inside in an environment having a humidity of 10% or less was observed at 60 magnifications by a microscope, and the flexibility of the electrode was evaluated by the following evaluation criteria. The results are shown in Table 5.

○: there is no change.

Δ: horizontal stripes are formed.

x: cracking or peeling occurred.

(20) Evaluation of Binding Property

The pressed electrode (negative electrode) which is produced above was cut into 20 mm by 80 mm, and the mixture layer side of the cut piece was fixed to a polycarbonate sheet (width: 25 mm, length: 100 mm, and thickness: 1 mm) with double-sided tape ("#570" manufactured by SEKISUI CHEMICAL CO., LTD.) to use as a specimen 3-2.

The specimen 3-2 was set to a tensile strength Tensilon tester ("RTC-1210A" manufactured by ORIENTEC Co., Ltd.), and the copper foil was peeled by 180° at 10 mm/min, thereby measuring the peel strength. The results are shown in Table 5.

(21) Evaluation of Battery Characteristics

The pressed electrode (negative electrode) which is produced above and a commercially available metal lithium electrode (positive electrode) were faced to each other via a separator (Celgard #2400). A 2032-type coin battery was produced using, as the nonaqueous electrolyte, 1 M solution of lithium hexafluorophosphate obtained using a mixture of ethylene carbonate/diethyl carbonate=1/2 (volume ratio) as a solvent.

With regard to the 2032-type coin battery thus obtained, the battery capacity of the first cycle and the battery capacity of the 30th cycle were measured by repeating the charge and discharge of charging to 3.0 V and discharging to 0 V at 60° C. and a charge and discharge rate of 0.5 C by a constant current anodizing process (current density: 0.6 mA/g—active material) 50 times. The proportion of the battery capacity of the 30th cycle to the battery capacity of the first cycle was expressed by a percentage, and this was taken as the battery capacity maintenance rate. Battery characteristics were evaluated by the following evaluation criteria. The results are shown in Table 5.

○: the battery capacity maintenance rate is 80% or more.

x: the battery capacity maintenance rate is less than 80%.

Examples 3-2 to 3-7 and Comparative Example 3-1

The electrodes (negative electrode) and the 2032-type coin batteries were produced in the same manner as in Example 3-1 except changing the kind of the aqueous binder resin solution to those listed in Table 5 and setting the amount of the aqueous binder resin solution used to 2.5 g for α-2, α-3, β-4, and α-5 and 3.33 g for α-6 and α-7, respectively, and evaluated. The results are shown in Table 5.

Example 3-8

<Preparation of Slurry Composition for Positive Electrode>

The mixing and kneading of 1.5 g of the aqueous binder resin α-5 solution and 2.0 g of water was performed using a rotary and revolutionary stirrer ("AWATORIRENTARO" manufactured by THINKY) under a condition of rotation at 1000 rpm and revolution at 2000 rpm. Thereto, 3.0 g of lithium cobalt oxide ("Cellseed C-5H" manufactured by Nippon Chemical Industrial Co., Ltd.) was added, and the resultant was further mixed and kneaded by a rotary and revolutionary stirrer. Thereto, 0.12 g of acetylene black (manufactured by DENKI KAGAKU KOGYO KABUSHIKI KAISHA) was further added, and the resultant was mixed and kneaded, thereafter, the viscosity thereof was adjusted with water to a viscosity at which coating is possible, thereby preparing a slurry composition for a positive electrode.

<Production of Electrode (Positive Electrode)>

The slurry composition for a positive electrode thus obtained was coated on an aluminum foil (19 cm×25 cm, and thickness: 20 μm) using a doctor blade, and the resultant was dried for 1 hour at room temperature and then further dried under reduced pressure for 12 hours at 0.6 kPa and 60° C. by a vacuum dryer, thereby obtaining an electrode (positive electrode) in which a mixture layer having a film thickness of 80 μm was formed on a current collector (aluminum foil). An electrode (positive electrode) having an electrode density of 3 g/cm$^3$ was obtained by further pressing the electrode thus obtained at 100° C. by a nip roll press (linear pressure: about 150 kgF/cm).

Separately, an electrode (positive electrode) in which a mixture layer having a film thickness of 50 μm was formed on a current collector (aluminum foil) was produced in the same manner.

The electrode (positive electrode) having a mixture layer with a film thickness of 80 μm was used in the evaluations of flexibility and binding property to be described below, and the electrode (positive electrode) having a mixture layer with a film thickness of 50 μm was used in the evaluation of battery characteristics.

<Evaluation>

(22) Evaluation of Flexibility

The pressed electrode (positive electrode) which is produced above was cut into 3 cm by 5 cm to use as a specimen 3-3. The flexibility of the electrode was evaluated in the same manner as in (19) above except using the specimen 3-3. The result is shown in Table 5.

(23) Evaluation of Binding Property

The pressed electrode (positive electrode) which is produced above was cut into 20 mm by 80 mm, and the mixture layer side of the cut piece was fixed to a polycarbonate sheet (width: 25 mm, length: 100 mm, and thickness: 1 mm) with double-sided tape ("#570" manufactured by SEKISUI CHEMICAL CO., LTD.) to use as a specimen 3-4.

The peel strength was measured in the same manner as in (20) above except using the specimen 3-4. The result is shown in Table 5.

(24) Evaluation of Battery Characteristics

A commercially available metal lithium electrode (negative electrode) and the pressed electrode (positive electrode) which is produced above were faced to each other via a separator (Celgard #2400). A 2032-type coin battery was produced using, as the nonaqueous electrolyte, 1 M solution of lithium hexafluorophosphate obtained using a mixture of ethylene carbonate/diethyl carbonate=1/2 (volume ratio) as a solvent.

The battery characteristics were evaluated in the same manner as in (21) above except using the 2032-type coin battery thus obtained. The result is shown in Table 5.

TABLE 5

| | Kind of aqueous binder resin solution | Electrode | Flexibility | | | | | | Peel strength (N/cm) | Battery characteristics |
|---|---|---|---|---|---|---|---|---|---|---|
| | | | 16 mm | 10 mm | 8 mm | 5 mm | 3 mm | 2 mm | | |
| Example 3-1 | α-1 | Negative electrode | ○ | ○ | ○ | ○ | ○ | x | 0.11 | ○ |
| Example 3-2 | α-2 | Negative electrode | ○ | ○ | ○ | ○ | ○ | Δ | 0.80 | ○ |
| Example 3-3 | α-3 | Negative electrode | ○ | ○ | ○ | ○ | ○ | Δ | 0.06 | ○ |
| Example 3-4 | β-4 | Negative electrode | ○ | ○ | ○ | ○ | ○ | ○ | 0.03 | ○ |
| Example 3-5 | α-5 | Negative electrode | ○ | ○ | ○ | ○ | ○ | Δ | 0.15 | ○ |
| Example 3-6 | α-6 | Negative electrode | ○ | ○ | ○ | ○ | ○ | Δ | 0.16 | ○ |
| Example 3-7 | α-7 | Negative electrode | ○ | ○ | ○ | ○ | ○ | Δ | 0.11 | ○ |
| Example 3-8 | α-5 | Positive electrode | ○ | ○ | ○ | ○ | Δ | x | 0.22 | ○ |
| Comparative Example 3-1 | β 2-8 | Negative electrode | ○ | ○ | x | x | x | x | 0.01 | ○ |

As shown in the results of Table 5, in Examples 3-1 to 3-8 in which the binder resins α-1 to α-3 and α-5 to α-7 consisting of a polymer (corresponding to the polymer (α)) having the structural units represented by Formulas (21) and (22) above and the binder resin β-4 consisting of a mixture of a polymer (corresponding to the polymer (β1)) having the structural unit represented by Formula (21) at 95% by mole and a polymer (corresponding to the polymer (β2)) having the structural unit represented by Formula (22) at 100% by mole were used, cracking or the like was not observed even in the test using a mandrel with a diameter of 5 mm, and thus a favorable result was obtained. Particularly, in the case of Example 3-4 in which the binder resin β-4 was used, cracking or the like was not observed even in the test using a mandrel with a diameter of 2 mm.

In addition, the binder resins α-1 to α-3 and α-5 to α-7 and the binder resin β-4 were excellent in binding property, and it was also possible to obtain an electrode exhibiting a high battery maintenance rate using the binder resins.

On the other hand, in the case of Comparative Example 3-1 in which the binder resin β2-8 consisting of a polymer (corresponding to the polymer (β2)) having the structural unit represented by Formula (22) above at 100% by mole was used, cracking was observed in the test using a mandrel with a diameter of 8 mm since the structural unit represented by Formula (21) above was not contained in the binder resin β2-8 at all.

In addition, the binder resin β2-8 exhibited insufficient binding property with respect to the current collecting foil, and the peel strength thereof was lower compared to the binder resins α-1 to α-3 and α-5 to α-7 and the binder resin β-4.

From these results, it is supposed that problems such as cracking or peeling occur in the production line when an electrode is produced using the binder resin β2-8.

INDUSTRIAL APPLICABILITY

According to the binder resin for a nonaqueous secondary battery electrode of the first aspect of the invention, a slurry composition exhibiting favorable thixotropy is obtained when the binder resin is mixed with an active material and water. Moreover, the binder resin can be distributed in the form of powder.

The slurry composition for a nonaqueous secondary battery electrode of the first aspect of the invention is obtained using the binder resin for a nonaqueous secondary battery electrode of the first aspect, and exhibits favorable thixotropy. By virtue of that, the slurry composition for a nonaqueous secondary battery electrode of the first aspect of the invention exhibits favorable storage stability. In addition, an electrode for a nonaqueous secondary battery in which a mixture layer exhibiting favorable uniformity, adhesive property (binding property) with the current collector, and the like is formed on a current collector is obtained using the slurry composition for a nonaqueous secondary battery electrode of the first aspect of the invention.

The electrode for a nonaqueous secondary battery of the first aspect of the invention having a mixture layer which exhibits favorable uniformity, adhesive property (binding property) with the current collector, and the like. By virtue of that, a nonaqueous secondary battery equipped with the electrode exhibits favorable battery characteristics.

In addition, according to the binder resins for a nonaqueous secondary battery electrode of the second and third aspects of the invention, an electrode for a nonaqueous secondary battery which is excellent in flexibility can be formed.

According to the binder resin compositions for a nonaqueous secondary battery electrode of the second and third aspects of the invention, an electrode for a nonaqueous secondary battery which is excellent in flexibility can be formed.

The slurry compositions for a nonaqueous secondary battery electrode of the second and third aspects of the invention are obtained using the binder resins for a nonaqueous secondary battery electrode or the binder resin compositions for a nonaqueous secondary battery electrode of the second and third aspects, and an electrode for a nonaqueous secondary battery which is excellent in flexibility can be obtained using the slurry compositions.

The electrodes for a nonaqueous secondary battery of the second and third aspects of the invention are excellent in flexibility. By virtue of that, a nonaqueous secondary battery equipped with the electrode exhibits favorable battery characteristics.

The invention claimed is:

1. A slurry composition for a nonaqueous secondary battery electrode comprising a binder resin for a nonaqueous secondary battery electrode, an active material, and water, wherein the binder resin for a nonaqueous secondary battery electrode comprises a polymer (B) having a structural unit represented by the following Formula (11) and at least one structural unit selected from the group consisting of a structural unit comprising a group represented by the following Formula (13), and a structural unit derived from a compound represented by the following Formula (31);

wherein the structural unit comprising a group represented by the following formula (13) is derived from the following Formula (16); Formulae (14) and (16); Formulae (15) and (16); or Formulae (14), (15) and (16);

(11)

wherein in Formula (11), $R^{11}$ and $R^{12}$ each independently represents a hydrogen atom or a hydrocarbon group having from 1 to 5 carbon atoms,

(13)

wherein in Formula (13), $R^{15}$ represents a divalent substituent,

(31)

wherein in Formula (31), $R^{31}$ and $R^{32}$ each independently represents a divalent substituent, $R^{33}$ represents a monovalent substituent, and any of $R^{31}$ to $R^{33}$ has a vinyl group structure; and s and t each independently represent 0 or 1,

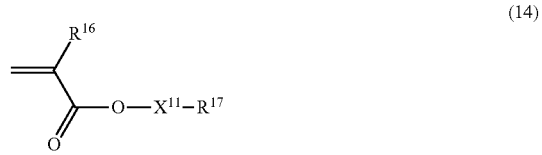

(14)

wherein in Formula (14), $R^{16}$ represents a hydrogen atom or a methyl group, $R^{17}$ represents a hydrogen atom or a monovalent substituent, and $X^{11}$ represents a divalent substituent comprising a group represented by Formula (13) described above,

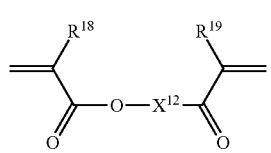

(15)

wherein in Formula (15), $R^{18}$ and $R^{19}$ each independently represents a hydrogen atom or a methyl group, and $X^{12}$ represents a divalent substituent comprising a group represented by Formula (13) described above, $$A^{11}\text{-}N{=}N\text{-}A^{12} \tag{16}$$

wherein in Formula (16), $A^{11}$ and $A^{12}$ each independently represents a monovalent substituent comprising a group represented by Formula (13) described above.

2. The slurry composition according to claim 1, wherein the structural unit comprising a group represented by the following formula (13) is derived from Formula (16).

3. The slurry composition according to claim 1, wherein the structural unit comprising a group represented by the following formula (13) is derived from Formulae (14) and (16).

4. The slurry composition according to claim 1, wherein the structural unit comprising a group represented by the following formula (13) is derived from Formulae (15) and (16).

5. The slurry composition according to claim 1, wherein the structural unit comprising a group represented by the following formula (13) is derived from Formulae (14), (15) and (16).

* * * * *